(12) United States Patent
Ciuperca

(10) Patent No.: US 12,145,882 B2
(45) Date of Patent: *Nov. 19, 2024

(54) CARBON MINERALIZATION AND SEQUESTRATION USING CARBONATABLE MINERALS, HYALOCLASTITE, LAVA, FLY ASH, BOTTOM ASH, SLAG AND METHOD OF MAKING AND USING SAME

(71) Applicant: Greencraft LLC, Norcross, GA (US)

(72) Inventor: Romeo Ilarian Ciuperca, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,867

(22) Filed: Apr. 23, 2024

(65) Prior Publication Data

US 2024/0351948 A1   Oct. 24, 2024

Related U.S. Application Data

(60) Provisional application No. 63/497,742, filed on Apr. 23, 2023.

(51) Int. Cl.
| | | |
|---|---|---|
| *C04B 18/08* | (2006.01) | |
| *C04B 18/06* | (2006.01) | |
| *C04B 103/00* | (2006.01) | |
| *C04B 111/00* | (2006.01) | |

(52) U.S. Cl.
CPC ............ *C04B 18/08* (2013.01); *C04B 18/067* (2013.01); *C04B 2103/0078* (2013.01); *C04B 2111/00017* (2013.01)

(58) Field of Classification Search
CPC .................. C04B 18/08; C04B 18/067; C04B 2103/0078; C04B 2111/00017
See application file for complete search history.

(56) References Cited

U.S. PATENT DOCUMENTS

| | | |
|---|---|---|
| 7,754,169 B2 | 6/2010 | Constantz |
| 7,749,476 B2 | 7/2010 | Constantz |
| 8,470,275 B2 | 6/2013 | Constantz |
| 9,822,037 B1 | 11/2017 | Ciuperca |
| 10,246,379 B2 | 4/2019 | Niven |
| 10,350,787 B2 | 7/2019 | Forgeron |
| 10,570,064 B2 | 2/2020 | Monkman |
| 10,654,191 B2 | 5/2020 | Niven |
| 11,884,602 B1 | 1/2024 | Ciuperca |
| 11,986,769 B1 | 5/2024 | Ciuperca |
| 2020/0165170 A1 | 5/2020 | Niven |
| 2020/0223760 A1 | 7/2020 | Monkman |
| 2022/0065527 A1 | 3/2022 | Forgeron et al. |
| 2022/0194852 A1 | 6/2022 | Thomas |
| 2022/0339576 A1 | 10/2022 | Bergur |
| 2022/0340488 A1 | 10/2022 | Bullerjahn |
| 2022/0364441 A1 | 11/2022 | Nagra |

OTHER PUBLICATIONS

U.S. Appl. No. 18/423,001, filed Jan. 25, 2024.
U.S. Appl. No. 18/416,240, filed Jan. 18, 2024.
U.S. Appl. No. 18/588,915, filed Feb. 27, 2024.
U.S. Appl. No. 18/612,108, filed Mar. 21, 2024.
U.S. Appl. No. 18/643,926, filed Apr. 23, 2024.
U.S. Appl. No. 18/664,661, filed May 15, 2024.
U.S. Appl. No. 18/737,977, filed Jun. 8, 2024.
U.S. Appl. No. 18/765,282, filed Jul. 7, 2024.
U.S. Appl. No. 18/670,405, filed May 21, 2024.
U.S. Appl. No. 18/421,638, filed Jan. 24, 2024.

*Primary Examiner* — Anthony J Green
(74) *Attorney, Agent, or Firm* — Robert E. Ricardo

(57) ABSTRACT

The invention comprises a product. The product comprises a carbonation aid or a microporous material or a combination thereof and a carbonatable mineral containing one or more of un-carbonated Ca, Mg, Na, K, Fe, wherein the carbonation aid facilitates the conversion of one or more of CaO, MgO, $Na_2O$, $K_2O$ or FeO to a carbonate or a $CO_3$ containing mineral in the presence of $CO_2$, wherein the carbonatable mineral has a volume-based mean particle size of less than or equal to 100 μm and wherein one or more of the carbonation aid or a microporous material or a combination thereof or the carbonatable mineral has carbon dioxide bound thereto at a concentration greater than its atmospheric concentration.

18 Claims, 1 Drawing Sheet

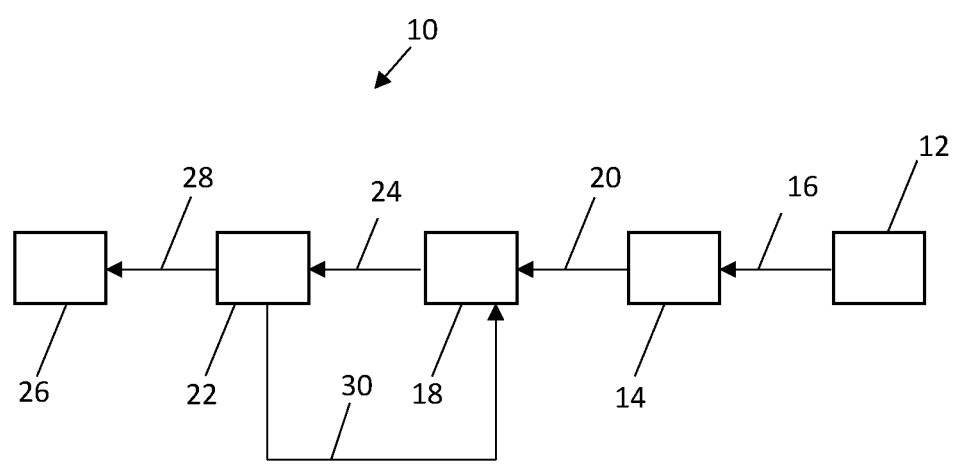

CARBON MINERALIZATION AND SEQUESTRATION USING CARBONATABLE MINERALS, HYALOCLASTITE, LAVA, FLY ASH, BOTTOM ASH, SLAG AND METHOD OF MAKING AND USING SAME

CROSS-REFERENCE TO RELATED APPLICATIONS

The present application claims the benefit of application Ser. No. 63/497,742 filed Apr. 23, 2023.

FIELD OF THE INVENTION

The present invention generally relates to carbon (carbon dioxide) mineralization or sequestration by combining carbon dioxide and a carbonatable mineral, either natural or man-made such as hyaloclastite, lava, volcanic ash fly ash, bottom ash, or slag with a basaltic or intermediate basaltic chemistry or a sufficient amount of carbonatable elements such as calcium, magnesium, sodium, potassium, iron and the like to react with carbon dioxide to create carbonate minerals. The present invention generally relates to carbon dioxide mineralization or sequestration by adding carbon dioxide into the process of grinding or reducing in size a carbonatable mineral where the carbon dioxide is absorbed or adsorbed into the pores or surface of the carbonatable mineral at elevated temperature, such as manufacturing a natural pozzolan, or adding carbon dioxide to the carbonatable mineral after it has been reduced in size where the carbon dioxide is adsorbed or absorbed in the pores or surface of the carbonatable mineral at elevated temperature. The resulting carbonatable mineral having carbonate compounds can be used as a pozzolan, aggregate, plant nutrient, soil enriching mineral treatments, soil properties modification, soil cement, mineral filler for polymeric foams, plastics, rubber and the like, as well as the manufacturing of a blended cement mix that includes a natural pozzolan with a basaltic or intermediate basaltic chemistry. More particularly, the present invention relates to carbon mineralization or sequestration by delivering $CO_2$ (i.e.; combining, addition, blending, exposure or otherwise mixing) into a cementitious material containing a carbonatable mineral such as hyaloclastite, lava, volcanic ash, fly ash, bottom ash, slag or any other carbonatable mineral with a basaltic or intermediate basaltic chemistry or containing sufficient amount of carbonatable elements such as un-carbonated Ca, Mg, Na, K, Fe and the like, that when reduced in size and optionally dissolved in an alkaline or acidic solution, reacts with carbon dioxide at ambient or elevated temperature, creates carbonates or other carbon containing complex minerals thereby carbon dioxide is mineralized into a permanent state of sequestration. The present invention further relates to carbon mineralization or sequestration by delivering $CO_2$ combined with a carbonatable mineral into an alkaline or acidic solution, such as concrete or a soil. The present invention further relates to carbon mineralization or sequestration by delivering $CO_2$ into a cementitious material that contains a carbonatable mineral such as hyaloclastite, volcanic ash or pumice, fly ash, bottom ash, slag and/or other carbonatable minerals and a carbonation aid or a microporous material used as a $CO_2$ delivery vehicle into the alkaline or acidic solution such as mortar paste thereby providing an internal carbonation process of the carbonatable elements to be dissolved into the alkaline or acidic solution such as the mortar and react or combine with the carbon dioxide. The present invention further relates to carbon mineralization or sequestration by delivering carbon dioxide into concrete or mortar containing a carbonatable mineral such as hyaloclastite, volcanic ash, pumice, fly ash, bottom ash, slag and the like with a basaltic or intermediate basaltic chemistry or containing sufficient amount of carbonatable elements or into a cementitious material that contains a carbonatable mineral such as hyaloclastite, volcanic ash or pumice with a basaltic or intermediate basaltic chemistry or containing a sufficient amount of carbonatable elements. The present invention also relates to a method of carbon mineralization or sequestration by combining $CO_2$ with a carbonatable mineral such as hyaloclastite, volcanic ash, pumice, fly ash, bottom ash, slag and any other a carbonatable mineral based cementitious material. The present invention further relates to carbon mineralization or sequestration by reducing in size of a carbonatable mineral such as hyaloclastite, lava, fly ash, bottom ash, slag and the like, containing non-carbon-embodied carbonatable elements such as calcium, magnesium, sodium, potassium, iron and the like, where the carbonatable mineral surface area is greatly increased in the presence of carbon dioxide at elevated temperature, wherein the $CO_2$ will chemically react with uncarbonated calcium, magnesium, sodium, potassium, iron and the like and result in carbonates such as calcium carbonate and other carbonate compounds thereby binding the carbon to the new carbonated mineral. In addition, the present invention relates to a method of carbon mineralization or sequestration comprising a carbonatable mineral such as hyaloclastite, lava, volcanic ash, fly ash, bottom ash, slag and/or any other carbonatable minerals. This present invention also relates to manufacturing of a pozzolan or other minerals from a natural or man-made carbonatable mineral with a basaltic or intermediate basaltic chemistry or other similar chemistry that contains non-carbon-embodied or un-carbonated Ca such as CaO or $Ca(OH)_2$ and optionally one or more un-carbonated element or compounds, such as Mg or MgO, Fe or FeO, K or $K_2O$, Na or $Na_2O$, by combining $CO_2$ during the manufacturing process, such as during grinding, or by blending $CO_2$ at an earlier or later processing stage or at all of those stages at ambient or elevated temperatures and at atmospheric, sub atmospheric or greater than atmospheric pressure. The present invention also relates to the manufacture of a carbon mineralizing compound from a carbonatable mineral containing non-carbon-embodied carbonatable elements and adding a carbonation aid or a $CO_2$ adsorbent or absorbent microporous material or combinations or mixtures thereof. The present invention further relates to a method of mixing $CO_2$ into concrete or mortar with portland cement, portland limestone cement, slag cement, lime, hydrated lime or quick lime (CaO) and a carbonatable mineral such as hyaloclastite, volcanic ash, pumice, fly ash, bottom ash, slag, based pozzolan, which results in a chemical reaction that carbonates un-carbonated compounds or elements thereby sequestering $CO_2$. The present invention also relates to a method of delivering $CO_2$ into concrete comprising a cementitious material based on a carbonatable mineral such as hyaloclastite, volcanic ash, pumice, fly ash, bottom ash, slag and the like activated by a compound having a reactive hydroxyl group (e.g.; a compound having a reactive hydroxyl group such as CaOH, NaOH or KOH). In addition, the present invention relates to a method of carbon mineralization or sequestration comprising a carbonatable mineral such as hyaloclastite, volcanic ash, pumice, fly ash, bottom ash, slag and the like-based pozzolan or a carbonatable mineral such as hyaloclastite, volcanic ash or pumice-based cementitious material with a basaltic or intermediate basaltic chemistry activated by either portland cement, limestone portland cement, slag cement, lime, an alkaline solution, a soil, a carbonatable cement or a compound having a reactive hydroxyl group. The present invention also relates to manufacturing of a pozzolan from a natural mineral with a basaltic or intermediate basaltic chemistry that contains un-carbonated CaO and optionally one or more un-carbonated compounds, such as MgO, FeO, $K_2O$, $Na_2O$, by injecting $CO_2$ during the manufacturing process, such as during grinding, or blending $CO_2$ at an earlier or later processing stage or at all stages. The present invention also relates to the manufacture of a pozzolan from a carbonatable mineral with a basaltic or intermediate basaltic chemistry and adding a carbonation aid or a carbon adsorbent microporous material and combining the carbonation aid or microporous material with $CO_2$ or a combination thereof and combining the carbonatable mineral powder and each of the carbonation aid, microporous material or $CO_2$ individually or in any combination thereof.

BACKGROUND OF THE INVENTION

Great emphasis has been placed on carbon capture and sequestration technologies to remove carbon dioxide from the emission sources or from the atmosphere. While currently there is only a relatively small amount of all carbon emissions captured, as this technology is adopted, an ever increasing amount of carbon dioxide will be needed to be stored or permanently removed from the atmosphere. In certain industries and locations, the currently proposed solution is for carbon dioxide to be stored in geological formations at depth into the earth crust or mineralize it in basalt formations. These methods depend on the carbon dioxide being captured or collected and transported from the place of emissions to a place suitable for storage or mineralization. Carbon dioxide transportation requires pure $CO_2$ gas to be liquefied as well as new infrastructure for collecting and transporting to a sequestration site. It would be desirable to capture and mineralize carbon at the carbon producing site, such as a power plant or cement plant from a gas stream with less than pure $CO_2$ concentrations and permanently removing it from the atmosphere by mineralization using carbonatable minerals available in relatively close proximity to the carbon producing site.

The portland cement industry has been under pressure to reduce the amount of $CO_2$ emissions per ton of cement produced. One way to reduce the carbon footprint of cement is to reduce the clinker factor from the total cement content. Historically, portland cement has used ground limestone to reduce the clinker factor. The ground limestone percentage varies anywhere from 5-35% based on different countries and applications. Ground limestone works as an inert filler and does not have any cementitious or pozzolanic properties. Another way to reduce the carbon footprint and clinker factor is to replace clinker with slag cement in various percentage depending of the jurisdiction and the application. Another method to reduce the clinker factor is to substitute clinker with a pozzolan. Historically, fly ash has been used in various percentages alongside clinker of portland cement depending on the jurisdiction and application and varied from 5%-80%. However, due to many coal power plant closures, the fly ash market has experienced significant shortages which increased demand for other types and sources of pozzolans. Natural pozzolans are currently in greater demand to replace fly ash either in the portland cement types or in concrete.

Another way to reduce the carbon footprint of cement manufacture is to capture a portion of the $CO_2$ gas released during the calcining process. This requires significant investments and changes in the calcining and clinker manufacturing processes. The portland cement industry is slowly adapting these new technologies to existing plants. Capturing $CO_2$ is an important step in the reduction of the $CO_2$; however, it presents its own challenges. Once $CO_2$ is captured, it then needs to be stored and sequestered into a permanent form such that the $CO_2$ is not significantly released back into the atmosphere. One of the biggest challenges at the moment is what to do with the $CO_2$ captured from portland cement manufacture, as well as from many other industrial processes. During the clinker manufacturing process, limestone, silica, alumina and minor additional minerals are placed into a kiln where the limestone is calcined under high temperature and combined with the other constituents to create clinker. The calcination process where the carbon dioxide is released from the calcium carbonate generates the most amount of the carbon dioxide of the portland cement manufacturing process manufacturing process. Similarly, the lime manufacturing process by calcining lime or dolomite at high temperature releases the carbon dioxide from the calcium carbonate or calcium magnesium carbonate. The kiln exhaust gas from either the portland cement clinker or lime manufacturing process has a high carbon dioxide concentration being composed mainly of nitrogen and carbon dioxide. Current methods of removing the carbon dioxide from the kiln exhaust gas are very energy intensive process that require extensive capital investment in equipment and involves high operating costs. Other methods of capturing the carbon dioxide such as indirect limestone calcination and removal have been proposed. This method is also a very expensive method of limestone calcination that requires substantial capital investments. The carbon dioxide used to mineralize the carbonatable elements of carbonatable minerals, in accordance with the present invention, can be the product of any type of carbon capture process from any carbon emission source. However, it would be desirable to use and remove the carbon dioxide from exhaust kiln gas by direct mineralization using a mineral with carbonatable elements or compounds such as hyaloclastite, lava, volcanic ash, fly ash, bottom ash, slag or any other natural or man-made mineral that contains carbonatable elements as described in accordance with the current invention. Additionally, the ground, fine powder of carbonatable minerals or elements can be encapsulated or pelletize into granules using a polymer coating or any other suitable method for long term storage or other suitable applications.

Fossil fuel burning power plants contribute significantly to carbon emissions. Generally, these plants are either burning coal or have been converted from coal to gas burning units. There are significant amounts of ashes containing carbonatable elements in close proximity to these plants. These carbonatable minerals can be used to mineralize and therefore permanently remove carbon from the atmosphere by mineralization.

Concrete has been proposed to be used as a carbon sink, however the total amount of $CO_2$ emission far exceeds the capacity of concrete carbon mineralization storage capacity. Therefore, it is desirable to find additional materials and processes to mineralize carbon dioxide in cementitious materials.

More recently, the concept of injecting $CO_2$ into fresh concrete during the mixing process claims to help cure concrete by a carbonation process. An issue with this process is that portland cement is not lime (CaO) to be carbonated, it is made of a complex matrix, composed of the following:

Alite ($C_3S$): tricalcium silicate ($3CaO \cdot SiO_2$), Belite ($C_2S$): dicalcium silicate ($2CaO \cdot SiO_2$), $C_3A$: tricalcium aluminate ($3CaO \cdot Al_2O_3$), and a $C_4AF$: tetra-calcium aluminoferrite ($4CaO \cdot Al_2O_3Fe_2O_3$). A typical example of cement contains 50-70% $C_3S$, 15-30% $C_2S$, 5-10% $C_3A$, 5-15% $C_4AF$, and 3-8% other additives or minerals (such as oxides of calcium and magnesium). It is the hydration of the calcium silicate, aluminate, and aluminoferrite minerals that causes the hardening, or setting, of cement. Portland cement may only contain 1-2% of free lime (CaO) In simple terms the cement hydration process creates calcium silicate or aluminate hydrate and not calcium carbonates.

The Portland Cement Association (PCA) defines carbonation as follows: Concrete is a porous material, like a sponge. $CO_2$ is absorbed by any exposed concrete surface and when that $CO_2$ reacts with the calcium hydroxide, the byproduct of cement hydration, it forms a calcium carbonate mineral and the carbon is permanently captured. Carbonation is a naturally occurring process where $CO_2$ in the air reacts with the calcium hydroxide in concrete forming calcium carbonate, a naturally occurring mineral that is a common ingredient in everything from toothpaste to antacids. In addition to passive carbon capture, $CO_2$ can also be injected into fresh concrete or introduced under pressure in chambers containing concrete products as a solution for storing captured carbon. This is a description of conventional portland cement concrete mixes where the calcium hydroxide generated by the cement hydration process is available to react with carbon dioxide and carbonate.

The manufacture of portland cement generates significant amounts of $CO_2$. By some estimates as much as 7% of global $CO_2$ emission can be traced to the manufacture of portland cement. As a result, great emphasis is being placed on the reduction of $CO_2$ from the cement manufacture, such as carbon capture and carbon mineralization or sequestration. As noted above, $CO_2$ has been injected into fresh concrete with a goal of the $CO_2$ reacting with certain components of the concrete mix to absorb or adsorb the $CO_2$, and therefore mineralize or sequester the $CO_2$ in the fresh concrete. However, the constituents of cement and concrete mixes are poor absorbers of $CO_2$ and most of the injected $CO_2$ is unreacted and potentially lost back into the atmosphere. Fly ash, and other pozzolans in particular, compete for calcium hydroxide in a concrete mix and carbon mineralization or sequestration in a pozzolan mix is unlikely. The reason is that conventional pozzolans contain relatively large amounts of silica and alumina that when combined with the calcium hydroxide create silicate hydrates and aluminosilicate and not carbonates. In other words, traditional pozzolans do not have the proper chemistry; i.e., elements available to react with carbon dioxide to create carbonates. Examples of these would be uncarbonated calcium compounds, such that $CO_2$ can react with the calcium compounds, such as CO, to form $CaCO_3$, and mineralize or sequester $CO_2$ in the concrete, uncarbonated magnesium, sodium, potassium, iron and the like that can create simple carbonates or crystalline structures that contains $CO_3$. Additionally, in the prior art $CO_2$ has been injected into concrete or mortar paste in a gaseous or liquid state and this is a limiting factor to the quantity of $CO_2$ possible to be injected. The present invention proposes to delivery additional and increased quantities of $CO_2$ bound to a $CO_2$ delivery vehicle such as a carbonation aid, a carbon adsorption or absorption enhancing compound or a microporous material that would deliver increased amount of $CO_2$ into an alkaline or acidic solution where the carbonatable elements can react and mineralize, such as concrete paste, soil or seawater.

Therefore, it would be desirable to have a natural pozzolan that in addition to forming calcium silicate hydrate and calcium aluminates, also contain elements that can react with carbon dioxide to create carbonates and minerally sequester $CO_2$. It would also be desirable to have a natural pozzolan that when combined with portland cement produces a concrete with improved physical properties compared to straight portland cement-based concrete. It would be desirable in accordance with the present invention to capture and minerally carbonate the carbon dioxide from the calcination process of the cement clinker and lime manufacturing process from the kiln exhaust gases and sequester it by mineralization using a natural or man-made mineral with carbonatable elements such as hyaloclastite, lava, volcanic ash, fly ash, bottom ash, boiler slag, iron slag or any other type of slag or natural or man-made minerals that have carbonatable elements that when fractured and reduced in size to a fine particle size in the presence of carbon dioxide at elevated pressure and temperature will react with the carbon dioxide to create carbonates or other carbon contain compounds. It would also be desirable in accordance with the present invention to capture and minerally carbonate the carbon dioxide from the coal or natural gas burning power plants from the exhaust gases produced thereby and sequester the carbon dioxide by mineralization using a natural or man-made carbonatable mineral containing carbonatable elements such as hyaloclastite, lava, volcanic ash, fly ash, bottom ash, boiler slag, iron slag or any other type of slag or natural or man-made mineral that has carbonatable elements that when fractured and reduced in size to a fine particle size in the presence of carbon dioxide at elevated pressure and temperature will react with the carbon dioxide to create carbonates or other carbon contain compounds. It would be desirable in accordance with the present invention to capture and minerally carbonate the carbon dioxide from the steel manufacturing process, or any other manufacturing process, from the exhaust gases thereby and sequester carbon dioxide by mineralization using a natural or man-made mineral with carbonatable elements such as hyaloclastite, lava, volcanic ash, fly ash, bottom ash, boiler slag, iron slag or any other type of slag or natural or man-made mineral that has carbonatable elements that when fractured and reduced in size to a fine particle size in the presence of carbon dioxide at elevated pressure and temperature will react with the carbon dioxide to create carbonates or other carbon contain compounds.

Additionally, it would be desirable to have a process consisting of delivering a sufficient amount of $CO_2$ embedded, adsorbed or absorbed into a carbonation aid or a microporous material that serves to be a CO2 delivery vehicle into an acidic or alkaline solution such as cement or alkaline paste along with a mineral that in addition to forming calcium silicate hydrate and calcium aluminates, also contains elements that can react with carbon dioxide to create carbonates and mineralize $CO_2$. It would also be desirable to have a natural pozzolan or mineral combined with a carbonation aid or a microporous material containing $CO_2$ that when combined with lime, hydrated lime, non-hydraulic cement or an alkaline paste the carbonatable elements dissolve in the alkaline paste and react with the $CO_2$ to create carbonatable minerals as well as conventional concrete minerals.

SUMMARY OF THE INVENTION

The present invention satisfies the foregoing needs by providing a carbonatable natural or man-made mineral or pozzolan that in addition to silica and alumina that can be activated by calcium hydroxide to power the pozzolanic reaction, also contains uncarbonated elements that can react, either directly or indirectly, with $CO_2$ to form various carbonate compounds.

In one disclosed embodiment, the present invention comprises a natural or man-made mineral with a mean particle size sufficiently small or a surface area sufficiently large and a porosity such that when exposed to carbon dioxide at elevated temperature and pressure, the carbon dioxide is adsorbed on the surface of the pozzolan particle or absorbed by the carbonatable minerals.

In another disclosed embodiment, the present invention comprises a natural or man-made carbonatable mineral with a chemical composition comprising approximately 20% to approximately 65 percent by weight $SiO_2$, approximately 1% to approximately 30 percent by weight $Al_2O_3$, and approximately 4% to approximately 60 percent by weight CaO and wherein the natural or man-made carbonatable mineral has a volume-based mean particle size less than or equal to approximately 100 μm such that when exposed to carbon dioxide at elevated temperature and pressure at least a portion of the Ca, or any other carbonatable element, reacts with the $CO_2$ to form a solid substance and thereby capture, mineralize or otherwise sequester the $CO_2$.

In another disclosed embodiment, the present invention comprises a natural or man-made carbonatable mineral with a chemical composition comprising approximately 20% to approximately 65 percent by weight $SiO_2$, approximately 1% to approximately 30 percent by weight $Al_2O_3$, approximately 4% to approximately 60 percent by weight CaO and approximately 1% to approximately 20 percent by weight MgO and wherein the natural or man-made carbonatable mineral has a volume-based mean particle size less than or equal to approximately 100 μm such that when exposed to carbon dioxide at least a portion of the CaO and MgO reacts with the $CO_2$ to form a solid substance and thereby capture, mineralize or otherwise sequester the $CO_2$.

In another disclosed embodiment, the present invention comprises a carbonatable mineral from one or more of hyaloclastite, lava, volcanic ash, fly ash, bottom ash or slag with a basaltic or intermediate basaltic chemistry or sufficient amounts of carbonatable elements and having a volume-based mean particle size sufficiently small or a surface area sufficiently large and porosity such that when exposed to carbon dioxide, the carbon dioxide is adsorbed on the surface or the pores of the carbonatable mineral from one or more of the hyaloclastite, lava, volcanic ash, fly ash, bottom ash, slag or any other mineral with sufficient amount of carbonatable elements particles or absorbed by the carbonatable mineral particles.

In another disclosed embodiment, the present invention comprises delivering a carbonatable mineral containing uncarbonated (non-carbon-containing) carbonatable elements, selected from one of more of hyaloclastite, volcanic ash, pumice, fly ash, bottom ash, slag and/or other carbonatable minerals; processing the mineral in a mill so that the processed hyaloclastite, lava, volcanic ash, pumice with a basaltic or intermediate basaltic chemistry has a volume-based mean particle size of less than 100 μm and exposing the carbonatable mineral to carbon dioxide in gaseous, liquid or solid form during or after the particle reduction process and/or combining or adding a $CO_2$ adsorbent enhancer and or a carbonation accelerant to the said mineral either during the milling process or any time after the milling process. The $CO_2$ adsorbent or carbonation enhancing compound is one or more of an amine, an ammonium salt, a metal-oxide framework, a a microporous material such as a carbon microporous material, a zeolite, an enzyme, an amino acid, a quinone, an ionic liquid, a porous organic polymer, a covalent-organic framework or combinations or mixtures of two or more of the foregoing. Alternatively the process can be configured to combine $CO_2$ with any one or more of the $CO_2$ adsorbent or adsorption enhancing product or microporous materials such as more of an amine, an ammonium salt, a metal-oxide framework, a carbon microporous material, a zeolite, an enzyme, an amino acid, a quinone, an ionic liquid, a porous organic polymer, a covalent-organic framework or combination or mixtures of two or more of the foregoing and then further combining the $CO_2$ saturated compound with one or more uncarbonated minerals containing un-carbonated elements such as hyaloclastite, lava, volcanic ash or pumice, fly ash, bottom ash, slag and/or other minerals containing carbonatable elements in an un-carbonated state reduced in size and further combined with an alkaline or acidic solution.

In another disclosed embodiment, the present invention comprises a carbonatable mineral such as hyaloclastite, lava, volcanic ash, fly ash, bottom ash, slag or any other natural or man-made mineral containing carbonatable elements such as a basaltic or intermediate basaltic chemistry and wherein the carbonatable mineral has a volume-based mean particle size less than or equal to approximately 100 μm such that when exposed to carbon dioxide at least a portion of the $CO_2$ is adsorbed or absorbed on the particles and reacts with the carbonatable elements contained in therein over time.

In another disclosed embodiment, the present invention comprises a method. The method comprises delivering a natural or man-made mineral comprising approximately 20 to approximately 65% by weight $SiO_2$, approximately 1 to approximately 30% by weight $Al_2O_3$, 0 to approximately 30% by weight $Fe_2O_3$, approximately 4 to approximately 45% by weight CaO, approximately 1 to approximately 20% by weight MgO to a mill suitable for fracturing and reducing the particle size of the natural or man-made carbonatable mineral having either on open or closed gas circuit; processing the natural or man-made carbonatable mineral in the mill so that the processed carbonatable mineral has a volume-based mean particle size of less than or equal to 100 μm and exposing the natural pozzolan to carbon dioxide in gaseous, liquid or solid form either during or after the particle reduction process.

In another disclosed embodiment, the present invention comprises a method. The method comprises delivering a carbonatable mineral composed of one or more of hyaloclastite, lava, volcanic ash, fly ash, bottom ash, slag or any other mineral with sufficient carbonatable elements to a mill suitable for reducing the particle size of the carbonatable mineral; processing the carbonatable mineral in the mill so that the processed carbonatable mineral has a volume-based mean particle size of less than or equal to 100 μm and exposing the carbonatable mineral to carbon dioxide from any carbon capture process or from direct exhaust gas or calcination process, in gaseous, liquid or solid form either during or after the particle reduction process.

In another disclosed embodiment, the present invention comprises a method. The method comprises mixing lime: i.e., hydrated lime or quick lime, and a carbonatable mineral having a volume-based mean particle size of less than or equal to approximately 100 μm and exposing the mixture to $CO_2$.

In another disclosed embodiment, the present invention comprises a method. The method comprises mixing a hydraulic cement, a protein and one or more carbonatable minerals having a volume-based mean particle size of less than or equal to approximately 100 μm and exposing the mixture to $CO_2$.

In another disclosed embodiment, the present invention comprises a method. The method comprises mixing an aqueous alkaline activating solution suitable for forming a geopolymer and a carbonatable mineral with a chemical composition comprising approximately 20 to approximately 65% by weight $SiO_2$, approximately 2 to approximately 18% by weight $Al_2O_3$, 0 to approximately 18% by weight $Fe_2O_3$, approximately 2 to approximately 45% by weight CaO, and approximately 1 to approximately 15% by weight MgO, wherein the natural pozzolan has a volume-based mean particle size of less than or equal to approximately 100 μm and exposing the mixture to $CO_2$.

In another disclosed embodiment, the present invention comprises a method. The method comprises combining a microporous material having $CO_2$ adsorbed or absorbed thereon with a hydraulic cement or an alkaline solution and a carbonatable mineral with a chemical composition comprising approximately 40% to approximately 65% by weight $SiO_2$, approximately 10% to approximately 18% by weight $Al_2O_3$, approximately 4% to approximately 18% by weight FeO, approximately 4% to approximately 20% by weight CaO, approximately 3% to approximately 15% by weight MgO, wherein the natural pozzolan or mineral has a volume-based mean particle size of less than or equal to approximately 100 μm.

In another disclosed embodiment, the present invention comprises a method. The method comprises combining a microporous material having $CO_2$ adsorbed or absorbed thereon with a mixture of a hydraulic cement or alkaline solutions and hyaloclastite having a volume-based mean particle size of less than or equal to approximately 100 μm.

Accordingly, it is an object of the present invention to provide an improved method for mineralizing or sequestering $CO_2$.

It is an object of the present invention to provide a carbonatable mineral that can sequester or mineralize $CO_2$.

Another object of the present invention is to provide an improved natural pozzolan that can sequester or mineralize $CO_2$.

Another object of the present invention is to provide an improved concrete or mortar that can sequester or mineralize $CO_2$.

Another object of the present invention is to provide a viable and cost-effective way to minerally sequester significant amount of $CO_2$ with a natural or man-made carbonatable mineral.

A further object of the present invention is to provide an improved supplementary cementitious material that can sequester or mineralize $CO_2$.

Another object of the present invention is to provide a product comprising a carbonation aid and a carbonatable mineral containing one or more un-carbonated Ca, Mg, Na, K, Fe, wherein the carbonation aid facilitates the conversion of one or more of CaO, MgO, $Na_2O$, $K_2O$ or FeO to a carbonate or a $CO_3$ containing mineral in the presence of $CO_2$ and wherein one or more of the carbonation aid or the carbonatable mineral have carbon dioxide bound thereto at a concentration greater than its atmospheric concentration.

Another object of the present invention is to provide a product comprising a carbon dioxide sorbent microporous material and a carbonatable mineral containing one or more of un-carbonated Ca, Mg, Na, K, Fe, wherein the carbon dioxide sorbent microporous material facilitates the conversion of one or more of CaO, MgO, Na2O, K2O or FeO to a carbonate or a $CO_3$ containing mineral in the presence of $CO_2$ and wherein one or more of the carbon dioxide sorbent microporous material or the carbonatable mineral containing one or more un-carbonated Ca, Mg, Na, K, Fe, have carbon dioxide bound thereto at a concentration greater than its atmospheric concentration.

These and other objects, features and advantages of the present invention will become apparent after a review of the following detailed description of the disclosed embodiments and the appended drawing and claims.

BRIEF DESCRIPTION OF THE DRAWING

FIG. 1 is flow diagram of a disclosed embodiment of a pozzolan processing plant in accordance with the present invention.

DETAILED DESCRIPTION OF THE DISCLOSED EMBODIMENTS

Hyaloclastite is a hydrated tuff-like breccia typically rich in black volcanic glass, formed during volcanic eruptions under water, under ice or where subaerial flows reach the sea or other bodies of water. It has the appearance of angular fragments sized from approximately a millimeter to a few centimeters. Larger fragments can be found up to the size of pillow lava as well. Several minerals are found in hyaloclastite masses including, but not limited to, sideromelane, tachylite, palagonite, olivine, pyroxene, magnetite, quartz, hornblende, biotite, hypersthene, feldspathoids, plagioclase, calcite and others. Fragmentation can occur by both an explosive eruption process or by an essentially nonexplosive process associated with the spalling of pillow basalt rinds by thermal shock or chill shattering of molten lava. The water-quenched basalt glass is called sideromelane, a pure variety of glass that is transparent, and lacks the very small iron-oxide crystals found in the more common opaque variety of basalt glass called tachylite. In hyaloclastite, these glassy fragments are typically surrounded by a matrix of yellow-to-brown palagonite, a wax-like substance that forms from the hydration and alteration of the sideromelane and other minerals. Depending on the type of lava, the rate of cooling and the amount of lava fragmentation, the particle of the volcanic glass (sideromelane) can be mixed with other volcanic rocks or crystalline minerals, such as olivine, pyroxene, magnetite, quartz, plagioclase, calcite and others.

Hyaloclastite is usually found within or adjacent subglacial volcanoes, such as tuyas, which is a type of distinctive, flat-topped, steep-sided volcano formed when lava erupts under or through a thick glacier or ice sheet. Hyaloclastite ridges are also called tindars and subglacial mounds are called tuyas or mobergs. They have been formed by subglacial volcanic eruptions during the last glacial period. A subglacial mound is a type of subglacial volcano. This type of volcano forms when lava erupts beneath a thick glacier or ice sheet. The magma forming these volcanoes was not hot enough to melt a vertical pipe through the overlying glacial ice, instead forming hyaloclastite and pillow lava deep beneath the glacial ice field. Once the glacier retreated, the subglacial volcano was revealed, with a unique shape as a result of its confinement within the glacial ice. Subglacial volcanoes are somewhat rare worldwide, being confined to regions that were formerly covered by continental ice sheets and also had active volcanism during the same period. Currently, volcanic eruptions under existing glaciers may create hyaloclastite as well. Hyaloclastite tuff-like breccia is a pyroclastic rock comprised of glassy juvenile clasts contained in a fine-grained matrix dominated by glassy shards. Hyaloclastite breccias are typically products of phreatomagmatic eruptions in particular associated with the eruption of magmas into bodies of water and form by fragmentation of chilled magma. They are often formed from basaltic magmas and are associated with pillow lavas and sheet flows. In addition, any other type of lava, such as intermediate, andesitic, dacitic and rhyolitic, can form hyaloclastite under similar rapid cooling or quenching conditions.

Sometimes a subglacial or subaquatic eruption may produce a release of volcanic ashes that are ejected into the atmosphere which can then land back on the ground. At times a fine volcanic particle size may be called a "volcanic ash" by different professionals in the geological field even though the ash definition may be debatable. It is also possible that a subglacial or subaquatic eruption may have been produced by a magma with high volume of gas entrapped in the lava. The high volume of gas exsolution may create a mineral with very high porosity or vesicular structure and bulk density similar to scoria or pumice.

Natural pozzolans, such as hyaloclastite, volcanic ash, or pumice, can be classified based on the amount of silica content as: basaltic (less than 53% by weight $SiO_2$), intermediate (approximately 53-57% by weight $SiO_2$), or silicic such as andesitic (approximately 57-63% by weight $SiO_2$), dacitic (approximately 63-69% by weight $SiO_2$), or rhyolitic (greater than 69% by weight $SiO_2$). However, for the purpose of this invention the basaltic range starts at 40% $SiO_2$ and the andesitic range ends at 65% $SiO_2$.

Basaltic hyaloclastite, volcanic ash or pumice contains generally 40% to 53% by weight silica ($SiO_2$) contained in an amorphous or crystalline form or a combination thereof essentially calcic plagioclase feldspar and pyroxene (usually Augite), with or without olivine. In addition to silica, basaltic hyaloclastite, volcanic ash or pumice generally comprises approximately 10 to approximately 18 percent by weight $Fe_2O_3$, approximately 6 to approximately 18 percent by weight CaO, approximately 5 to approximately 15 percent by weight MgO and other elements in various percentages. Intermediate basaltic hyaloclastite, volcanic ash or pumice generally comprises approximately 53 to approximately 57 percent by weight silica ($SiO_2$) content. In addition to silica, intermediate basaltic hyaloclastite, volcanic ash or pumice generally comprises approximately 5 to approximately 10 percent by weight $Fe_2O_3$, approximately 6 to approximately 10 percent by weight CaO, approximately 3 to approximately 10 percent by weight MgO and other elements in various percentages.

Basaltic hyaloclastite, volcanic ash or pumice can also contain crystalline elements, such as quartz, hornblende, biotite, hypersthene (an orthopyroxene) and feldspathoids. The crystalline elements found in lava quenched by water are of a microcrystalline type which is different from the same type of crystalline elements found in a subaerial lava eruption that is cooled slowly and therefore crystalizes slowly over time. In other words, there is a difference between the crystal lengths of the same type from lava that is quenched by water that arrested crystal development therefore creating either amorphous or microcrystalline elements or a combination thereof and lava that is cooled slowing over time and therefore created no significant amount of amorphous content but only crystalline elements where the crystal length or matrix are much larger. Therefore, hyaloclastite or lava quenched by water when reduced in size to a powder, its elements dissolve into an alkaline or acidic solution with the amorphous elements being first to dissolve, followed by the microcrystalline elements or matrix. By comparison the crystalline elements from lava formed from subaerial eruptions that cooled slowly over time, take longer to dissolve in the same solution at the same particle size and in some cases may not dissolve. Volcanic ashes and pumices are similar to the lava quenched by air in the sense that due to the fine pulverized size of the ash or the substantial micro porosity of the pumice, they cooled rapidly and arrested or limited the formation of large crystalline elements in essence creating an amorphous or microcrystalline elements, matrix or structure or a combination thereof. The average specific density of basaltic hyaloclastite, volcanic ash or pumice is approximately 2.7-3.0 $gm/cm^3$.

Andesite is an abundant igneous (volcanic) rock of intermediate composition, with aphanitic to porphyritic texture. In a general sense, it is an intermediate type between basalt and dacite. Andesitic hyaloclastite, volcanic ash or pumice ranges from approximately 57 to approximately 63 percent by weight silicon dioxide ($SiO_2$). For the purpose of this invention, we extend the andesite $SiO_2$ content up to 65%. In addition to silica, andesitic hyaloclastite, volcanic ash or pumice generally comprises approximately 5 to approximately 10 percent by weight $Fe_2O_3$, approximately 5 to approximately 10 percent by weight CaO, approximately 3 to approximately 8 percent by weight MgO and other elements in various percentages.

Dacite is an igneous, volcanic rock with an aphanitic to porphyritic texture and is intermediate in composition between andesite and rhyolite and ranges from approximately 63% to approximately 69% by weight silicon dioxide ($SiO_2$). In addition to silica, dacite generally contains approximately 4 to approximately 8% by weight $Fe_2O_3$, approximately 3 to approximately 8% by weight CaO, approximately 1 to approximately 6% by weight MgO and other elements in various percentages. It consists mostly of plagioclase feldspar with biotite, hornblende, and pyroxene (augite and/or enstatite). It has quartz as rounded, corroded phenocrysts, or as an element of the ground-mass. The plagioclase ranges from oligoclase to andesine and labradorite. Sanidine occurs, although in small proportions, in some dacites, and when abundant gives rise to rocks that form transitions to the rhyolites. The groundmass of these rocks is composed of plagioclase and quartz.

Rhyolite is an igneous (volcanic) rock of felsic (silica-rich) composition, typically greater than 69% by weight $SiO_2$. In addition to silica, rhyolite generally contains 0 to approximately 5% by weight $Fe_2O_3$, approximately 0.5 to approximately 6% by weight CaO, 0 to approximately 2% by weight MgO and other elements in various percentages. It may have a texture from glassy to aphanitic to porphyritic. The mineral assemblage is usually quartz, sanidine and plagioclase. Biotite and hornblende are common accessory minerals.

Fly ash is a by-product of the combustion of pulverized coal in electric power generation plants. When the pulverized coal is ignited in a combustion chamber, the carbon and volatile materials are burned off. When mixed with lime and water, fly ash forms a compound similar to portland cement. Two classifications of fly ash are produced according to the type of coal from which the fly ash is derived. Class F fly ash is normally produced from burning anthracite or bituminous coal that meets applicable requirements. This class of fly ash has pozzolanic properties and will have minimum amounts of silica dioxide, aluminum oxide and iron oxide of 70%. Class F fly ash has a chemical composition that is similar to the basaltic or basaltic intermediate hyaloclastite, lava or volcanic ash, in that it contains similar non-carbon embodied or un-carbonated carbonatable elements such as Ca, Mg, Na, K and the like. Class F type ash has amounts of carbonatable elements or compounds such as CaO between 7-15% MgO between 2-5% and other alkali of up to 10%. When Class F fly ash is fractured or reduced in size by grinding, microwave comminution or other methods as described in accordance with the present invention, to create a powder of fine particle size, it expose fresh surface with far greater surface area and increased porosity that in the presence of carbon dioxide, at elevated or ambient temperature, the carbon is adsorbed or absorbed onto the surface or into its pores, and reacts with the carbonatable elements thereby is mineralized in various types of carbonates and/or other compounds containing carbon as part of the mineral structure. Class F fly ash also contains 50-60% of $SiO_2$, 15-30% $Al_2O_3$ that have pozzolanic properties when used in concrete or mixed with a compound having an active hydroxyl group, such as NaOH. The carbonatable elements found in fly ash do not contribute to the pozzolanic reaction so the carbon dioxide mineralization does not affect the pozzolanic properties of the fly ash. In other words, a carbonated Class F fly ash retains its pozzolanic properties and its carbonatable elements can sequester carbon dioxide by mineralization. Class F fly ash is generally used in hydraulic cement at dosage rates of 15% to 30% by weight, with the balance being portland cement, however when carbonated the fly ash dosage rates may change. Class F fly ash is carbonated by the process described above, can retain all other current uses, aside from being used as a pozzolan, such as geo-polymers, mineral fillers, soil cement, soil remediation, and the like as well as simply being placed in a pond or landfill storage.

Class C fly ash is normally produced from lignite or subbituminous coal that meets applicable requirements. Class C type ash has even greater amounts of carbonatable elements or compounds than Class F fly ash, such as CaO between 20-30%, MgO between 2-8% and other alkali of up to 10%. When Class C fly ash is fractured and reduced in size by grinding, microwave comminution or other methods as described in accordance with the present invention, to create a powder of fine particle size, it exposes fresh surface with far greater surface area and increased porosity that in the presence of carbon dioxide, at elevated or ambient temperature, the carbon is mineralized in various types of carbonates and other compounds containing carbon as part of the mineral structure. Class C fly ash also contains 30-45% of $SiO_2$, 10-20% $Al_2O_3$ that have pozzolanic properties when used in concrete or mixed with a compound having an active hydroxyl group, such as NaOH. In other words, a carbonated Class C fly ash retains its pozzolanic properties while by carbonating the Ca, Mg, Na, K and the like, mineralizes carbon dioxide. Class C fly ash is used in hydraulic cement at dosage rates of 15% to 40% by weight, with the balance being portland cement, however when carbonated the dosage rates may change. Class C fly ash that is carbonated using the process described above, can retain all other current uses, such as geo-polymers, mineral fillers, soil cement, soil remediation, and the like as well as simply being placed in a pond or landfill storage.

Bottom ash and boiler slag are also byproducts of the coal combustion process. These are classified by the type of coal burned into bituminous and sub-bituminous bottom ashes and boiler slags. Bituminous bottom ash or boiler slag has a chemical composition that is similar to basaltic or basaltic intermediate hyaloclastite, or Class F fly ash, in that it contains similar carbonatable and pozzolanic elements. Bituminous bottom ash and boiler slag have carbonatable elements or compounds such as CaO between 7-15% MgO between 2-5% and other alkali of up to 10%. When bituminous bottom ash or boiler slag is fractured and reduced in size by grinding, microwave comminution or other methods as described in accordance with the present invention, to create a powder of fine particle size, it exposes fresh surface with far greater surface area and increased porosity that in the presence of carbon dioxide, at elevated or ambient temperature, the carbon dioxide is mineralized into various types of carbonates and/or other compounds containing carbon as part of the compound structure. Bituminous bottom ash and slag also contains 45-60%, $SiO_2$, 20-30% $Al_2O_3$ that have pozzolanic properties when used in concrete or mixed with a compound having an active hydroxyl group, such as NaOH or KOH, to create a geo-polymer. In other words, a carbonated bituminous bottom ash or boiler slag retains its pozzolanic properties while it is using the carbonatable elements to sequester carbon dioxide by mineralization and the pozzolanic properties to contribute to the pozzolanic reaction. Bituminous bottom ash or boiler slag that is carbonated using the process described herein, can retain all other current uses, such as geo-polymers, mineral fillers, soil remediation, and the like as well as simply being placed in a pond or landfill storage.

Sub-bituminous coal produces bottom ash with higher amounts of carbonatable elements than bituminous coal with CaO between 10-30%, MgO between 2-8% and other alkali of up to 10%. Similarly, boiler slag from a sub-bituminous coal burning process has greater amounts of carbonatable elements or compounds when compared with boiler slag from bituminous type coal with CaO between 10-30% MgO between 2-8% and other alkali of up to 10%. When bottom ash or boiler slag is fractured and reduced in size by grinding, microwave comminution or other methods as described in accordance with the present invention, to create a powder of fine particle size, it exposes fresh surface with far greater surface area and increased porosity that in the presence of carbon dioxide, at elevated or ambient temperature, the carbon is mineralized in various types of carbonates and other compounds containing carbon as part of the mineral structure. Sub-bituminous bottom ash and slag also contains 30-45% of $SiO_2$, 10-20% $Al_2O_3$ that have pozzolanic properties when used in concrete or mixed with a compound having an active hydroxyl group, such as NaOH or KOH, to create a geopolymer. In other words, a carbonated sub-bituminous bottom ash or boiler slag retains its pozzolanic properties while using the carbonatable elements to sequester carbon dioxide by mineralization and the pozzolanic properties to contribute to the pozzolanic reaction. Sub-bituminous bottom ash or boiler slag that is carbonated using the process described herein can retain all other current uses, such as geopolymers, mineral fillers, soil remediation, and the like as well as simply being placed in a pond or landfill storage.

Coal burning power plants have significant amounts of coal fly ash, bottom ash and boiler slags stored, generally with bituminous coal by-products, in wet detention ponds and sub-bituminous coal by-products in dry storage landfills. In many cases these ashes or slags are found mixed together in the same storage pond or landfill. Any combination of fly ash, bottom ash and or boiler slag can be used to be processed in accordance with the present invention. When any combination thereof is fractured and reduced in size by grinding, microwave comminution or other methods as described in accordance with the present invention, to create a powder of fine particle size, it expose fresh surface with far greater surface area and increased porosity that in the presence of carbon dioxide, at elevated or ambient temperature, the carbon is mineralized in various types of carbonates and other compounds containing carbon as part of the mineral structure while also retaining some degree of pozzolanic properties depending on the chemical composition of the feed. It is estimated that the US alone has over 1 billion tons of ashes and boiler slag from coal burning power plants in detention ponds or landfills that can be reclaimed and used to mineralize carbon dioxide while still maintaining pozzolanic properties. Ashes or slags that are carbonated using the process described herein, can retain all other current uses, such as geopolymers, mineral fillers, soil remediation, and the like as well as simply being placed in a pond or landfill storage.

The carbon dioxide used to mineralize the carbonatable elements of the above can be the product of any type of carbon capture process from any carbon emission source. However, it would be desirable to use the carbon dioxide from coal or gas burning power plant exhaust gas to carbonate the different types of ash or slags produced by the coal burning process. The carbonated ash or slag can be used in various applications such as pozzolans in concrete or geopolymers, as aggregates or fillers or they can be placed back into landfills once the carbonatable elements have been combined with $CO_2$. Alternatively, the fly ash, bottom ash or slags can be used to mineralize carbon dioxide from other manufacturing processes such as portland cement or lime manufacture, steel production and the like. It would also be desirable to use and remove carbon dioxide from the exhaust gas of the hydrocarbon burning power plant by direct mineralization using a carbonatable mineral with carbonatable elements or compounds such as hyaloclastite, lava, slag or any other natural or man-made mineral that contains a sufficient amount of carbonatable elements as described in accordance with the current invention. Additionally, the ground, fine powder of carbonatable minerals containing carbonatable elements can be encapsulated or pelletize into granules using a polymer coating or any other suitable method for long term storage or other suitable applications.

Steel slag is the byproduct of the steel manufacturing process. While there are many subcategories of slag, the blast furnace and electric arc furnace steel manufacture processes are the primary sources. Blast furnace steel manufacturing processes use limestone as flux ingredient mixed with iron ore and coke. The high temperature from the coke combustion melts and separates the iron from the ore while creating the blast furnace steel slag. Generally, blast furnace steel slag is quenched by water to create granules of slag with hydraulic cementitious properties. The blast furnace steel slag has a chemical composition of 40-50% CaO, 4-10% MgO, 20-45% $SiO_2$ and other minor ingredients. In other words, steel slag has both carbonatable and pozzolanic elements in its composition. When steel slag is fractured and reduced in size by grinding, microwave comminution or other methods as described in accordance with the present invention, to create a powder of fine particle size, it exposes fresh surface with far greater surface area and increased porosity that in the presence of carbon dioxide, at elevated or ambient temperature, is adsorbed or absorbed onto its surface and pores and/or the carbonatable minerals such as Ca, Mg, Na, K and the like react to form various types of carbonates and other compounds containing carbon as part of the new mineral structure. Blast furnace steel slag also generally contains 30-40% $SiO_2$, 10-15% $Al_2O_3$ that have pozzolanic properties when used in concrete or mixed with a compound having an active hydroxyl group, such as NaOH or KOH. In other words, carbonated blast furnace steel slag retains its pozzolanic properties while using the carbonatable elements to sequester carbon dioxide by mineralization and the pozzolanic properties to contribute to the pozzolanic reaction. Carbonated slag in accordance with the present invention can retain all other current uses, such as geopolymers, mineral fillers, aggregate filler, soil cement, soil remediation, and the like.

The electric arc furnace steel manufacturing process uses a different process to make steel. However, it also generates slag as a byproduct of the manufacturing process. One type of slag is oxidizing while another is reducing slag. Electric arc furnace steel slag generally has a chemical composition of 20-60% CaO, 4-10% MgO, depending on whether it was oxidized or reduced. A reducing slag process produces slag with the highest amount of carbonatable element at the upper range of the above while the oxidizing slag has a chemical composition with the carbonatable elements at the lower end of the ranges above. Arc furnace steel slag also has pozzolanic element such as $SiO_2$ 10-20%, $Al_2O_3$ of 5-20%. In other words, steel slag has both carbonatable and pozzolanic elements in its composition. When steel slag is fractured and reduced in size by grinding, microwave comminution or other methods as described in accordance with the present invention, to create a powder of fine particle size, it exposes fresh surface with far greater surface area and increased porosity that in the presence of carbon dioxide, at elevated or ambient temperatures and increased or ambient pressures, the carbonatable minerals such as Ca, Mg, Na, K and the like react to form various types of carbonates or other compounds containing carbon as part of the new compound structure. Arc furnace steel slag processes in accordance with the present inventions retains its pozzolanic properties when used in concrete or mixed with a hydroxyl group. In other words, carbonated electric arc furnace steel slag in accordance with the present invention retains its pozzolanic properties while by carbonating using the carbonatable elements to sequester carbon dioxide by mineralization and the pozzolanic properties contribute to the pozzolanic reaction.

The carbon dioxide used to mineralize the carbonatable elements of the various types of slag as describes above can be the product of any type of carbon capture or carbon emission source. However, it would be desirable to capture and use the carbon dioxide from the exhaust gases from the steel manufacturing process to carbonate the different types of slag. The carbonated slag can be used in various applications such as pozzolans in concrete or geopolymers, as aggregates, fillers or can be placed back into landfills or any other suitable application. However, by mineral carbonation steel slag loses it hydraulic cementitious properties and can no longer be used a slag cement as it is currently used in the concrete or cement industry. It would be desirable to use and remove the carbon dioxide from the steel manufacture process exhaust gas by direct mineralization using a carbonatable mineral with carbonatable elements or compounds such as hyaloclastite, lava, fly ash, bottom ash, slag or any other natural or man-made mineral that contains carbonatable elements as described in accordance with the current invention by reducing it in size to create a powder of fine particle size in the presence of carbon dioxide at elevated or ambient temperatures and increased or ambient pressures. Additionally, the ground, fine powder of carbonatable mineral containing carbonated elements or carbon dioxide adsorbed or absorbed thereon can be encapsulated or pelletize into granules using a polymer coating or any other suitable method for long term storage or other suitable applications.

Any one or a combination of one or more of the natural or man-made carbonatable minerals such as hyaloclastite, lava, volcanic ash, fly ash, bottom ash, slag or any other mineral containing sufficient amount of carbonatable elements, such as calcium, magnesium, potassium, sodium and the like, can be fractured and reduced in size in the presence of carbon dioxide at elevated or ambient temperatures and increased or ambient pressures, from any carbon dioxide source captured by any method or from any direct emission or calcination process. As an example, hyaloclastite or lava with basaltic or intermediate basaltic chemistry can be mixed with fly ash or bottom ash and the mixture of the two can be fractured and reduced in size in the presence of carbon dioxide at ambient or elevated temperature where the carbon dioxide is adsorbed or absorbed onto the surface and into the pores of the fractured mineral and at elevated or ambient temperatures and increased or ambient pressures reacts with the carbonatable elements to create carbonates and/or compounds where carbon is a component thereof.

The different types of carbonatable minerals contain varying amounts of non-carbon embodied or un-carbonated elements; i.e., Ca, Mg, K, Na and Fe, that in the presence of $CO_2$ may react to form a carbonate, and, therefore, sequester carbon dioxide by mineralization. The presence of carbonatable elements can by determined by chemical analysis of oxides. The sum of carbonatable elements is inversely proportional to the $SiO_2$ content. In other words, the higher the silica content the lower the total amount of carbonatable elements which means that a pozzolan with the lowest silica content will contain the highest amount of uncarbonated Ca and the most amount of one or more uncarbonated elements of Mg, K, Na, Fe, etc. As an example, hyaloclastite, volcanic ash or pumice classified based on the amount of silica content comprises the following elements: basaltic hyaloclastite, volcanic ash or pumice (less than approximately 53% by weight $SiO_2$) contains CaO of approximately 6 to approximately 18% by weight, MgO approximately 5 to approximately 15% by weight, $K_2O$ approximately less than 1% to approximately 5% by weight, $Na_2O$ approximately 1% to approximately 5% by weight and $Fe_2O_3$ approximately 10 to approximately 18% by weight; intermediate hyaloclastite, volcanic ash or pumice (approximately 53 to approximately 57% by weight $SiO_2$) comprises CaO of approximately 6 to approximately 10% by weight, MgO approximately 3 to approximately 10% by weight, $K_2O$ approximately 1% by weight, $Na_2O$ approximately 3% by weight and $Fe_2O_3$ approximately 5 to approximately 10% by weight; or silicic such as andesitic hyaloclastite, volcanic ash or pumice (approximately 57 to approximately 65% by weight $SiO_2$) comprises CaO of approximately 6 to approximately 18% by weight, MgO approximately 5 to approximately 15% by weight, $K_2O$ approximately 1% by weight, $Na_2O$ approximately 3% by weight and $Fe_2O_3$ approximately 5 to approximately 10% by weight; dacitic (approximately 63 to approximately 69% by weight $SiO_2$) comprises CaO of approximately 3 to approximately 8% by weight, MgO approximately 1 to approximately 6% by weight, $K_2O$ approximately 1% by weight, $Na_2O$ approximately 3% by weight and $Fe_2O_3$ approximately 4 to approximately 8% by weight; while rhyolitic (greater than 69% by weight $SiO_2$) comprises CaO of less than approximately 6% by weight, MgO less than 2% by weight, $K_2O$ approximately 4% by weight, $Na_2O$ approximately 3% by weight and $Fe_2O_3$ approximately 5% by weight. Therefore, the sum of carbonatable elements found in the basaltic hyaloclastite, volcanic ash or pumice is approximately 12 to approximately 42% by weight while the rhyolitic hyaloclastite, volcanic ash or pumice is less than 10% by weight. Therefore, a pozzolan or mineral from a basaltic source is far more desirable to mineralize or sequester $CO_2$ in accordance with the present invention than a pozzolan from a rhyolitic source.

As used herein, the term "carbonatable mineral" shall mean a natural or man-made mineral from one or more or any combination thereof, hyaloclastite, lava, fly ash, bottom ash, boiler slag, iron slag, blast furnace slag, electric arc slag, clay, calcined clay or any other natural or man-made mineral containing one or more carbonatable elements such as calcium, magnesium, potassium, sodium, iron and the like in a non-carbonated or non-carbon-containing state, in sufficient quantities that when reacting with carbon dioxide in any concentration or state it creates carbonates, from any and all sources, either mechanically or thermally processed; i.e., all carbonatable minerals irrespective of the mineral source from which it is derived, unless otherwise designated. In some embodiments carbonatable mineral comprises approximately 20 to approximately 65% by weight $SiO_2$, approximately 0 to approximately 30% by weight $Al_2O_3$, 0 to approximately 30% by weight $Fe_2O_3$, approximately 4 to approximately 60% by weight CaO, approximately 0 to approximately 20% by weight MgO among other elements.

As used herein, the term "hyaloclastite" shall mean lava quenched by water regardless of it amorphous or crystalline composition, where the crystalline elements if any, are microcrystalline, hyaloclastite from any and all sources; i.e., all lava quenched by water or hyaloclastites irrespective of the mineral source from which it is derived, unless otherwise designated.

As used herein, the term "natural pozzolan" shall mean hyaloclastite, volcanic ash, pumice, zeolites, clays or calcined clays, from any and all sources; i.e., all irrespective of the mineral source from which it is derived, unless otherwise designated, with an amorphous content of 10-100% and a crystalline content of 0-90% wherein the crystalline matrix is comprised of micro-crystals.

As used herein, the term "carbonated mineral" or "carbonated element" shall mean one or more carbonatable elements such as calcium, magnesium, potassium, sodium, iron and the like originating in a non-carbonated or non-carbon-containing state, in sufficient quantities that would have reacted with carbon dioxide in any concentration or state and have created one or more types of carbonates, from any and all sources; i.e., all carbonated minerals irrespective of the mineral source from which it is derived, unless otherwise designated.

Basaltic or mafic hyaloclastite, volcanic ash, or pumice generally has approximately 6 to approximately 18% by weight uncarbonated calcium found with the amorphous matrix or a combination of amorphous and micro crystalline matrix. As the amount of $SiO_2$ increases from the low 40% by weight for basaltic hyaloclastite, volcanic ash, scoria or pumice to the andesitic and dacitic silica range, the uncarbonated calcium, magnesium, iron decreased to where in the rhyolitic range there is virtually no uncarbonated calcium available.

Tables 1-2 below show chemical oxides analysis of hyaloclastite, volcanic ash, or pumice based pozzolans from various sources and shows CaO levels as well as the $Fe_2O_3$, MgO, correlated with the $SiO_2$ content. The values of the Ca, Mg, Fe, Na and K measured as oxides shown in Table 1 below are examples of desirable non-carbon-containing carbonatable elements measured by oxide levels for carbonation in accordance with the present invention.

TABLE 1

Desirable chemical compositions of minerals suitable for carbon mineralization

| Elements | LS36-10 | TDR | SND | AB | BKP | PVT | RDF | THR | VCR | PTR |
|---|---|---|---|---|---|---|---|---|---|---|
| $SiO_2$ | 45.20 | 45.00 | 47.70 | 47.20 | 46.36 | 48.50 | 50.60 | 52.85 | 54.94 | 60.39 |
| $Al_2O_3$ | 14.09 | 17.60 | 15.33 | 12.49 | 11.96 | 15.40 | 15.00 | 14.53 | 14.87 | 13.05 |
| Total $SiO_2$, $Al_2O_3$ | 59.29 | 62.60 | 63.03 | 59.69 | 58.32 | 63.90 | 65.60 | 67.38 | 69.81 | 73.44 |
| CaO | 14.77 | 12.70 | 11.51 | 11.51 | 9.68 | 9.37 | 9.16 | 8.94 | 8.84 | 6.69 |
| MgO | 6.11 | 7.27 | 10.89 | 11.06 | 5.50 | 6.57 | 7.78 | 4.94 | 4.93 | 6.37 |
| FeO | 13.07 | 12.90 | 12.75 | 12.04 | 15.38 | 13.00 | 10.20 | 12.03 | 9.85 | 7.21 |
| Total CaO, MgO, FeO | 33.95 | 32.87 | 35.15 | 34.61 | 30.56 | 28.94 | 27.14 | 25.91 | 23.62 | 20.27 |
| $Na_2O$ | 3.22 | 1.83 | 1.58 | 1.72 | 2.60 | 3.40 | 3.34 | 2.69 | 2.63 | 2.23 |
| $K_2O$ | 1.12 | 0.21 | 0.21 | 0.40 | 0.70 | 1.14 | 1.48 | 0.76 | 0.86 | 2.27 |
| Total Alkali | 4.34 | 2.04 | 1.79 | 2.12 | 3.30 | 4.54 | 4.82 | 3.45 | 3.49 | 4.50 |

All examples above are minerals sampled, processed and analyzed by the inventor from various location around the world. The three-letter designation refers to the mineral source.

The first three samples, LS36-10, TDR and SND, show a basaltic chemistry with the $SiO_2$ of approximately 45-47% and $Al_2O_3$ of 14-17.6% this results in a total silica and alumina content of 59.29-63.03% available to react with calcium hydroxide from the cement hydration reaction (Ca—OH) to create calcium silicate hydrate C—S—H. This is called the typical pozzolanic reaction. The total amount of CaO, MgO and FeO found in these sample total approximately 32.87-35.15%. We call these uncarbonated elements or non-carbon-containing compounds due to the fact that they do not come from a carbonated mineral source. When ground to a small enough particle size and mixed with carbon dioxide these compounds are available to react with carbon dioxide and form carbonates of various types. Additionally, when the pozzolan of this chemistry is dissolved in an alkaline solution, and mixed with carbon dioxide these elements are further available to react with carbon dioxide and form carbonates of various types. We note a significant amount a uncarbonated compounds in this chemistry where the ratio between the sum of $SiO_2/Al_2O_3$ and the sum of CaO/MgO/FeO is approximately 1.75-1.9 to 1. In general, the concrete industry is concerned with the total amount of alkalis in the cement paste due to the potential of high alkali content may react with silica and form the so-called alkali-silica reaction (ASR) which is damaging to concrete. In other words, it is preferred to have a pozzolan with the sum of $Na_2O$ and $K_2O$ as low as possible. In these three examples, it is noted that the total alkali is between 1.79-4.34%. We call this a relatively low amount of alkali. This limited amount of alkali is also available to react with carbon dioxide and create carbonates of various types. However, while a significantly higher amount of alkali would still react with carbon dioxide to create various types of carbonates, the risk is that at the same time the higher the amount of alkali the higher the risk of alkali-silica reaction. Therefore, it is desired to have a pozzolan with a relatively low sum of total alkalis.

The next three samples, AB, BKP and PVT, have similar basaltic chemical composition of total silica and alumina of 59.69-63.9% and a total amount of uncarbonated calcium, magnesium and iron oxides of 28.94-34.61%. We call these uncarbonated compounds due to the fact that they do not come from a carbonated mineral source. When ground to a small enough particle size and mixed with carbon dioxide these compounds are available to react with carbon dioxide and form carbonates of various types. Additionally, when the pozzolan of this chemistry is dissolved in an alkaline solution, and mixed with carbon dioxide these elements are further available to react with carbon dioxide and form carbonates of various types. We also note a significant amount an uncarbonated compounds in this chemistry where the ratio between the sum of $SiO_2/Al_2O_3$ and the sum of CaO/MgO/FeO is also approximately 1.72-2.2 to 1. The total sum of the alkalis is also relatively low between 2.12-4.54%. These examples show desirable levels of calcium, magnesium and iron oxides in accordance with the present inventions.

The next two samples, RDF and THR, have similar basaltic chemical composition of total silica and alumina slightly higher of 65.6-67.38% and a total amount of uncarbonated calcium, magnesium and iron oxides of 25.91-27.14%. When ground to a small enough particle size and mixed with carbon dioxide these compounds are still available to react with carbon dioxide and form carbonates of various types. Additionally, when the pozzolan of this chemistry is dissolved in an alkaline solution, and mixed with carbon dioxide these elements are still further available to react with carbon dioxide and form carbonates of various types. We also note a significant amount of uncarbonated compounds in this chemistry however the ratio between the sum of $SiO_2/Al_2O_3$ and the sum of CaO/MgO/FeO is higher at approximately 2.4-2.6 to 1. The total sum of the alkalis is also relatively low between 2.12-4.54%. These examples show desirable levels of calcium, magnesium and iron oxides in accordance with the present inventions.

The next sample, VCR, has an intermediate chemical composition of total silica and alumina slightly higher of 69.81% available to react with the calcium hydroxide from the cement hydration reaction (Ca—OH) to create calcium silicate hydrate C—S—H. The total amount of uncarbonated calcium, magnesium and iron oxides of 23.62%. When ground to a small enough particle size and mixed with carbon dioxide these compounds are still available to react with carbon dioxide and form carbonates of various types. Additionally, when the pozzolan of this chemistry is dissolved in an alkaline solution, and mixed with carbon dioxide these elements are still further available to react with carbon dioxide and form carbonates of various types. We also note a significant amount of uncarbonated compounds in this chemistry however the ratio between the sum of $SiO_2/Al_2O_3$ and the sum of CaO/MgO/FeO is higher at approximately 2.9 to 1. The total sum of the alkalis is also relatively low between 3.49%. This example shows a chemical composition with greater capacity for the pozzolanic reaction then the previous examples while at the same time a lower capacity for the carbonation. This examples still shows a sufficiently desirable levels of calcium, magnesium and iron oxides in accordance with the present inventions.

The last sample, PTR, has an andesitic chemical composition of total silica and alumina slightly higher of 73.44% available to react with the calcium hydroxide from the cement hydration reaction (Ca—OH) to create calcium silicate hydrate C—S—H. The total amount of uncarbonated calcium, magnesium and iron oxides of 20.27%. When ground to a small enough particle size and mixed with carbon dioxide these compounds are still available to react with carbon dioxide and form carbonates of various types. Additionally, when the pozzolan of this chemistry is dissolved in an alkaline solution, and mixed with carbon dioxide these elements are still further available to react with carbon dioxide and form carbonates of various types. We also note a significant amount of uncarbonated compounds in this chemistry however the ratio between the sum of $SiO_2/Al_2O_3$ and the sum of $CaO/MgO/FeO$ is higher at approximately 3.6 to 1. The total sum of the alkalis is also relatively low between 4.5%. This sample shows a chemical composition with an even greater capacity for the pozzolanic reaction then the previous examples while at the same time a lower capacity for the carbonation. However, this examples still shows a sufficiently desirable level of calcium, magnesium and iron oxides in accordance with the present inventions.

The values of the Ca, Mg, Fe, Na and K oxides shown in Table 2 below are examples of less desirable oxide levels for carbon mineralization or sequestration in accordance with the present invention.

between the sum of $SiO_2/Al_2O_3$ and the sum of $CaO/MgO/FeO$ is approximately 6.03-9.8 to 1. In general, the concrete industry is concerned with the total amount of alkalis in the cement paste due to the potential of high alkali content may react with silica and form the so-called Alkali-Silica reaction (ASR) which is damaging to concrete. In other words, it is preferred to have a pozzolan with the sum of $Na_2O$ and $K_2O$ a low as possible. In these two examples it is noted that the total alkali is between 5.88-5.92%. This is a larger amount of alkali than examples in Table 1. This amount of alkali is available to react with carbon dioxide and create carbonates of various types. However, while a significantly larger amount of alkali would still react with carbon dioxide to create various types of carbonates, the risk is that at the same time the higher the amount of alkali the higher the risk of alkali-silica reaction is increased in these two examples. Therefore, these two examples of pozzolans are less desirable to be used to mineralize or sequester carbon dioxide.

The next four examples, MLO, GEO, WCL and CDH, show a rhyolitic chemistry with the $SiO_2$ of approximately 72.5-76.40% and $Al_2O_3$ of 11.40-13.05% this results in a total silica and alumina content of 83.90-88.70% available to react with the calcium hydroxide from the cement hydration reaction (Ca—OH) to create calcium silicate hydrate C—S—H. The total amount of CaO, MgO and FeO found in these sample are insignificant at a total of approximately 1.97-3.63%. Regardless of how finely ground the particle size is, when mixed with carbon dioxide these compounds are too insignificant to react with carbon dioxide and form carbonates of various types. We also note that the ratio between the sum of $SiO_2/Al_2O_3$ and the sum of $CaO/MgO/FeO$ is approximately 23.11-45.3 to 1. This is not a desirable

TABLE 2

Minerals with less desirable carbonation properties

| Elements | CR | GP | MLO | GEO | WCL | CDH | MS | WHA | RHA | SF |
|---|---|---|---|---|---|---|---|---|---|---|
| $SiO_2$ | 68.23 | 64.30 | 73.72 | 72.50 | 74.92 | 76.40 | 92.10 | 92.86 | 93.84 | 97.00 |
| $Al_2O_3$ | 14.68 | 15.23 | 12.66 | 11.40 | 13.05 | 12.30 | 2.13 | 1.88 | 1.93 | 0.20 |
| Total $SiO_2$ $Al_2O_3$ | 82.91 | 79.53 | 86.38 | 83.90 | 87.97 | 88.70 | 94.23 | 94.74 | 95.77 | 97.20 |
| CaO | 3.11 | 4.32 | 1.08 | 0.98 | 0.98 | 0.85 | 1.10 | 0.19 | 0.68 | 0.20 |
| MgO | 0.92 | 0.98 | 0.53 | 0.35 | 0.35 | 0.05 | 1.05 | 0.01 | 0.45 | 0.52 |
| FeO | 4.43 | 7.89 | 1.38 | 2.30 | 0.72 | 1.07 | 1.62 | 0.35 | 0.29 | 0.55 |
| Total CaO, MgO, FeO | 8.46 | 13.19 | 2.99 | 3.63 | 2.05 | 1.97 | 3.77 | 0.55 | 1.42 | 1.27 |
| $Na_2O$ | 3.18 | 4.19 | 3.41 | 3.75 | 3.75 | 3.71 | 0.10 | 0.25 | 0.10 | 0.22 |
| $K_2O$ | 2.74 | 1.69 | 3.15 | 4.22 | 4.22 | 5.37 | 1.32 | 0.78 | 1.38 | 0.51 |
| Total Akali | 5.92 | 5.88 | 6.56 | 7.97 | 7.97 | 9.08 | 1.42 | 1.03 | 1.48 | 0.73 |

The first two samples, CR and GP, show a dacitic chemistry with the $SiO_2$ of approximately 64.3-68.23% and $Al_2O_3$ of 14.68-15.3% this results in a total silica and alumina content of 79.53-82.91% available to react with the calcium hydroxide from the cement hydration reaction (Ca—OH) to create calcium silicate hydrate C—S—H. The total amount of CaO, MgO and FeO found in these sample total approximately 8.46-13.19%. When ground to a small enough particle size and mixed with carbon dioxide these compounds are available to react with carbon dioxide and form carbonates of various types. Additionally, when the pozzolan of this chemistry is dissolved in an alkaline solution, and mixed with carbon dioxide these elements are further available to react with carbon dioxide and form carbonates of various types. However, we note a significantly less amount a uncarbonated compounds in this chemistry where the ratio to mineralize or sequester significant amounts of carbon dioxide. As mentioned above the concrete industry is concerned with the total amount of alkalis in the cement paste due to the potential of high alkali content may react with silica and form the alkali-silica reaction (ASR) which is damaging to concrete. In these four examples it is noted that the total alkali is between 6.56-9.08%. This is a larger amount of alkali than the first two example in this table above, and of all examples in Table 1. While this amount of alkali is available to react with carbon dioxide and create carbonates of various types there is a significantly higher the risk of alkali-silica reaction is increased in these two examples. Therefore, these two examples of pozzolans are not desirable to be used to mineralize or sequester carbon dioxide.

The next three samples, MS, WHA and RHA, are from the microsilica category. WHA is a wheat husk ash and RHA is a rice husk ash. These show a chemistry with the $SiO_2$ of approximately 92.10-93.84% and a very insignificant amount of $Al_2O_3$ of 1.88-2.13%. This results in a total silica and alumina content of 94.23-95.77% available to react with the calcium hydroxide from the cement hydration reaction (Ca—OH) to create calcium silicate hydrate C—S—H. The total amount of CaO, MgO and FeO found in these sample are also insignificant at a total of 3.77 for the MS and approximately 0.55-1.42%. Regardless of how finely ground the particle size is, when mixed with carbon dioxide these compounds are too insignificant to react with carbon dioxide and form carbonates of various types. We also note that the ratio between the sum of $SiO_2/Al_2O_3$ and the sum of CaO/MgO/FeO is approximately 24.99 for MS and 67.44-175.25 to 1 for the husk ashes. This is not a desirable ratio to mineralize or sequester significant amount of carbon dioxide. In these three examples it is noted that the total alkali is between 1.03-1.48%. This is a low amount of alkali which makes it a desirable pozzolan to react with the calcium hydroxide from the cement hydration reaction to create calcium silicate hydrate, however the high pozzolanic reactivity of these examples would outcompete the carbonation process and very little if any carbon dioxide would react with any calcium hydroxide in the cement paste, and no carbonation would be possible within the pozzolan itself. Therefore, these three examples of pozzolans are not desirable to be used to mineralize or sequester carbon dioxide.

The last sample, SF, is silica fume, a byproduct of the silicon manufacturing process. This shows a chemical composition of $SiO_2$ of approximately 97% and a very insignificant amount of $Al_2O_3$ of 0.20%. This results in a total silica and alumina content of 97.20% available to react with the calcium hydroxide from the cement hydration reaction (Ca—OH) to create calcium silicate hydrate C—S—H. The total amount of CaO, MgO and FeO found in this sample is very insignificant at a total of 1.27%. When mixed with carbon dioxide this product's chemical composition is too insignificant to react with carbon dioxide and form carbonates of various types. We also note that the ratio between the sum of $SiO_2/Al_2O_3$ and the sum of CaO/MgO/FeO is approximately 24.99 for MS and 76.54 to 1. This is not a desirable ratio to mineralize or sequester any significant amount of carbon dioxide. In this example it is noted that the total alkali is between 0.73%. This is a very low amount of alkali which makes it a desirable pozzolan to react with the calcium hydroxide from the cement hydration reaction to create calcium silicate hydrate, however the high pozzolanic reactivity of the silica fume would outcompete the carbonation process and very little if any carbon dioxide would react with any calcium hydroxide in the cement paste, and no carbonation would be possible within the pozzolan itself. Therefore, silica fume is not a desirable pozzolan to be used to mineralize or sequester carbon dioxide.

Table 3 below shows the chemical composition of various types of calcined clays.

TABLE 3

Calcined clay properties, showing minerals with properties less suitable for carbon mineralization according to the present invention

| Elements | SMC1 | SMC2 | IL | C | B3 | A1 | MLC | CC | K2 | K1 |
|---|---|---|---|---|---|---|---|---|---|---|
| $SiO_2$ | 41.84 | 58.03 | 52.62 | 34.05 | 37.07 | 45.99 | 52.58 | 54.70 | 59.90 | 62.62 |
| $Al_2O_3$ | 15.52 | 19.60 | 22.63 | 33.13 | 33.11 | 37.70 | 40.98 | 37.40 | 32.29 | 28.63 |
| Total $SiO_2$ $Al_2O_3$ | 57.36 | 77.63 | 75.25 | 67.18 | 70.18 | 83.69 | 93.56 | 92.10 | 92.19 | 91.25 |
| CaO | 3.84 | 0.02 | 0.12 | 1.10 | 0.01 | 0.01 | 0.09 | 0.84 | 0.04 | 0.06 |
| MgO | 2.99 | 2.36 | 2.32 | 0.39 | 0.34 | 0.16 | 0.43 | 0.42 | 0.17 | 0.15 |
| FeO | 13.80 | 4.08 | 6.64 | 6.58 | 10.20 | 0.90 | 3.12 | 1.72 | 1.28 | 1.07 |
| Total CaO, MgO, FeO | 20.63 | 6.46 | 9.08 | 8.07 | 10.55 | 1.07 | 3.64 | 2.98 | 1.49 | 1.28 |
| $Na_2O$ | 0.04 | 0.05 | 0.48 | 0.23 | 0.05 | 0.05 | 0.06 | 0.37 | 0.24 | 1.57 |
| $K_2O$ | 2.99 | 0.15 | 7.72 | 0.24 | 0.15 | 0.24 | 0.90 | 0.54 | 2.83 | 3.46 |
| Total Akali | 3.03 | 0.20 | 8.20 | 0.47 | 0.20 | 0.29 | 0.96 | 0.91 | 3.07 | 5.03 |

The first two examples, SMC1 and SMC2, show the chemical composition of smectite clay. The first example is a smectite clay with a $SiO_2$ composition of approximately 41.84% and an $Al_2O_3$ composition of 15.52%. This results in a total silica and alumina content of 57.36% available to react with the calcium hydroxide from the cement hydration reaction (Ca—OH) to create calcium silicate hydrate C—S—H. The total amount of CaO, MgO and FeO found in this example if of approximately 20.63%, however two thirds of this is from the iron oxide. The ratio between the total of calcium and magnesium oxide vs. the iron oxide is 1 to 2. This is not a desirable ratio for the carbonation. This is not a desirable ratio to mineralize or sequester a significant amount of carbon dioxide. In this example it is noted that the total alkali is 3.03%. While this amount of alkali is available to react with carbon dioxide and create carbonates of various types there the overall chemical composition total iron oxide vs. everything else that could react with carbon dioxide is such that SMC1 is not a desirable pozzolan to mineralize or sequester carbon dioxide. The second example of smectite clay, SMC2 shows a $SiO_2$ composition of approximately 58.03% and an $Al_2O_3$ composition of 19.6%. This results in a total silica and alumina content of 77.63% available to react with the calcium hydroxide from the cement hydration reaction (Ca—OH) to create calcium silicate hydrate C—S—H. The total amount of CaO, MgO and FeO found in this example if of approximately 6.46%, however as in the example above the iron oxide amount is high compared to the calcium and magnesium oxide. The ratio between the total of calcium and magnesium oxide vs. the iron oxide is 1 to 1.72. This is not a desirable ratio for the carbonation. This is not a desirable ratio to mineralize or sequester a significant amount of carbon dioxide. In this example it is noted that the total alkali is 0.20%. This amount of alkali is insufficient to react with carbon dioxide and create carbonates of various types and the overall chemical composition total iron oxide vs. everything else that could react with carbon dioxide is such that SMC2 is not a desirable pozzolan to mineralize or sequester carbon dioxide. Therefore, these two examples of pozzolans are not desirable to be used to mineralize or sequester carbon dioxide.

The first third examples, IL, is an ilmenite type clay with a $SiO_2$ composition of approximately 52.62% and an $Al_2O_3$ composition of 22.63%. This results in a total silica and alumina content of 75.25% available to react with the calcium hydroxide from the cement hydration reaction (Ca—OH) to create calcium silicate hydrate C—S—H. The total amount of CaO, MgO and FeO found in this example if of approximately 9.08%, however more than two thirds of this is from the iron oxide. The ratio between total of calcium and magnesium oxide vs. the iron oxide is 1 to 2.72. This is not a desirable ratio for the carbonation. This is not a desirable ratio to mineralize or sequester a significant amount of carbon dioxide. In this example it is noted that the total alkali is 8.20%. While this amount of alkali is available to react with carbon dioxide and create carbonates of various types there the overall chemical composition total iron oxide vs. everything else that could react with carbon dioxide and the high alkali content that could react to create a alkali silica reaction is such that IL is not a desirable pozzolan to mineralize or sequester carbon dioxide.

The next two samples, C and B3, are kaolinite type clays with a approximately equal amount of $SiO_2$ and $Al_2O_3$. These shows a $SiO_2$ composition of approximately 34.05-37.07% and an $Al_2O_3$ composition of approximately 33%. This results in a total silica and alumina content of 67.18-70.18% available to react with the calcium hydroxide from the cement hydration reaction (Ca—OH) to create calcium silicate hydrate C—S—H. This chemistry is that of an alumino silicate pozzolan. The total amount of CaO, MgO and FeO found in this example if of approximately 8.07-10.55%, however as in these examples the iron oxide amount is very high compared to the sum of calcium and magnesium oxide. The ratio between total of calcium and magnesium oxide vs. the iron oxide is 1 to 4.4-29.14. This is not a desirable ratio for the carbonation. This is not a desirable ratio to mineralize or sequester significant amount of carbon dioxide. In this example it is noted that the total alkali is 0.20-0.47%. This amount of alkali is insufficient to react with carbon dioxide and create carbonates of various types and the overall chemical composition of total iron oxide vs. everything else that could react with carbon dioxide is such these two examples are not a desirable pozzolan to mineralize or sequester carbon dioxide. Therefore, these two examples of pozzolans are not desirable to be used to mineralize or sequester carbon dioxide.

The next sample, A1, is also a kaolinite type clays with a higher amount of $SiO_2$ vs. $Al_2O_3$. These show a $SiO_2$ composition of approximately 46% and an $Al_2O_3$ composition of approximately 37.70%. This results in a total silica and alumina content of 83.67% available to react with the calcium hydroxide from the cement hydration reaction (Ca—OH) to create calcium silicate hydrate C—S—H. This is chemistry is that of an aluminosilicate pozzolan. The total amount of CaO, MgO and FeO found in this example is insignificant of approximately 1.07%. This is not a desirable amount for carbonation. In this example it is noted that the total alkali is 0.29%. This amount of alkali is insufficient to react with carbon dioxide and create carbonates of various types. Therefore, this example of pozzolans is not desirable to be used to mineralize or sequester carbon dioxide.

The next four samples, MLC, CC, K2 and K1, are metakaolin pozzolan, a kaolinite type clay with a higher amount of $SiO_2$ vs. $Al_2O_3$. These shows a $SiO_2$ composition of approximately 52.58-62.62% and an $Al_2O_3$ composition of approximately 28.63-40.98%. This results in a total silica and alumina content of 91.25-93.56% available to react with the calcium hydroxide from the cement hydration reaction (Ca—OH) to create calcium silicate hydrate C—S—H. This is chemistry is that of an aluminosilicate pozzolan. The total amount of CaO, MgO and FeO found in this example is insignificant of approximately 1.28-3.64%, however in these examples the iron oxide amount is very high compared to the sum of calcium and magnesium oxide. This is not a desirable amount for the carbonation. In this example it is noted that the total alkali is 0.91-5.03%. This amount of alkali is insufficient to react with carbon dioxide and create carbonates of various types. Therefore, this example of pozzolans is not desirable to be used to mineralize or sequester carbon dioxide.

Different carbonatable minerals such as natural pozzolans, including hyaloclastites, lava, volcanic ashes, fly ashes, bottom ashes, slags, or any other natural or man-made mineral with sufficient amounts of carbonatable elements, have different amounts of amorphous glass and crystalline content. The oxides shown in Tables 1-3 above is a method of determining the chemical composition and may not be a reflection of actual free oxides present within the matrix by themselves. The oxides may be part of complex formula of amorphous or microcrystalline structure.

Chemical composition as reported herein is measured by the XRF (X-ray fluorescence) method. This is a non-destructive analytical technique used to determine the elemental composition of materials. XRF analyzers determine the chemistry of a sample by measuring the fluorescent (or secondary) X-ray emitted from a sample when it is excited by a primary X-ray source. Each of the elements present in a sample produces a set of characteristic fluorescent X-rays ("a fingerprint") that is unique for that specific element, which is why XRF spectroscopy is an excellent technology for qualitative and quantitative analysis of material composition. The chemical analysis reported herein is the total oxides scan.

Sample preparation for XRF can be achieved using either of two distinct methods: a pressed powder and a fused glass disk. Pressed powder specimens are typically ground in a tungsten carbide ring and puck mill with a binding agent to reduce the particle size and provide a packed powder mount that will remain intact for transport and analysis. The advantages of this preparation method include the simplicity and better detection limits while disadvantages include what is known as the "mineralogical effect", which requires a similar matrix between a bracketed calibration and unknown specimens for the calibrations to be valid.

The state of the oxides makes them available to react with the carbon dioxide either on the surface of the micronized particle or once dissolved in an alkaline or acidic solution. In some cases, most if not all, elements are in an amorphous or a microcrystalline state or combination thereof, an uncarbonated state, which means when a pozzolan of specific particle size is dissolved in the highly alkaline solution, such as a cement paste, lime paste or compounds with reactive hydroxyl groups, such as, calcium, sodium or potassium hydroxide, the carbonatable elements are available to react with $CO_2$ to produce carbonates. In case of carbonatable minerals such as hyaloclastites, volcanic ashes, pumice, etc., containing some degree of crystalline elements, the carbonatable elements are contained in micro-crystals, such as clinopyroxene $Ca(Mg, Fe, Al, Ti)(Si, Al)_2O_6$, calcium plagiclase feldspars $(Na, Ca)Al(Si, Al)_3O_8$, olivine $(Fe, Mg)_2SiO_4$ are examples of crystalline materials that contain uncarbonated elements, such as calcium, magnesium, potassium, sodium and iron, that are available to combine with $CO_2$ to create carbonates. Examples of carbonates using these elements are one or more of the following: calcium carbonates, such as limestone, calcite, aragonite, vaterite, calcium-magnesium carbonates such as dolomite, magnesium carbonates, sodium carbonates, iron carbonates such as siderite and potassium carbonate, among others. Alternatively, any of the uncarbonated calcium, magnesium, iron, sodium, potassium may react in any particular fashion and form more complex crystal minerals such as olivine, pyroxenes, plagioclase feldspars, K-feldspars, mordenite, clino-amphibole, ilmenite or other similar crystal minerals. These carbonatable elements, and others, can be found in volcanic ashes, pumices and hyaloclastites of these chemistries can be in amorphous or microcrystalline form or a combination thereof.

The carbonation process of the elements above is accelerated at a higher temperature, but not as high as the decomposition temperature at which the carbonate releases $CO_2$ and returns to the oxide form. The carbonation temperature can range from 20 to 250 degrees Celsius depending on the desired rate of adsorption, absorption or carbonation and whether any other type of grinding aid, carbonation accelerant and/or $CO_2$ adsorption enhancing element or compound, or any combination thereof is used (the foregoing temperature range includes all of the intermediate values). Therefore, concrete cured at an elevated but safe temperature will mineralize or sequester a greater amount of $CO_2$ and also accelerate the hydration process and calcium silicate hydration formation. In particular precast concrete plants, CMU clock plants, and any other type of precast element plants that use curing chambers at elevated temperature would benefit from the use of the present pozzolan $CO_2$ mineralization or sequestration process. Additional concrete elements made with these types of pozzolans containing carbonatable elements in accordance with the present invention can be cured in curing chambers, such as steam curing chambers, with $CO_2$ gas present within the chamber at concentrated levels above what is found in the atmosphere. Alternatively, the carbonation process can also take place at ambient or sub-ambient temperatures.

In particular a concrete or mortar object having a carbonatable mineral with the chemical properties described above, especially in Table 1, incorporated in the mortar or concrete mix using a hydraulic cement, when cured in a curing chamber with elevated carbon dioxide, will absorb and mineralize or sequester increased amounts of carbon dioxide creating the carbonates or complex crystal minerals mentioned above when compared with objects made with concrete or mortar mixes of straight portland cement or a hydraulic cement and conventional pozzolans.

Furthermore, $CO_2$ gas can be added in various stages of the manufacturing process, such as being mixed with the concrete mix when batched or during the carbonatable mineral or pozzolan manufacture process; i.e., during the pozzolan drying and/or grinding process or when dissolved in an alkaline solution. For cast in place applications, it is desirable to cure concrete with these carbonatable elements having carbon dioxide in its composition, in a concrete form that can retain the heat of hydration, such as the insulated forms and methods disclosed in U.S. Pat. Nos. 8,555,583; 8,756,890; 8,555,584, 8,532,815; 8,877,329; 9,458,637; 8,844,227; 9,074,379; 10,065,339; 10,220,542; 9,776,920; 9,862,118; 10,640,425; and 10,280,622 (all of which are incorporated herein by reference).

Alternatively, $CO_2$ can be delivered into the concrete mix or an alkaline solution via a carbonation aid or $CO_2$ adsorbent microporous material that can absorb, adsorb or embed increased amount of $CO_2$ and used as a $CO_2$ delivery vehicle within an alkaline solution such as cement paste mix to carbonate the carbonatable elements as they dissolve and or react with the $CO_2$ delivered into the paste matrix. We call this process an "internal carbonation" process whereby the $CO_2$ is delivered using a delivery vehicle such as a microporous material on, around or in close proximity to the surface of the mineral containing carbonatable elements. The carbonatable elements can be released either from the carbonatable mineral containing one or more of the un-carbonated Ca, Mg, K, Fe and the like such as a pozzolan, hydraulic cement, non-hydraulic cement, hyaloclastite powder, lime, hydrated lime, hydroxyl groups, or any of the cement hydration byproducts and or salts or any other type of carbonatable minerals containing carbonatable elements from any and all sources that can be found in a mortar, concrete, alkaline, acidic or soil type solutions.

Table 4 below shows examples of carbonatable minerals such as hyaloclastites, volcanic ashes, or pumices that contain various amounts of amorphous and crystalline content. Examples 14 and 15 are rhyolitic glass such as perlite and the CaO content is below 1% by weight compared with the basaltic in Examples 1-13 where CaO ranges between 9 and 16% by weight.

TABLE 4

| | "Amorphous" | Clinopyroxene Ca(Mg, Fe, Al, Ti) (Si, Al)2O6 | Plagioclase Feldspar (Na, Ca)Al(Si, Al)3O8 | Olivine (Fe, Mg)2SiO4 | Calcite | Unidentified |
|---|---|---|---|---|---|---|
| 1 | >70 | — | 12 | 5 | 7 | <5 |
| 2 | >80 | | 10 | <5 | — | <5 |
| 3 | >70 | <3? | 11 | <5 | — | <5 |
| 4 | >80 | — | 13 | <3 | — | <5 |
| 5 | >55 | | 12 | 5 | 20 | <5 |
| 6 | >70 | — | 11 | 5 | <5 | <5 |
| 7 | >75 | — | 10 | 5 | — | <5 |
| 8 | >65 | — | 15 | 5 | <5 | <5 |
| 9 | >70 | <3? | 12 | 5 | | <5 |
| 10 | >30 | 25 | 43 | 5 | | <5 |
| 11 | >55 | | 15 | 5 | 15 | <5 |
| 12 | >40 | 17 | 37 | 4 | 1 | <5 |
| 13 | >70 | — | 15 | 8 | | <5 |
| 14 | >95 | | | | | <5 |
| 15 | >95 | | | | | <5 |

Referring now to FIG. 1, there is shown a flow diagram of a disclosed embodiment of a carbonatable mineral processing plant 10 in accordance with the present invention. A natural or man-made carbonatable mineral, such as hyaloclastite or slag, is mined from the ground at a mine site or recovered from a power plant or steel manufacturing mill. Unprocessed carbonatable mineral may have a particle size of about 1/32 to 1/2 an inch or in the range a very fine sand to gravel. The carbonatable mineral is transported from the source to the carbonatable mineral processing plant 10 where it is deposited in a supply pile 12. The carbonatable mineral in the supply pile 12 may have a suitable moisture content based on the type of micronizing mill used, such as approximately 2 to 20% by weight. However, in order to reduce the particle size of the unprocessed hyaloclastite to the micron range, it must have a moisture content of approximately 8% by weight or lower if processed using a vertical roller mill or less than 4% if using a horizontal ball mill. Therefore, it may be necessary to dry the unprocessed carbonatable mineral. Accordingly, unprocessed carbonatable mineral from the supply pile 12 is transported from the pile to a dryer 14 by a conveyor belt 16. The dryer 14 is typically a rotating drum or fluid bed (not shown) with a gas flame that projects into the drum or fluid bed or by an electric heating element (not shown). Helical flights or conveyer belts within the drum (not shown) or fluid bed dryer move the hyaloclastite, volcanic ash or pumice, from the inlet of the drum or fluid bed to the outlet. The temperature inside the dryer is sufficiently high to allow for the desired reduction in moisture based on the moisture content of the materials fed into the dryer or the type of micronizing mill used. In the case of using a vertical mill, the dryer mentioned above is not needed as the vertical mill incorporates a drying process in its structure. From the dryer 14, the dried carbonatable mineral is transported to a micronizing mill 18 by either a conveyor belt or a screw conveyor 20. One or more carbonatable minerals such as hyaloclastite, lava, volcanic ash, fly ash, bottom ash, boiler slag, iron slag, steel slag, clays or any other natural or man-made mineral that contains a sufficient amount of carbonatable elements, can be mixed before or after the dryer and prior to the loading in the micronizing mill. The mill 20 fractures and reduces the particle size of the carbonatable mineral, from the size it was mined or made to a desired particle size in the micron range. The temperature inside the micronizing mill is between 60 to 100 degrees C. The moisture content is between 1-8% depending on the type of mill. The carbon dioxide is delivered inside the mill at between 1-5 atmospheres. From the mill 18, the reduced-size carbonatable mineral is lifted by the air or gas flow into a particle size classifier 22 connected by a duct or pipe 24. The classifier separates particles that meet a desired size criteria from those that do not meet the criteria. Those particles that meet the size criteria are passed from the classifier 22 to a storage silo 26 by air flow or a screw conveyor 28. Those particles that are bigger than the size criteria are transported from the classifier 22 back to the input of the mill 18 by a retuning duct or pipe 30. The storage silo 26 is used to contain the carbonatable mineral of the desires particle size range until it can be transported, such as by rail or truck, to a customer or stored into a pond or storage pile.

In a disclosed embodiment, the present invention comprises a natural or man-made carbonatable mineral from one or more of a hyaloclastite, lava, volcanic ash, fly ash, bottom ash, slag, clays and the like, with a chemical composition preferably comprising approximately 20 to approximately 65 percent by weight $SiO_2$, approximately 4 to approximately 30 percent by weight $Al_2O_3$, 4 to approximately 45 percent by weight CaO, and optionally one or more of approximately 0 to approximately 18% MgO and approximately 0 to approximately 28 percent by weight $Fe_2O_3$, or a fly ash, bottom ash, boiler slag, iron slag, steel slag or any other natural or man-made mineral with a sufficient amount of carbonatable elements such as calcium, magnesium, potassium, sodium, iron and the like, ground into powder form. The particle size of the carbonatable mineral powder is sufficiently small such that the powder can be dissolved in an alkaline or acidic solution. In accordance with the present invention, in a disclosed embodiment thereof, $CO_2$ is fed or injected into a grinding mill; e.g., the micronizing mill 18, as the carbonatable mineral particles; e.g., hyaloclastite, lava, volcanic ash, fly ash, bottom ash, boiler slag, iron slag, steel slag or any other natural or man-made mineral with a sufficient amount of carbonatable elements, are fractured, ground or reduced in size so that the ground particles are exposed to the $CO_2$. During this fracturing, grinding or particle size reduction process, $CO_2$ will bind to the surface or penetrate the pores of the fine carbonatable mineral particles. The carbonatable mineral powder preferably has a volume-based mean particle size of less than or equal to approximately 100 μm, or less than or equal to approximately 80 μm, or less than or equal to approximately 60 μm, or less than or equal to approximately 40 μm, or less than or equal to approximately 20 μm, more preferably less than or equal to approximately 16 μm, most preferably less than or equal to approximately 12 μm, especially less than or equal to approximately 10 μm, more especially less than or equal to approximately 8 μm and most especially less than or equal to approximately 4 μm. The smaller the particle size for the pozzolan powder, the greater the surface area of the mineral for the $CO_2$ to bind and react with and/or carbonate one or more of the CaO, MgO, NaO, KO, $Fe_2O_3$ or other uncarbonated elements in the mineral as well as be dissolved or activated by an alkaline solution such as containing OH groups to initiate and sustain the pozzolanic and carbonation reaction. Different types of carbonatable minerals will fracture and expose fresh surface area and porosity at different particle sizes. The surface tension of carbon dioxide while penetrating the carbonatable mineral particle size surface and pores, may vary depending on the type and chemical composition of the carbonatable mineral. The smaller the particle size for the carbonatable mineral powder, the greater the surface area of the carbonatable mineral for the $CO_2$ to penetrate and react with and/or carbonate one or more of CaO, MgO, NaO, KO, $Fe_2O_3$ or other uncarbonated elements in the carbonatable mineral as well as be activated by an OH group to initiate and sustain the pozzolanic reaction or dissolve and initiate the carbonation reaction. However, there are economic limits for grinding rock to small particle sizes. Those limits are well known by those skilled in the art. The carbonatable mineral powder preferably has a Blaine value of approximately 500 to approximately 10,000, more preferably approximately 1000 to approximately 10,000, or approximately 1,500 to approximately 10,000, more preferably approximately 3,500 to approximately 10,000, most preferably approximately 4,500 to approximately 10,000, especially approximately 6,000 to approximately 10,000. The carbonatable mineral powder preferably has a Blaine value of greater than or equal to approximately 10,000. The foregoing ranges include all of the intermediate values. As the carbonatable mineral is ground to the desired particle size, such as in the micronizing mill 18, carbon dioxide in a gas, liquid or solid form is injected, mixed or blended with the carbonatable mineral particles within the grinding mill or at any other suitable point in the grinding mill circuit 10, such as in the dryer 14, the screw conveyor 28 and/or the storage silo 26. Alternatively, in another embodiment, the $CO_2$ in either a gas, liquid or solid form can be injected, mixed or blended with the ground carbonatable mineral particles after the carbonatable mineral has been ground to the desired particle size. As an example, $CO_2$ can be mixed with the final carbonatable mineral product as it leaves the classifier 22 and before it is stored in the silo 26. The ground or finished carbonatable mineral powder that is collected from the particle size classifier 22 can be transported to the storage silo 26 using an enclosed or sealed screw conveyor 28 of a desirable diameter and length. A series of pipes and nozzles can be attached to the screw conveyer housing along the length thereof, preferably in multiple rows around the radial section thereof, so that $CO_2$, a carbonation aid, a carbonation accelerant and/or a $CO_2$ adsorption enhancing compound and/or steam, or any combination thereof, can be injected into the conveyor housing as the carbonatable mineral powder travels thorough the conveyer. Thus, the ground carbonatable mineral powder is mixed, blended or exposed to $CO_2$, a carbonation accelerant, a $CO_2$ adsorption enhancing compound, steam or any combination thereof as it travels from the particle classifier 22 to the storage silo 26. It is also desirable that the screw conveyer assembly is sufficiently sealed so that the $CO_2$ is retained therein to be mixed or blended with the carbonatable mineral powder. It is also desirable that the $CO_2$, the carbonation accelerant and/or the $CO_2$ adsorption enhancing compound, the steam or any combination thereof is delivered at a pressure sufficient to thoroughly penetrate thorough the moving body of powder so that between the pressure of the gas being fed into the screw conveyer nozzles and the movement of the screw conveyer that any one of the $CO_2$, the carbonation aid, the carbonation accelerant, the $CO_2$ adsorption enhancing compound, the steam, or any combination thereof is dispersed throughout the powder and makes contact with the surface of the particles of the carbonatable mineral powder so that it is blended substantially uniformly. The optional carbonation aid, carbonation accelerant, $CO_2$ adsorption enhancing compound, steam, or any combination thereof, is added to bind as much $CO_2$ to the surface of or in close proximity to the carbonatable mineral particle so that as much $CO_2$ as possible is associated with the powder particles when it dissolves in an alkaline or acidic solution to react with the carbonatable elements contained in the carbonatable mineral such as the accelerant, $CO_2$ adsorption enhancing compound, steam, or any combination thereof with the pozzolan powder as described above. The screw conveyer mixing process is only an example of how the $CO_2$, the carbonation aid, carbonation accelerant, $CO_2$ adsorption enhancing compound, steam, or any combination thereof can be mixed or blended with the carbonatable mineral, such as pozzolan powder. The elevated temperature can be in the range of 30° C. to 250° C. The optional steam is used to provide heat and moisture to facilitate the binding of the $CO_2$, the carbonation aid, carbonation accelerant, $CO_2$ adsorption enhancing compound or any combination thereof with the pozzolan powder as described above. Steam is used to provide the appropriate and desired amount of moisture between 4% and 40%, with a temperature of 50 to 250° C.

A screw or auger profile can contribute to the quality and the efficiency of the mixing or blending of $CO_2$, the optional carbonation accelerant, $CO_2$ adsorption enhancing compound, steam, or any combination thereof, with the carbonatable mineral powder in the screw conveyor 28. A screw auger can have different flight and pitch types as follows: a standard pitch, single flight screws have the outside diameter equal to the pitch and are the most common screw type used for horizontal screw conveyors and inclines up to 10-degrees; variable pitch, single flight screws have increasing pitch with every flight and are used in screw feeders to provide uniform withdrawal of free-flowing bulk materials from hoppers, bins or silos; short pitch, single flight screws have the pitch reduced to ⅔ of the diameter and are most commonly used in inclined and vertical screw conveyor applications. Short pitch is also used in some variable pitch screw feeder applications. Standard pitch, double flight screws have the outside diameter equal to the pitch, very similar to standard pitch, single flight. A second set of flights is added 180-degrees apart from the first set of flights to provide a more even discharge of bulk materials. Standard pitch, double flight screws have the outside diameter equal to the pitch, very similar to standard pitch, single flight. A second set of flights is added 180-degrees apart from the first set of flights to provide a more even discharge of bulk materials. Half pitch, single flight screws have the pitch reduced to ½ of the diameter and are commonly used in inclined and vertical screw conveyor applications. ½ pitch is also used in some variable pitch screw feeder applications. Standard pitch, single tapered flight screws have a tapered outside diameter increasing from ½ to full diameter and are used in screw feeders to provide uniform withdrawal of free-flowing bulk materials from hoppers, bins or silos. Standard pitch, single ribbon flight screws have a space within the flight and around the center pipe to minimize the collection and buildup of viscous and sticky bulk materials. For additional mixing efficiency, it is desirable to use a conveyer with paddles or profile that can promote mixing or agitation in accordance with the present invention. Examples of these are: standard pitch, single flight with paddle screws have adjustable paddles located between the screw flights. Up to four paddles per pitch can be added for gentle and thorough mixing of the carbonatable mineral powder and the $CO_2$, the optional carbonation accelerant, $CO_2$ adsorption enhancing compound, steam or any combination thereof. Another example is a standard pitch, single cut flight screw notched at regular intervals on the outer edge to promote mixing and agitation of bulk material. Standard pitch, paddle screws with adjustable paddles are located in a helix around the diameter of the center pipe. Up to four paddles per pitch can be used for aggressive mixing and controlled flow of the pozzolan powder and $CO_2$ mixing. Another type is a standard pitch, single cut and folded flight screws that are notched at regular intervals on the outer edge and have lifting paddles to promote aggressive mixing and agitation of the carbonatable mineral powder and the $CO_2$, the optional carbonation accelerant, $CO_2$ adsorption enhancing compound, steam or any combination thereof.

As the carbonatable mineral powder travels through the length of screw conveyor 28, the mixing of the powder and $CO_2$, the optional carbonation aid, carbonation accelerant, $CO_2$ adsorption enhancing compound, steam or any combination thereof, should be optimized between the travel time, which is directly related to the rotation speed of the screw auger, to affect a sufficient amount of mixing of the $CO_2$ and the carbonatable mineral particles so that the $CO_2$ contacts, binds and/or reacts with the surface of the carbonatable mineral particles. Since the particles of the carbonatable mineral powder have a suitable small particle size and large surface area with a certain degree of porosity in accordance with the present invention, when the $CO_2$ contacts the carbonatable mineral particle's surface the $CO_2$ will be adsorbed on the surface or absorbed in the particles surface and pores and will start a carbonation process where the $CO_2$ will react with one or more of the CaO, MgO, FeO, KO, NaO, to convert the uncarbonated element or the oxide form to a carbonate form or some other type of crystal mineral that embodies carbon in its structure. It is desired that the carbonation reaction is extended and increased by the additional of $CO_2$ stored, absorbed or adsorbed by the carbonation aids, carbonation accelerants, $CO_2$ adsorption enhancing compound or any combination thereof, so that carbonation continues as the pozzolan dissolves over time in the alkaline or acidic solution. The carbonatable mineral powder within the grinding mill, such as the micronizing mill 22, and/or coming from the grinding mill will be at an elevated temperature due to the mechanical energy spent to break down the larger carbonatable mineral particles into a fine powder. Optionally water may be added into the micronizing mill in the presence of carbon dioxide up to 8% moisture or as needed to aid on the fracturing and grinding process especially in a roller mill or vertical roller plate mill. Given the elevated temperature inside the micronizing mill the water may create stem or reach an in-between state of vapor. As such the elevated temperature of the carbonatable mineral powder while contacting the $CO_2$, the carbonation aid, the carbonation accelerant, the $CO_2$ adsorption enhancing compound or any combination thereof will initiate and/or facilitate the carbonation reaction. It is also desirable that the screw conveyer 28 is heated with an electric heating element or infrared energy while the $CO_2$ is mixed or injected into screw conveyer. It is also desirable that the mixing and blending of $CO_2$ is aided by a light or electrostatic process that will enhance the carbonatable mineral powder affinity to attract, bind, absorb or adsorb $CO_2$ onto the particle's surface as well the optional carbonation aid, carbonation accelerant, $CO_2$ adsorption enhancing compound or any combination thereof, and accelerate the carbonation reaction on the particle's surface. Ultrasound or microwave treatment of the powder while it is being mixed with the $CO_2$ and optionally with the carbonation aid, carbonation accelerant, $CO_2$ adsorption enhancing compound or any combination thereof can aid in the $CO_2$ bind, absorb or adsorb $CO_2$ onto the particle's surface.

In another disclosed embodiment, the carbonatable mineral powder alone or either treated with $CO_2$ or a combination of $CO_2$ and a $CO_2$ adsorption or carbonation aid or carbonation enhancing compound or element or any combination thereof, can be mixed with carbon dioxide and a microporous material such as carbon nanomaterials, for example, graphite nanoplatelets (GP), carbon nanofibers (CNF), activated carbons (ACs), carbon nanotubes (CNTs) and similar carbon nanomaterials have a high surface area and porosity of various nanostructures with high gas adsorption properties. Due to high porosity these materials have a high adsorption rate of gases, and therefore $CO_2$ can be adsorbed into these materials structure. Graphene, a new class of carbon nanomaterials, is found to be economical and has novel properties similar to CNTs. Anyone of these types of carbon nanomaterials can be mixed with carbon dioxide and the carbonatable mineral powder in conveyer 28. Alternatively, carbon nanomaterials impregnated with carbon dioxide prior to mixing with the carbonatable mineral powder can also be mixed or blended with the carbonatable mineral powder having the chemical and physical properties described above. Optionally, the carbon microporous materials can be combined with a carbonation aid, a $CO_2$ adsorption or absorption enhancing compound or a carbonation accelerant compound or element. Therefore, these materials allow a relatively large amount of carbon dioxide to be stored on the surface or in close proximity thereto, of the carbonatable mineral and delivered into an alkaline solution such as a concrete mix or an acidic solution to further react with the uncarbonated Ca, Mg, Fe, Na, K and the like from the dissolution of the carbonatable mineral, cement or alkaline solution.

In another embodiment, the carbonatable mineral powder alone or either treated with $CO_2$ or a combination of $CO_2$ and a carbonation aid, a carbonation accelerant, a $CO_2$ adsorption or absorption enhancing compound or element or any combination thereof, can be mixed with carbon dioxide and a zeolite, such as a natural zeolite or a man-made zeolite, that has a high surface area and porosity of various nanostructures with relatively high gas adsorption properties. Due to their high porosity, zeolites have a high adsorption rate for gases, therefore $CO_2$ can be adsorbed into these material's structure. Any one of these types of zeolites can be mixed with carbon dioxide and the carbonatable mineral powder in the grinding mill and ground together or they can be mixed in the conveyer 28. Alternatively, zeolite loaded with carbon dioxide prior to mixing with the carbonatable mineral powder can also be mixed or blended with the carbonatable mineral powder having the chemical and physical properties described above. Optionally, the zeolite can be combined with a carbonation aid, a $CO_2$ adsorption enhancing compound or carbonation accelerant compound or element or any combination thereof. Therefore, these $CO_2$ adsorbent materials allow a relatively high amount of carbon dioxide to be stored on the surface, or in close proximity thereto, of the carbonatable mineral and delivered into an alkaline solution such as the concrete mix to further react with the uncarbonated Ca, Mg, Fe, Na, K and the like.

In a further embodiment, the carbonatable mineral powder can be ground, treated or mixed with ammonium salts, quinones, such as electrochemically-reduced quinones, or any other type of quinone, metal-organic framework compounds (MOFs), such as MIL-100(Fe), a Porous Iron Trimesate with a Hierarchical Pore Structure, cyclodextrin based MOFs, cyclic oligosaccharides that are mass-produced enzymatically from starch, porous organic polymers (POPs), covalent-organic frameworks (COFs), carboxylates, and the like. Ionic liquids (ILs) can be ground, mixed or blended with the pozzolan powder during the milling process, or post milling such as in the mixing conveyer or the silo. Any known type of $CO_2$ adsorbent, binder or carbonation accelerant or enhancer can be used in the mill to be ground with the carbonatable mineral or blended post grinding with the carbonatable mineral powder so that a sufficient or desirable amount of $CO_2$ is placed onto, or in close proximity to, the carbonatable mineral powder particle surface to react over time with the carbonatable elements in the powder state or as the carbonatable mineral dissolves in the alkaline solution when mixed in concrete. We call these elements $CO_2$ adsorption enhancers and or carbonation accelerants that serve to bind and provide additional amounts of $CO_2$ to the carbonatable mineral powder either on the surface thereof or in close proximity thereto so that it is present to react over time with the carbonatable elements while in the powder state or once the powder dissolve in a solution. Alternatively, the carbonation aids and microporous materials can be used to adsorb or embed $CO_2$ prior to being combined with the carbonatable mineral powder.

The mixture of the carbonatable mineral powder and $CO_2$ and optionally the microporous materials such as carbon nanomaterials, zeolites or any other $CO_2$ sorbent or carbonation accelerant compound, can then be stored in a hopper, bin or silo 26 until transported to a concrete manufacturing facility. During storage of the carbonatable mineral powder in the silo 26, the carbonatable mineral powder continues to be exposed to $CO_2$. Therefore, in accordance with the present invention additional $CO_2$ is delivered to the silo 26. The $CO_2$ delivered to the silo 26 can be at atmospheric pressure or preferably at an elevated pressure, such as up to and including 3 atmospheres (this range includes all of the intermediate values).

It is also desirable that the dryer 14 be heated with an electric heating element and that $CO_2$ be injected into the dryer. Since the carbonatable mineral in the dryer 14 has a moisture content, as the carbonatable mineral is dried steam will be produced. The combination of the steam, the dryer heat and the $CO_2$ will result in a carbonation reaction between the $CO_2$ and the carbonatable mineral within the dryer 14.

It is also desirable that the carbonatable mineral grinding is aided by a grinding aid that will enhance the carbonatable mineral powder affinity to attract and bind, absorb or adsorb $CO_2$ onto its surface or pores either through a physical, a chemical or electrostatic process. Such grinding aids are known in the industry and different types work differently to accomplish similar properties. There are different types of grinding aids such as ammonium salts, amines, alkanoamines for example monoethanolamine (MEA) and diglycolamine (DGA), aliphatic amines such as (triethylenetramine (TETA)) and tetraethylenepentamine (TEPA)) and alcoholamines (diethanolamine (DEA), triethanolamine (TEA) and triisopropanolamine (TIPA)). Glycol compounds are represented as ethylene glycol (EG) and diethylene glycol (DEG). In addition, there are more complex compounds such as aminoethylethanolamine (AEEA) and diethylenetriamine hydroxyethyl (HEDETA). Additional compounds that can bind $CO_2$ and accelerate carbonation include alkanalamines. Phenol and phenol-derivatives are also used as grinding aids or any combinations thereof of one or more of the above. By using grinding aids, the organic additives are adsorbed on the surface of the carbonatable mineral particles. This reduces the energy needed to break down the particles and reduces the surface charge. The latter is thus preventing the cohesion of carbonatable mineral particles. The organic additives also change the electrostatic forces between the particles by reducing the attraction forces (Van der Waal) and increasing the repulsion forces. The additives are thus behaving as surfactants. Many grinding additives are reported to give beneficial effects during hydration. Additionally, the $CO_2$ adsorption enhancer and carbonation accelerant enhances the amount of $CO_2$ stored on the surface, or in close proximity thereto, of the particles to be available to carbonate and/or be released to combine with the carbonatable minerals once the pozzolan particle dissolves in cement paste or any other alkaline solution.

A protein such as carbonic anhydrase can also be used as a grinding aid or an admixture to the grinding process to coat the carbonatable mineral particle surface so that it binds, absorbs, adsorbs or otherwise stores $CO_2$ on the particle surface or pores. Peptides, barnacle cement protein, cement proteins can also be used. Six barnacle-specific cement proteins (CPs) have been identified, four of which are thought to be interface proteins, CP19k, −20 k, −43 k, and −68 k, and two bulk proteins, CP52k and CP100k. Barnacle-specific CPs are those proteins present in the cement that share no homology with any other marine adhesive proteins or any other proteins. Soy protein can be used in a ratio of 0.05-1.5% by weight to the carbonatable mineral during the grinding process. Carbon nanomaterials can also be added into the grinding mill.

Any one or more of the grinding aids, $CO_2$ adsorption or absorption enhancers, carbonation enhancers, such as the carbon microporous materials, zeolites, carbonation accelerants and/or $CO_2$ adsorption enhancing compounds, steam, or any combination thereof, any aids in the $CO_2$ binding or adsorption process and/or the carbonation process, as described in the present inventions regardless of the nature of compositions as described in the present invention can be added or blended during the grinding or post grinding process to enhance the $CO_2$ adsorption, absorption and/or carbonation process during the carbonatable mineral powder state or after the dissolving of the carbonatable mineral powder in an alkaline or acidic solution, such as present in concrete, over time. We call these elements $CO_2$ adsorption enhancers and/or carbonation accelerants that serve to bind and provide additional amounts of $CO_2$ to the carbonatable mineral powder either on the surface thereof, or in close proximity thereto, so that it is present to react with the carbonatable elements while in the powder state or once the carbonatable mineral powder dissolves in an alkaline or acidic solution over time.

Porous organic polymers (POPs) are generally defined as a group of covalent organic porous materials with high porosity made of light different elements (carbon, boron, hydrogen, oxygen, and nitrogen) and strong covalent bonds. These organic macromolecules have high specific surface areas, tunable porosities, low densities, high chemical and thermal stabilities, variable compositions, convenient post-functionalization, extended π-conjugations, and their high contents of carbon, nitrogen, oxygen, and other non-metallic atoms. POPs have been classified into four types: covalent triazine frameworks (CTFs), hypercrosslinked polymers (HCPs), covalent organic frameworks (COFs), and conjugated microporous polymers (CMPs). All POPs are amorphous materials—except for a small number of CTFs and COFs that are crystalline materials with ordered structures prepared under thermodynamic control. Like nanoporous materials, POPs have many potential applications because of their high surface areas and uniform pore sizes, with large numbers of channels and active sites available for chemical reactions. Examples of these types of polymers are nitrogen-enriched microporous polymers containing various contents of amino groups through condensation reactions of melamine with formohydrazide, formamide, N,N-dimethylformamide (DMF), and N-methylformamide, 1,2,3-triazolo units; their Tz-CTF polymeric frameworks, hollow microspherical and microtubular carbazole-based COFs through condensations of Car-3NH$_2$ and the triformyl linkers TPA-3CHO, TPP-3CHO, and TPT-3CHO with various degrees of planarity, triarylamine monomers based (TPT-based COFs), β-ketoenamine-linked COFs (TFP-TPA, TFP-Car, and TFP-TPP) and the like. The porous organic polymers can adsorb or be embedded with carbon dioxide separately from the carbonatable mineral grinding process and used as a carbon dioxide delivery vehicle to the carbonatable mineral powder then mixed with the carbonatable mineral powder. Alternatively, porous organic polymers can be used as a grinding aid and fed or injected into the grinding mill while the carbonatable mineral is being ground into a fine powder either in the presence of carbon dioxide or atmospheric air. In other words these polymers provide an enhanced amount of carbon dioxide on the surface of or in close proximity to the carbonatable mineral particle surface mineral powder so that the carbon dioxide can react with the carbonatable elements in the powder state or over time while the carbonatable mineral powder and the porous organic polymers are dissolved in an alkaline or acidic solution and therefore the carbon dioxide mineralize the carbonatable elements contained in the carbonatable mineral powder creating carbonated minerals or compounds of various types. Alternatively, the carbonatable mineral powder combined with porous organic polymers can be exposed to carbon dioxide post-grinding at ambient or elevated temperatures, and optionally with steam, in the screw conveyer 22 or in the storage silo 26, such as described in the current invention.

Quinones are a special class of ketones in which carbonyl groups are a part of an aromatic ring of benzene, anthracene, or naphthalene such as ubiquitous biological pigments found in a range of living organisms (bacteria, fungi, higher plants, and in few animals). They exist in nature in many forms such as benzoquinones, naphthoquinones, anthraquinones, and polycyclic quinones. For example, the K vitamins (phylloquinone) are naphthoquinones. Quinones can adsorb or be embedded with carbon dioxide separately from the carbonatable mineral grinding process and used as a carbon dioxide delivery vehicle to the carbonatable mineral powder then mixed with the carbonatable mineral powder. Alternatively, quinones can be used as grinding aids and fed or injected into the grinding mill while the carbonatable mineral is being ground into a fine powder either in the presence of the carbon dioxide or atmospheric air. In other words quinones provide an enhanced amount of carbon dioxide on the surface of or in close proximity to the carbonatable mineral particle or mineral powder surface so that the carbon dioxide can react with the carbonatable elements in the powder state or over time while the carbonatable mineral powder and the quinine are dissolved in an alkaline or acidic solutions and therefore the carbon dioxide mineralize to carbonatable elements contained in the carbonatable mineral powder creating carbonated minerals of various types. Alternatively, the carbonatable mineral powder combined with quinones can be exposed to carbon dioxide post-grinding at ambient or elevated temperatures, and optionally with steam, in the screw conveyer 22 or in the storage silo 26, such as described in the current invention.

Ionic liquids (IL) are salts in the liquid state. In some contexts, the term has been restricted to salts whose melting point is below a specific temperature, such as 100° C. (212° F.). The ionic bond is usually stronger than the Van der Waals forces between the molecules of ordinary liquids. Because of these strong interactions, salts tend to have high lattice energies, manifested in high melting points. Some salts, especially those with organic cations, have low lattice energies and thus are liquid at or below room temperature. Examples include compounds based on the 1-ethyl-3-methylimidazolium (EMIM) cation and include: EMIM: Cl, EMIMAc (acetate anion), EMIM dicyanamide, $(C_2H_5)(CH_3)C_3H_3N^+_2 \cdot N(CN)^-_2$, that melts at −21° C. and 1-butyl-3,5-dimethylpyridinium bromide which becomes a glass below −24° C. In particular room-temperature ionic liquids (RTILs) are dominated by salts derived from 1-methylimidazole, i.e., 1-alkyl-3-methylimidazolium. Examples include 1-ethyl-3-methyl-(EMIM), 1-butyl-3-methyl-(BMIM), 1-octyl-3 methyl (OMIM), 1-decyl-3-methyl-(DMIM), 1-dodecyl-3-methyl-docecyl (MIM). Other imidazolium cations are 1-butyl-2,3-dimethylimidazolium (BMMIM or DBMIM) and 1,3-di(N,N-dimethylaminocthyl)-2-methylimidazolium (DAMI). Other N-heterocyclic cations are derived from pyridine: 4-methyl-N-butyl-pyridinium (MBPy) and N-octylpyridinium (C8Py). Conventional quaternary ammonium cations also form ILs; e.g., tetraethylammonium (TEA) and tetrabutylammonium (TBA). Certain types of Ionic Liquids can adsorb or be embedded with carbon dioxide separately from the carbonatable mineral grinding process and used as a carbon dioxide delivery vehicle to the carbonatable mineral powder then mixed with the carbonatable mineral powder. Alternatively, ionic liquids can be used as grinding aids and fed or injected into the grinding mill while the carbonatable mineral is being ground into a fine powder either in the presence of carbon dioxide or atmospheric air. In other words ionic liquids provide an enhanced amount of carbon dioxide on the surface of or in close proximity to the carbonatable mineral particle or mineral powder surface so that the carbon dioxide can react with the carbonatable elements in the powder state or over time while the carbonatable mineral powder and the Ionic Liquid are dissolved in an alkaline or acidic solution and therefore the carbon dioxide mineralizes the carbonatable elements contained in the carbonatable mineral powder creating carbonated minerals or compounds of various types. Alternatively, the carbonatable mineral powder coated with ionic liquids can be exposed to carbon dioxide post-grinding at ambient or elevated temperatures, and optionally with steam, in the screw conveyer 22 or in the storage silo 26, such as described in the current invention.

Covalent organic frameworks (COFs) are a type of organic crystalline porous material, prepared through reticular chemistry with building blocks featuring light elements (such as C, H, O, N, or B atoms), and connected through covalent bonds and extended in two or three dimensions. Examples of covalent organic frameworks are based on the condensations of widely used types of linkages in COFs such as boroxine, boronic ester, imine, hydrazone, azine, β-ketoenamine, imide, borazine, 1,4-dioxin, C=C bond, phenazine, triazine, urea, squaraine, and double-linkage. The chemical stability of covalent organic frameworks can be improved with the synthesis of β-ketoenamines from 1,3,5-triformylphloroglucinol (TFP-3OHCHO) and primary amines, through irreversible enol-keto tautomerization, creating robust networks that resist strong acids and bases. Covalent organic frameworks can adsorb or be embedded with carbon dioxide separately from the carbonatable mineral grinding process and used as a carbon dioxide delivery vehicle to the carbonatable mineral powder then mixed with the carbonatable mineral powder. Alternatively, covalent organic frameworks can be used as grinding aids and fed or injected into the grinding mill while the carbonatable mineral is being ground into a fine powder either in the presence of the carbon dioxide or atmospheric air. In other words, covalent organic frameworks provide an enhanced amount of carbon dioxide on the surface of or in close proximity to the carbonatable mineral powder surface so that the carbon dioxide can react with the carbonatable elements in the powder state or over time while the carbonatable mineral powder and the covalent organic framework are dissolved in an alkaline or acidic solution and therefore the carbon dioxide mineralizes the carbonatable elements contained in the carbonatable mineral powder creating carbonated minerals or compounds of various types. Alternatively, the carbonatable mineral powder coated with covalent organic frameworks can be exposed to carbon dioxide post-grinding at ambient or elevated temperatures, and optionally with steam, in the screw conveyer 22 or in the storage silo 26, such as described in the current invention.

Metal-organic frameworks (MOFs) are organic-inorganic hybrid crystalline porous materials that consist of a regular array of positively charged metal ions surrounded by organic 'linker' molecules. The metal ions form nodes that bind the arms of the linkers together to form a repeating, cage-like structure. Due to this hollow structure, MOFs have an extraordinarily large internal surface area and can adsorb or embed significant amounts of carbon dioxide in its pore structure. So far, more than 90,000 different MOF structures have been reported and over 500,000 are predicted to be possible. Metal Organic Frameworks (MOFs) constitute a class of solid porous materials, which consist of metal ions or metallic clusters, which act as nodes, and polydentate organic ligands, which act as linkers between the nodes. The metal nodes (metal ions or metallic clusters) act as connection points and the organic ligands bridges the metal centers through coordination bonds, thus, forming networks of one-dimension, two-dimensions, or three-dimensions. The main structural features of the MOFs, which are directly related to their properties and applications, are the high porosity, the large volume of the pores, which can reach the 90% of the crystalline volume or more, the large specific surface area (several thousand $m^2 \cdot g^{-1}$), and the high thermal stability (250-500° C.) due to the presence of strong bonds (e.g., C—C, C—H, C—O, and M-O). Examples of MOFs are Isoreticular Metal Organic Frameworks (IRMOFs), such as IRMOF-3 containing 2-amino-1,4-benzenedicarboxylic acid can undergo chemical modification with a diverse series of anhydrides and isocyanates yielding isostructural MOFs containing different functional groups, MOF-74-Mg, which is the magnesium analogue of MOF-74, shows the highest $CO_2$ uptake capacity of 228 and 180 $cm^3 \cdot g-1$ at 273 and 298 K and 1 bar, respectively, MOF-74-Mg, MOF-210 has a very high surface area of 10,450 $m^2 \cdot g^{-1}$ and shows a $CO_2$ uptake value of 2400 $mg \cdot g^{-1}$ (74.2 wt %, 50 bar at 298 K), MOF-177 or MIL-101 (Cr) (60 wt % and 56.9 wt %, respectively), MOF-200, MOF-210 under similar conditions. Other MOFs, which show considerably higher $CO_2$ uptake compared with other solid materials, are the NU-100 (69.8 wt %, 40 bar at 298 K), the MOF-5 (58 wt %, 10 bar at 273 K), HKUST-1 (19.8 wt %, 1 bar at 298 K), MIL-100 (Fe), a Porous Iron Trimesate with a Hierarchical Pore Structure, cyclodextrin based MOFs, IRMOF-74-III-$CH_2NH_2$, IRMOF-74-III-$CH_2NHMe$, carbamic types and the likes. Metal-organic frameworks can adsorb or be embedded with carbon dioxide separately from the carbonatable mineral grinding process and used as a carbon dioxide delivery vehicle to the carbonatable mineral powder then mixed with the carbonatable mineral powder. Alternatively, Metal-organic frameworks can be used as grinding aids and fed or injected into the grinding mill while the carbonatable mineral is being ground into a fine powder either in the presence of the carbon dioxide or atmospheric air. In other words, Metal-organic frameworks provide an enhanced amount of carbon dioxide on the surface of or in close proximity to the carbonatable mineral powder surface so that the carbon dioxide can react with the carbonatable elements in the powder state or over time while the carbonatable mineral powder and the MOFs are dissolved in an alkaline or acidic solutions and therefore the carbon dioxide mineralizes the carbonatable elements contained in the carbonatable mineral powder creating carbonated minerals or compounds of various types. Alternatively, the carbonatable mineral powder combined with Metal-organic frameworks can be exposed to carbon dioxide post-grinding at ambient or elevated temperatures, and optionally with steam, in the screw conveyer 22 or in the storage silo 26, such as described in the current invention.

Polymer brushes are special macromolecular structures with polymer chains densely tethered to another polymer chain (one-dimensional, 1D) or the surface of a planar (two-dimensional, 2D), spherical or cylindrical (three-dimensional, 3D) solid via a stable covalent or noncovalent bond linkage. In comparison with the corresponding linear counterpart with similar molecular composition, one-dimension polymer brushes have useful properties to adsorb gases including wormlike conformation, compact molecular dimension, and notable chain end effects due to their compact and confined densely grafted structure. Polymer brushes are composed of long macromolecules that are anchored by one chain-end to a surface at a density that is high enough such that the polymers stretch out, away from the surface. These brushes have become popular surface modifications in the development of adsorbent surfaces. As such, they can be broadly applied, ranging from (bio) medical materials to membrane technologies. Moreover, polymers are responsive to small changes in their environment, such as temperature, pH, or solvent composition. A polymer brush is a coating comprised of polymer chains, end-anchored to a substrate at a high areal density. These brushes can be composed of negatively charged anionic or positively charged cationic polyelectrolytes, zwitterionic polymers and neutral macromolecules or copolymers containing different types of monomers. Individually, surface-anchored polymers behave comparably to free polymers, assuming conformations that minimize their free energy, which consists of contributions from solvent, substrate, and polymer-polymer contacts, and the conformational entropy of the chain. In the simplest case, this is a "mushroom": a surface-anchored analogue to the coil and globule states found in free polymers. Under poor solvent conditions, however, the most favorable conformation is often a "pancake" state in which the polymer backbone adsorbs to the grafting surface. When the density of polymers on the surface becomes sufficiently high, the polymers start to overlap and volume interactions cause the chains to stretch away from the surface. This structure of "bristles" extending away from the substrate gives the polymer brush its name. The properties of polymer brushes alter in response to their environment as well, which has been utilized to control adhesion and friction, channel flow, drug release, and more. The monolithic materials are studied in terms of porosity and structure to investigate the $CO_2$ adsorption and how the capacity is affected by the initial particles compared with the ones with polymer brushes. Polymer brushes can be synthesized from any number of polymers among them poly (acrylic acid) (PAA), poly(vinyl caprolactam) (PVCL), and poly [(2-(methacryloyloxy)ethyl) trimethylammonium chloride] (PMETAC) A range of composite monoliths have been synthesized—rGO monolith (G), rGO/$CeO_2$ (GCe), rGO/$CeO_2$/PAA (GCePA), rGO/$CeO_2$/PVCL (GCePV), and rGO/$CeO_2$/PMETAC (GCePM)—that offers the possibility to study the effect of different functional polymers inside a monolith on the $CO_2$ adsorption. The use of polymer brushes with different responses in different environments, such as pH, can show other aggregations of the particles with the polymer brushes. Thus, it can also affect the preparation of the monolith with the addition of particles with different functionalities and responses. Polymer brushes can be grafted on to the surface of the carbonatable mineral to enhance the $CO_2$ adsorption properties and store an enhanced quantity of $CO_2$ of the surface of the carbonatable mineral powder surface. The polymer to create the polymer brushes can be added to the carbonatable mineral during grinding or post-grinding in any suitable quantity to create an enhanced $CO_2$ adsorption surface on the carbonatable mineral particle surface.

The foregoing materials that have high surface areas and/or high porosity and are used as delivery vehicles for placing $CO_2$ on the surface of or in close proximity to the carbonatable mineral powder surface are preferably combined with the carbonatable mineral powder in amounts of approximately 0.1% to approximately 40% by weight, more preferably approximately 1% to approximately 30% by weight, especially approximately 5% to approximately 20% by weight. The foregoing ranges include all of the intermediate values. The carbonatable mineral can be combined with any one or more of the above at any temperature or pressure suitable to the process. It can be combined at ambient, sub-ambient or above ambient temperature. The elevated temperature preferably can be in the range of 30° C. to 250° C. The optional steam use is to provide heat and moisture to facilitate the binding of the $CO_2$, the carbonation accelerant and/or $CO_2$ adsorption enhancing compound or any combination thereof with the carbonatable mineral powder as described above. Steam is preferably used to provide the appropriate and desired amount of moisture between approximately 4% and approximately 40%, with a temperature of approximately 50 to approximately 250° C. (the foregoing moisture and temperature range includes all of the intermediate values). It can be combined at a sub-atmospheric, atmospheric or greater than atmospheric pressure.

While it is desirable to mix the $CO_2$ with the carbonatable mineral powder at the carbonatable mineral manufacturing plant, the carbonatable mineral powder in accordance with the present invention can be delivered to a concrete ready-mix producer or precast plant and the like and the $CO_2$ added to the carbonatable mineral powder using a similar process described above similar to the screw conveyer 28 is injecting or mixing $CO_2$ into the carbonatable mineral powder. Alternatively, any other type of mixer or blender may mix or inject $CO_2$ into the carbonatable mineral powder similar to the process using the screw conveyer 28 above. Alternatively, the carbonatable mineral powder in accordance with the present invention can be delivered to a concrete ready-mix producer and the $CO_2$ added to the carbonatable mineral powder and hydraulic cement during the blending and/or concrete mixing process using any process known in the prior art.

Similarly, the carbonatable mineral powder can be delivered to a cement or lime plant where the $CO_2$ can be added to the carbonatable mineral powder during the blending process using any blending or mixing process known in the prior art. Another method of adding $CO_2$ to the carbonatable mineral powder is to mix the $CO_2$ with the carbonatable mineral powder and a hydraulic cement or lime, hydrated lime or quick lime, in powder form prior to delivery to a concrete producer and prior to mixing with water. Yet another method of adding $CO_2$ to the carbonatable mineral powder is to blend or otherwise mix the carbonatable mineral powder, the $CO_2$ and aggregate in dry form prior to mixing with water. Still another method of adding $CO_2$ to the carbonatable mineral powder is to blend or otherwise mix the carbonatable mineral powder, the $CO_2$, aggregate and water. A further method of adding $CO_2$ to the carbonatable mineral powder is to mix the $CO_2$ with anyone of the carbonation aid, or the microporous materials prior to combining the $CO_2$ embedded carbonation aid or microporous material with the pozzolan or mineral powder and a hydraulic cement, a non-hydraulic cement, lime, hydrated lime, quick lime, an alkaline solution or a hydroxyl group in powder form prior to delivery to a concrete producer and prior to mixing with water.

The carbonatable mineral powder according to the present invention, exposed to $CO_2$, or combined with one or more of the $CO_2$ adsorption aids, enhancers, carbonation accelerants, microporous materials, carbon microporous compounds, zeolites or in any combination thereof disclosed herein, can also be pelletized in relatively small pellets, prills or granules that can be mixed or combined with the cement, an alkaline or acidic solution. The process and equipment for forming pellets, prills and granules is well known to those skilled in the art. Alternatively, one or more of the $CO_2$ adsorption enhancers, carbonation accelerants, microporous compounds, zeolites, polymeric brushes, ionic liquids, metal organic frames, organic microporous materials, wallastonite, or in any combination thereof disclosed herein can be combined or embedded with $CO_2$ prior to mixing with the carbonatable mineral and then be pelletized in relatively small pellets, prills or granules that can be mixed or combined with the cement, an alkaline or acidic solution. The process and equipment for forming pellets, prills and granules is well known to those skilled in the art.

In another embodiment, the carbonatable mineral with the chemical and physical properties described above can be delivered to the ready mix or precast plant and stored in a silo in powder form. Prior to the mortar or concrete batch mixing of carbonatable mineral, cement and aggregate, the carbonatable mineral powder in accordance with this invention, is mixed with carbonated water or carbonic acid and made into a slurry or a liquid admixture and stored into an enclosed tank. Alternatively, the carbonatable mineral powder is mixed with water and carbon dioxide into a liquid mixture with a high concentration of carbon dioxide within the mixture. This liquid or slurry mixture is then kept for a length of time sufficient to allow the carbonatable elements contained in the carbonatable mineral to react with or absorb or absorb the carbon dioxide. After the sufficient length of time, the carbonatable elements react with the carbon dioxide or the carbonic acid from the slurry and lower the amount of carbon dioxide or carbonic acid to a level where the slurry can then be added into a concrete batch plant mixer to be mixed with cement, aggregate and water. In such case the quantity of water added to the mixing of cement, aggregate and carbonated carbonatable mineral slurry would have to be adjusted to take into consideration the amount of water present in the carbonated carbonatable mineral slurry or admixture. Alternatively, and optionally, various types of chemical admixtures can be added to the carbonatable mineral when mixing with carbonic acids or carbonated water. Such admixtures can be water reducers and any other concrete property enhancing admixtures as well as carbonatable mineral carbonation enhancing properties such as sulfates, alkali, earth alkali-sulfates, amines, alaknolamines, such as for example monoethanolamine (MEA) and diglycolamine (DGA), aliphatic amines, such as triethylenetetramine (TETA) and tetraethylenepentamine (TEPA) and alcoholamines, such as diisopropanolamine (DIPA), diethanolamine (DEA), methyldiethanolamine (MDEA), triethanolamine (TEA) and triisopropanolamine (TIPA), In addition, proteins that can enhance the carbonatable mineral absorption, adsorption or carbonation may be mixed in with the carbonatable mineral and the carbonated water, carbonic acid or carbon dioxide. A protein that coats the carbonatable mineral particle so that it binds, absorbs, adsorbs or otherwise stores $CO_2$ onto the particle surface. Peptides, barnacle cement protein, cement proteins can also be used. Six barnacle-specific cement proteins (CPs) have been identified, four of which are thought to be interface proteins, CP19k, −20 k, −43 k, and −68 k, and two bulk proteins, CP52k and CP100k. Barnacle-specific CPs are those proteins present in the cement that share no homology with any other marine adhesive proteins or any other proteins. Soy protein may be used in a ratio of 0.05-1.5% by weight to the carbonatable mineral during the mixing of carbonatable mineral and the carbon dioxide, carbonated water or carbonic acid.

Micro-organisms that have the capacity to produce carbonates through its metabolic activity to improve the carbonation process can also be used. In nature, a lot of bacteria are capable of precipitating calcite ($CaCO_3$) and potentially other carbonates. According to the way calcium carbonate is produced, the general used bacteria could be primarily categorized into two sorts, i.e., urease bacteria and non-urease bacteria. Various urease bacteria exist in nature, among which *Bacillus pasteurii, Bacillus acrius, Bacillus sphaericus, Sporosarcina aquimarina, Bacillus megaterium,* etc. are frequently proposed for the self-healing concrete. *Bacillus pasteurii*, a Gram-positive bacterium isolated from soil, can grow normally at temperatures ranging from 15 to 37° C. The urease activities of *Bacillus pasteurii* is outstanding, which could rapidly decompose urea in the environment into ammonium and carbonate. *Bacillus megaterium* belongs to Gram-positive bacterium. Its survival and growth temperature interval extends largely between 3 and 45° C. *B. sphaericus*, Gram-positive aerobic bacterium, forms ellipsoidal spores and is able to produce urease to hydrolyzed urea. Bacterial urease can hydrolyze urea, which will cause $CaCO_3$ precipitation and provide improved properties in concrete. In metabolism, urease-catalyzing urea hydrolysis is secreted by urease organisms. The non-urease bacteria, *Bacillus pseudofirmus, Bacillus cohnii, Bacillus halodurans, Bacillus* mucilaginous L3, *Enterococcus faecalis, Geobacillus stearothermophilus, Bacillus subtilis,* etc., are widely studied as non-urease bacteria inducing calcium carbonate precipitation. *Bacillus subtilis* is a Gram-positive bacterium that forms oval or cylindrical spores. Numerous *Bacillus subtilis* are used in agriculture and in some medicines, therefore it is not detrimental to human health. The *Bacillus pseudofirmus* hydrolyze urea into $NH_3$ and $CO_2$ by using urease produced by themselves. For non-urease bacteria, they will transform organic acids to form calcium carbonate precipitates through their own vital activities under oxygen-containing conditions. Calcium lactate or calcium acetate are often added to nutrients that non-urease bacteria can eventually convert to calcium carbonate. Most microorganisms are intolerant to alkaline environments. The *Bacillus pseudoadamentosa* has an exceptional ability to adapt to the alkaline conditions where the surviving pH value can be up to 11.0. At 10 pH condition, the growth of *Bacillus pseudofirmus* is fast, indicating the most alkali-resistant behavior. The microporous structure of the carbonatable mineral powder can provide adequate room and sustain excellent connectivity for the growth and metabolism of microorganisms. Meanwhile, the comparatively thick surface can reduce the penetration of high alkali substances, which can significantly increase the tolerance of concrete bacteria. *Bacillus pasteurella* was found to survive in concrete (pH=12) with the protection of zeolite and to produce calcium carbonate crystals.

In another embodiment the carbonatable mineral powder can be mixed with carbon dioxide and water or carbonic acid and a zeolite, such as a natural zeolite or a man-made zeolite, that has a high surface area and porosity of various nano-structures with high gas adsorption properties. Due to high porosity these materials have a high adsorption rate for gases, therefore $CO_2$ can be adsorbed into these material structures. Any one of these types of zeolites can be mixed with carbon dioxide and the carbonatable mineral powder in the grinding mill and ground together or they can be mixed in the conveyer 28. Alternatively, zeolites impregnated with carbon dioxide prior to mixing with the carbonatable mineral powder can also be mixed or blended with the carbonatable mineral powder having the chemical and physical properties described above. Therefore, these $CO_2$ adsorbent materials allow a high amount of carbon dioxide to be stored and delivered on the surface of the carbonatable mineral and delivered into a concrete mix or an alkaline or acidic solution to further react with the uncarbonated Ca, Mg, Fe, Na, K and the like contained in the carbonatable mineral.

Zeolites can be natural or synthetic and are composed of reactive $SiO_2$ and $Al_2O_3$ in its composition. There are more than 50 natural zeolite minerals and 150 synthetic ones are known and used in different industries today. Natural zeolites are hydrated aluminosilicates that occur mainly in altered volcanic tuffs. Natural zeolites are found distributed in deposits around the world. Natural zeolites have generally been considered low quality material because they are a mineral with a heterogeneous composition with different physical and chemical properties. Due to volcanic origin and because of alteration and weathering, zeolite deposits can contain substantial amounts of clays, feldspars or glass. Zeolites consist of an open silica framework, for which alumina can substitute in variable proportions, whereas exchangeable alkaline and alkaline-earth metals compensate for the resulting charge deficit. An example of zeolite can have the following composition: zeolite of the clinoptilolite-heulandite series (51%), gypsum (13%), albite (17%), biotite (10%) and quartz (9%) and the following chemical composition: $SiO_2$ 59.81%, $TiO_2$ 0.19%, $Al_2O_3$ 14.32%, FeO 1.04%, MgO 0.83%, CaO 5.50%, $Na_2O$ 5.76%, $K_2O$ 1.36%. Other types of natural zeolite are Analcime, Phillipsite, Chabazite, Erionite, Mordenite, Clinoptilolite with various amount and ratios of $SiO_2$ and $Al_2O_3$ as well as other elements among them carbonatable elements. Because zeolites are microporous, the water absorption properties result in a high water demand when used as a pozzolan in concrete. Zeolites with a Si/Al ratios higher than about 3 are classified as high-silica zeolites, which tend to be more hydrophobic. Zeolites have microporous structures with a typical diameter of 0.3-0.8 nm. Like most aluminosilicates, the framework is formed by linking of aluminum and silicon atoms by oxides. This linking leads to a 3-dimensional network of Si—O—Al, Si—O—Si, and Al—O—Al linkages. The aluminum centers are negatively charged, which requires an accompanying cation. These cations are hydrated during the formation of the materials. The hydrated cations interrupt the otherwise dense network of Si—O—Al, Si—O—Si, and Al—O—Al linkage, leading to regular water-filled cavities. Because of the porosity of the zeolite, the water can exit the material through channels. Because of the rigidity of the zeolite framework, the loss of water does not result in collapse of the cavities and channels. When dried and processed according with the current invention, the micropores found in zeolite can adsorb relatively high amounts of $CO_2$ gas during the processing. Some of the $CO_2$ adsorbed in the zeolite filled micropores can react with the carbonatable minerals or zeolite found in the zeolite composition while most $CO_2$ will be retained either as a gas or liquid deposited in the micropores by capillary condensation. As such the $CO_2$ filled zeolite particles then can be combined with the carbonatable mineral and therefore disposed on or adjacent the surface of the carbonatable mineral powder particles and used as a delivery vehicle for the $CO_2$ to be present to carbonate the carbonatable elements from the carbonatable mineral in the powder form or over time when dissolved in an alkaline or acidic solution such as when added to concrete and released over time as the pozzolanic or carbonation reaction progresses and the zeolite porosity structure dissolves in the high alkaline cement paste further reacting with the calcium hydroxide generated by the cement hydration process. In other words, a carbon dioxide embedded zeolite sorbent powder processed in accordance with the present invention can deliver substantially larger amounts of carbon dioxide in close proximity to the carbonatable mineral powder when placed in an alkaline solution such as a concrete mix to mineralize both the carbonatable elements from the carbonatable mineral powder or zeolites contained therein and to react with the calcium hydroxide from the cement hydration process as well as a $CO_2$ storage vehicle in a sequestered state or a hydroxyl group of such as Ca, Mg, K and Na or any other alkaline solution, acidic solution or salt water.

Synthetic zeolite can be used in a similarly way to first adsorb $CO_2$ within its pores and used in the same manner as described above. In addition, when manufacturing a synthetic zeolite, a significantly greater amount of carbonatable minerals or zeolites, such as Ca, Mg, K and Na can be used to design a zeolite with desired chemical and crystalline properties to perform as delivery vehicle for $CO_2$ combined with a hyaloclastite pozzolan or mineral powder to be used in an alkaline solution such as into a concrete mix. Synthetic zeolite from a structural group (Nickel-Strunz classification) includes

- 09.GA.—Zeolites with TsO10 units (T=combined Si and Al)—the fibrous zeolites
  - Natrolite framework (NAT): gonnardite, natrolite, mesolite, paranatrolite, scolecite, tetranatrolite
  - Edingtonite framework (EDI): edingtonite, kalborsite.
  - Thomsonite framework (THO): thomsonite-series
- 09.GB.—Chains of single connected 4-membered rings
  - Analcime framework (ANA): analcime, leucite, pollucite, wairakite
  - Laumontite (LAU), yugawaralite (YUG), goosecreekite (GOO), montesommaite (MON)
- 09.GC.—Chains of doubly connected 4-membered rings
  - Phillipsite framework (PHI): harmotome, phillipsite-series
  - Gismondine framework (GIS): amicite, gismondine, garronite, gobbinsite
  - Boggsite (BOG), merlinoite (MER), mazzite-series (MAZ), paulingite-series (PAU), perlialite (Linde type L framework, zeolite L, LTL)
- 09.GD.—Chains of 6-membered rings-tabular zeolites
  - Chabazite framework (CHA): chabazite-series, herschelite, willhendersonite and SSZ-13
  - Faujasite framework (FAU): faujasite-series, Linde type X (zeolite X, X zeolites), Linde type Y (zeolite Y, Y zeolites)
  - Mordenite framework (MOR): maricopaite, mordenite
  - Offretite-wenkite subgroup 09.GD.25 (Nickel-Strunz, 10 ed): offretite (OFF), wenkite (WEN)
  - Bellbergite (TMA-E, Aiello and Barrer; framework type EAB), bikitaite (BIK), erionite-series (ERI), ferrierite (FER), gmelinite (GME), levyne-series (LEV), dachiardite-series (DAC), epistilbite (EPI)
- 09.GE.—Chains of T10O20 tetrahedra (T=combined Si and Al)
  - Heulandite framework (HEU): clinoptilolite, heulandite-series
  - Stilbite framework (STI): barrerite, stellerite, stilbite-series
  - Brewsterite framework (BRE): brewsterite-series
- Others
  - Cowlesite, pentasil (also known as ZSM-5, framework type MFI), tschernichite (beta polymorph A, disordered framework, BEA), Linde type A framework (zeolite A, LTA)

In a further embodiment, carbonatable mineral powder can be blended or mixed with carbon dioxide or carbonic acid and ammonium salts, quinones, such as electrochemically-reduced quinones, or any other type of quinone, metal-organic framework compounds (MOFs), such as MIL-100 (Fe), a Porous Iron Trimesate with a Hierarchical Pore Structure, cyclodextrin based MOFs, cyclic oligosaccharides that are mass-produced enzymatically from starch, porous organic polymers (POPs), covalent-organic frameworks (COFs), carboxylates, and the like. Ionic liquids (ILs) can be ground, mixed or blended with the pozzolan or mineral powder during the milling process, or post milling, such as in the mixing conveyer or the silo. Any known type of $CO_2$ adsorbent, binder or carbonation accelerant or enhancer can be used in the mill to be ground with the carbonatable mineral or blended post grinding with the carbonatable pozzolan or mineral powder so that a sufficient or desirable amount of $CO_2$ is placed onto, or into close proximity to, the powder particle's surface to react with the carbonatable minerals during the powder state or as the pozzolan dissolves into the alkaline solution over time such as when mixed in concrete.

In a further embodiment, the pozzolan powder can be blended or mixed with carbon dioxide or carbonic acid and ammonium salts, quinones, such as electrochemically-reduced quinones, or any other type of quinone, metal-organic framework compounds (MOFs), such as MIL-100(Fe), a Porous Iron Trimesate with a Hierarchical Pore Structure, cyclodextrin based MOFs, cyclic oligosaccharides that are mass-produced enzymatically from starch, porous organic polymers (POPs), covalent-organic frameworks (COFs), carboxylates, and the like. Ionic liquids (ILs) can be ground, mixed or blended with the pozzolan powder during the milling process, or post milling, such as in the mixing conveyer or the silo. Any known type of $CO_2$ adsorbent, binder or carbonation accelerant or enhancer can be used in the mill to be ground with the hyaloclastite or blended post grinding with the pozzolan powder so that a sufficient or desirable amount of $CO_2$ is placed onto, or into close proximity to, the powder particle's surface to react with the carbonatable minerals during the powder state or as the pozzolan dissolves into the alkaline solution when mixed in concrete over time.

Graphite nanoplatelets (GP), carbon nanofibers (CNF), activated carbons (ACs), carbon nanotubes (CNTs) and similar carbon nanomaterials have shown good gas adsorption properties. Due to high porosity, these materials have a high adsorption rate of gases, therefore $CO_2$ can be adsorbed into these materials structure. Graphene, as new class of carbon nanomaterials, is found to be economical and has novel properties similar to CNTs. Carbon nanomaterials impregnated with carbon dioxide would then be mixed or blended with the carbonatable mineral having the chemical and physical properties described above. Therefore, these materials allow a relatively large amount of carbon dioxide to be stored on the surface of the carbonatable mineral or in the carbonatable mineral slurry or admixture and delivered into the concrete mix to further react with the uncarbonated Ca, Mg, Fe, Na, K and the like. We call all these types of carbon materials microporous carbon materials. Microporous carbons materials can adsorb or be embedded with carbon dioxide separately from the carbonatable mineral grinding process and used as a carbon dioxide delivery vehicle to the carbonatable mineral powder then mixed with the carbonatable mineral powder. Alternatively microporous carbons materials may be used as grinding air and fed or injected into the grinding mill while the hyaloclastite is being ground into a fine powder either in the presence of the carbon dioxide or atmospheric air. In other words microporous carbons materials provide an enhanced amount of carbon dioxide on the surface or close proximity of the carbonatable mineral particle surface mineral powder so that the carbon dioxide can react with the carbonatable elements such as one or more of the un-carbonated Ca, Mg, Na, K, Fe, and the like in the powder state or over time while the carbonatable mineral powder and the CO2 from embedded in the microporous carbon arc dissolved in an alkaline or acidic solution and therefore the carbon dioxide mineralize to carbonatable elements contained in the carbonatable mineral powder creating carbonated minerals of various types. Alternatively, the carbonatable mineral powder combined with microporous carbon materials can be exposed to carbon dioxide during grinding process or post grinding at ambient or elevated temperatures, and optionally with steam, in the screw conveyer 22 or in the storage silo 26, such as described in the current invention. The microporous materials can be combined with $CO_2$ first and then combined with the carbonatable mineral powder.

Wollastonite is a calcium silicate (inosilicate) mineral (CaSiO3) that may contain small amounts of iron, magnesium, and manganese substituting for calcium. In a pure $CaSiO_3$, each component forms nearly half of the mineral by weight: 48.3% of CaO and 51.7% of $SiO_2$. In some cases, small amounts of iron (Fe), and manganese (Mn), and lesser amounts of magnesium (Mg) substitute for calcium (Ca) in the mineral formula (e.g., rhodonite). Wollastonite can form a series of solid solutions in the system $CaSiO_3$—$FeSiO_3$, or hydrothermal synthesis of phases in the system $MnSiO_3$—$CaSiO_3$. The acicular nature of the wollastonite fiber allows it to adsorb or absorb $CO_2$ on it's surface and pores. Wollastonite powders impregnated with carbon dioxide would then be mixed or blended with the carbonatable mineral having the chemical and physical properties described above. Wollastonite fibers can adsorb or be embedded with carbon dioxide separately from the carbonatable mineral grinding process and used as a carbon dioxide delivery vehicle to the carbonatable mineral powder then mixed with the carbonatable mineral powder. Alternatively, wollastonite can be added into the grinding mill while the carbonatable mineral is being ground into a fine powder either in the presence of the carbon dioxide or atmospheric air. In other words the wallastonite can provide an enhanced amount of carbon dioxide on the surface or close proximity of the carbonatable mineral particle surface mineral powder so that the carbon dioxide can react with the carbonatable elements in the powder state as well as the calcium contained in the wollastonite chemical composition or over time while the carbonatable mineral powder and wollostonite are dissolved in an alkaline or acidic solutions and therefore the carbon dioxide mineralize the carbonatable elements contained in the carbonatable mineral powder creating carbonated minerals or compounds of various types. Alternatively, the carbonatable mineral powder combined with wollastonite can be exposed to carbon dioxide post grinding at ambient or elevated temperatures, and optionally with steam, in the screw conveyer 22 or in the storage silo 26, such as described in the current invention.

The carbonatable mineral powder slurry containing ground carbonatable mineral, water, $CO_2$ and any one or more of the carbonation aids, accelerants, admixture, proteins, enzymes, bacteria or micro-porous materials, frameworks, polymers or microporous carbons are mixed in a silo or storage tank at a desired temperature, such as ambient or elevated temperature, and at a desired pressure, such as negative, atmospheric or elevated pressure, until the desired carbonation reaction between the $CO_2$ and the un-carbonated elements such as Ca, Mg, Na, K, Fe and the like takes place. Therefore, the carbonation aid, accelerants, admixtures, proteins, enzymes or micro-porous materials, frameworks, polymeric materials allow a relatively large amount of carbon dioxide to be stored or otherwise adsorbed or absorbed on the surface of the carbonatable mineral or in the carbonatable mineral slurry or admixture to allow the $CO_2$ to react with the carbonatable elements or minerals while in the slurry state and optionally retain a sufficient amount of $CO_2$ on its surface or pores to further react with the carbonatable elements or minerals over time when mixed in an alkaline or acidic solution, such as cement, lime, concrete or alkaline or acidic solution. The carbonated or carbonatable mixture or carbonatable mineral mixture containing $CO_2$ in accordance with the present invention can then be delivered into the concrete mix to further react with the uncarbonated Ca, Mg, Fe, Na, K and the like found the cement paste.

Alternatively, when one or more of the carbonatable elements contained in the carbonatable mineral have reached a sufficient or desired level of carbonation and the carbonatable mineral has transformed into a desired or sufficiently carbonated state, the now carbonated mineral, or carbonated portion of the mineral, can be removed and used in suitable applications. As such the $CO_2$ reacted with the carbonatable elements is mineralized and permanently removed from the atmosphere. The carbonated mineral can then be used as aggregates, as mineral fillers, placed back into a storage pond or pile, combined with soil and any other type of suitable uses. The elements that cannot be carbonated such as silica, alumina, titanium and any other elements contained in the portion of the carbonatable mineral chemical composition can also be separated from the carbonated element portion of the solution and used in whatever suitable applications.

Additionally, the carbonated or carbonatable mineral containing $CO_2$ in accordance with the present invention can also be used as a pozzolan, admixture, or aggregate in concrete or mortars using portland cement, any other hydraulic and non-hydraulic cements, lime or any alkaline solution. Preferably, the carbonated mineral powder or carbonatable mineral mixture containing one or more of the microporous carbon, carbon nanotubes, zeolites, amines, enzymes, protein, amino acids, bacteria, metal-oxide frameworks, ionic liquids, polymer brushes, covalent organic polymers, wollastonite and the like combined with $CO_2$ in accordance with the present invention can be formed into a pellet, a granule or a prill. The methods and machinery to form powdered minerals into pellets, granules or prills is well known in the art. The pellets, granules or prills are preferably approximately ⅛ inch to ¼ inch in size and can be mixed with any alkaline solution such as cement paste, lime, alkaline hydroxyl groups such as potassium hydroxide, sodium hydroxide, lithium hydroxide, saltwater, alkaline or acidic soils. Alternatively, the carbonatable mineral powder mixture containing $CO_2$ in accordance with the present invention can also be used as a mineral plant nutrient or soil enriching additive and applied to or mixed with soil. Preferably, the carbonatable or carbonated mineral powder containing $CO_2$ impregnated with one or more of the microporous carbon, carbon nanotubes, zeolites, amines, enzymes, protein, amino acids, bacteria, metal-oxide frameworks, ionic liquids and the like in accordance with the present invention can be formed into a pellet, a granule or a prill. The methods and machinery to form powdered minerals into pellets, granules or prills is well known in the art. The pellets, granules or prills are preferably approximately ⅛ inch to ¼ inch in size and are preferably applied or mixed with soil.

Additionally, the carbonated mineral or pozzolan mixture or carbonatable minerals containing $CO_2$ in accordance with the present invention can also be used as a polymer additive, rubber additive, and all other types of mineral filler applications. The carbonated or carbonatable mineral containing $CO_2$ in accordance with the present invention can be used as an additive or filler in any polymeric material (thermoplastic or thermosetting), synthetic rubber or natural rubber. Preferably, the carbonated or carbonatable mineral containing $CO_2$ in accordance with the present invention can be used as an additive in polyurethane, polyisocyanurate, styrene and a host of other polymeric materials. The thermoplastic resin component useful in the present invention can be selected from one or more of the acrylonitrile butadiene styrene (ABS), acrylic-styrene-acrylonitrile (ASA) and other specialist styrenics, aramids PI aromatic polyamide, cellulosics (CA, CAB, CAP, CN), ethylene vinyl acetate (EVA), expanded polystyrene (EPS), expanded polypropylene (EPP), fluoroplastics (PTFE FEP), nylons (polyamides) (PA, PEEK™) (polyaryletheretherketone), polybenzimidazole (PBI), polybutene-1 (PB-1), polycarbonate (PC), polyether sulfone (PES), polyoxymethylene (POM), polyacetals, polyether ether ketone (PEEK), polyetherimide (PEI), polyesters (thermoplastic) (PETP, PBT, PET), polyethylene (PE), polyethylene (High Density) (HDPE), polyethylene (Low Density) (LDPE, LLDPE), polyethylenetheraphthalate (PET), polypropylene (PP), polyphenylene oxide (PPO), polyphenylene sulphide (PPS), polymethylpentene (PMP), polystyrene (PS), polystyrene (General Purpose) (GPPS), polystyrene (High Impact) (HIPS), poly(vinyl alcohol) (PVOH, PVA, or PVAI), polyvinyl chloride (PVC), styrene acrylonitrile (SAN), acrylonitrile styrene acrylate (ASA), thermoplastic elastomers (TPE, TPR).

Other engineered thermoplastics or plastic blends are also suitable. Examples include polycarbonate, nylon, vinyl and blends of ABS-PVC, ABS-polycarbonate, and ABS-polyurethane. Additional examples of such materials are: ABS resins, ASA resins, ionomers, nylons, polyarylene oxides, polyolefins, styrene polymers and copolymers such as styrene butadiene, vinyl polymers and copolymers such as poly(vinyl chloride), poly(vinyl fluoride), vinylidene chloride/vinyl chloride copolymer, polytetrafluoroethylene (Teflon) and the like, including blends, and recycled or impure plastics. The base resins can be supplied in powder form or pellet form or as a blend of the two forms.

Additionally, acrylic plastics or coating can also use the carbonatable minerals containing one or more un-carbonated elements as a filler in accordance with the present inventions. Generally there are two main acrylic types: polyacrylic acids (PAA) and its ester derivatives (PAc) and poly(methyl methacrylate) (PMMA). PMMA is also known by trade names such as Lucite, Perspex and Plexiglas. Acrylic paint consists of PMMA particles suspended in water.

Renewable plastics, such as polylacticacid (polylactide), can also use carbonatable or carbonated mineral filler in accordance with the present invention.

Polymeric coatings and sealants such as urethane, urethane elastomeric, latex, acrylic, acrylic latex, acrylic elastomeric, epoxy, elastomeric epoxy, alkyd, silicone, silicone elastomeric and fluoropolymer based technologies and others including high performance systems based on silazanes and ceramers can also use the carbonated or carbonatable mineral filler in accordance with the present inventions.

In another disclosed embodiment, the present invention comprises carbonatable mineral in powder form. The particle size of the carbonatable mineral powder is sufficiently small such that the carbonatable mineral powder can be dissolved in an alkaline or acidic solution. The carbonatable mineral preferably has a volume-based mean particle size of less than or equal to approximately 100 μm, more preferably less than or equal to 80 μm, or less than or equal to approximately 60 μm, preferably less than or equal to approximately 40 μm, more preferably less than or equal to approximately 20 μm, most preferably less than or equal to approximately 15 μm, especially less than or equal to approximately 10 μm, more especially less than or equal to approximately 5 μm. The smaller the particle size for the hyaloclastite, volcanic ash or pumice powder the better. However, there are economic limits for grinding rock to small particle sizes. Those limits are well known by those skilled in the art. The carbonatable mineral powder preferably has a Blaine value of approximately 500 to approximately 10,000, more preferably approximately 1,000 to approximately 10,000, of approximately 1,500 to approximately 10,000, more preferably approximately 3,500 to approximately 10,000, most preferably approximately 4,500 to approximately 10,000, especially approximately 6,000 to approximately 10,000. The carbonatable mineral has a Blaine value of greater than or equal to approximately 10,000. The foregoing ranges include all of the intermediate values.

If the uncarbonated mineral is found in a powder form with a particle size sufficiently small to be dissolved in an alkaline or acidic solution, such as the particle size described herein, then the grinding process described herein can be skipped. Fly ashes for example can be found in powder form and may not need to be ground in a mill. Optionally, such minerals can be screened or classified to obtain the desired particle size or particles size range. All subsequent steps to the grinding process described herein are applicable.

To achieve the desired particles size, the carbonatable mineral can be ground using conventional mineral grinding equipment including, but not limited to, a ball mill, a roll mill or a plate mill. A particle size classifier can be used in conjunction with the mill to achieve the desired particle size. Equipment for grinding and classifying carbonatable mineral to the desired particle size is commercially available from, for example, F.L. Smidth, Bethlehem, PA; Metso, Helsinki, Finland, Loesche, Germany and others. The ground carbonatable mineral powder is then preferably classified by screening the powder with a 200-mesh screen or sieve. Preferably approximately 90% by volume of the carbonatable mineral powder passes through a 200-mesh screen, especially approximately 95% by volume of the carbonatable mineral powder passes through a 200-mesh screen and more especially approximately 100% by volume of the carbonatable powder passes through a 200-mesh screen. Preferably approximately 90% to approximately 100% by volume of the carbonatable mineral powder passes through a 200-mesh screen, most preferably approximately 95% to approximately 100% by volume of the carbonatable mineral powder passes through a 200-mesh screen, especially approximately 100% by volume of the carbonatable mineral powder passes through a 200-mesh screen. The ground carbonatable mineral powder is then preferably classified by screening the powder with a 325-mesh screen or sieve. Preferably approximately 90% by volume of the carbonatable mineral powder passes through a 325-mesh screen, especially approximately 95% by volume of the carbonatable mineral powder passes through a 325-mesh screen and more especially approximately 100% by volume of the carbonatable mineral powder passes through a 325-mesh screen. Preferably approximately 90% to approximately 100% by volume of the carbonatable mineral powder passes through a 325-mesh screen, most preferably approximately 95% to approximately 100% by volume of the carbonatable mineral powder passes through a 325-mesh screen, especially approximately 100% by volume of the carbonatable mineral powder passes through a 325-mesh screen.

Alternatively, the carbonated mineral can be reduced to the desired particle size using a wet mill process. Wet milling, also called wet media milling, is a process in which particles are dispersed in a liquid by shearing, by impact or crushing, or by attrition. A mill is charged with media (small beads or spheres) and activated by a high-speed agitator shaft to separate the individual particles. When the agitator rotates, it transmits kinetic energy to the media. When the material is pumped through the mill, this energy acts on the solids suspended in a liquid (slurry) to tear them apart (shearing) or crush them, reducing them in size. The particles are simultaneously dispersed in the liquid which is then ready for use or can be dried and separated for use in other products. The wet mill liquid used can contain carbon dioxide in a gas or liquid state and optionally one or more of the carbonation aids, absorption or adsorption enhancers or any other microporous materials as described herein.

As stated above, $CO_2$ is added during the grinding process or it can be added in a post grinding process in a separate chamber, such as the storage silo 26, where the carbonatable mineral of the desired particle size is blended or mixed with $CO_2$ at a desirable temperature and pressure. For example, the $CO_2$ can be added or mixed with the carbonatable mineral at 60-80 degrees Celsius and an elevated pressure of approximately 1.5 to approximately 3 atmospheres. In particular $CO_2$ in gaseous, liquid or solid form can be added to the grinding process similarly to a grinding aid.

As stated above, one or more grinding and carbonation aids of various types can be added to the grinding process to improve the energy efficiency and pozzolanic or carbonation properties as well as binding $CO_2$ to the carbonatable mineral powder and/or reacting the $CO_2$ with un-carbonated elements or compounds in the carbonatable mineral powder.

In particular, a vertical roller mill with a closed gas circuit can be used where the carbon dioxide is fed or injected to the bottom of the vertical mill bellow or at the roller plates level exposing the mineral to carbon dioxide while it be being fractured or reduced in size. The carbonatable mineral powder particle classification can also made by using carbon dioxide as the flow of the gas in the classifier to separate the desired particle sizes to go into the silo from the particle sizes that are rejected back into the grinding mill. A vertical roller mill is more suitable to fracture and reduce in size a mineral with a higher moisture content of up to 8% and optionally water can be added during the grinding process if the moisture content falls below a desired level. When using a mixture of carbon dioxide and nitrogen or other gases, such as calcination kiln exhaust gas, or carbon dioxide of lower concentration levels, since the carbon dioxide is a gas heavier than nitrogen, in a vertical mill the carbon dioxide will tend to stay in the lower part of the mill which is the grinding roller plate, enhancing the carbon dioxide adsorption or absorption, aiding in the carbonation process.

As stated above, grinding aids of various types can be added to the grinding process to improve the energy efficiency and pozzolanic or carbonation properties as well as binding $CO_2$ to the carbonatable mineral and/or reacting the $CO_2$ with uncarbonated elements or compounds in the carbonatable mineral.

Any one or more carbonatable minerals can be ground in the presence of hydraulic or non-hydraulic cement clinker and $CO_2$ to create a blended cement. Alternatively, limestone can be added to the mix during the grinding process or after. Slag cement can also be used entirely or added in various amounts depending on the desired application and properties. Fly ash or any other type of pozzolan can be added to carbonatable mineral to create a blended carbonatable mineral-based pozzolan or cement in any suitable percentage.

Additionally, biological organisms or compounds can be added to improve the carbonation process of the uncarbonated materials. These biological organisms may be bacteria, enzymes, such as carbonic anhydrase enzymes or a wide range of proteins capable of favoring the nucleation of carbonate crystals, such as calcite, aragonite, vaterite, dolomite, siderite and other crystals in specific orientations. Peptides, barnacle cement protein, cement proteins can be used. Six barnacle-specific cement proteins (CPs) have been identified, four of which are thought to be interface proteins, CP19k, −20 k, −43 k, and −68 k, and two bulk proteins, CP52k and CP100k. Barnacle-specific CPs are those proteins present in the cement that share no homology with any other marine adhesive proteins or any other proteins.

$CO_2$ can be added also to mixing water used in the concrete mix so that the mixing water contains carbonic acid or is carbonated water. Alternatively, ammonium salts, zeolites, zeolites impregnated with carbon dioxide, carbon nanomaterials impregnated with carbon dioxide can be added to the concrete or mortar mix along with the carbonatable mineral having the chemical and physical properties described above.

In one disclosed embodiment of the present invention, the carbonatable mineral preferably has a chemical composition of approximately 20% to approximately 65% by weight $SiO_2$, approximately 1% to approximately 30% by weight $Al_2O_3$, 4% to approximately 60% by weight CaO, approximately 0% to approximately 20% by weight MgO, approximately 0% to approximately 30% by weight $Fe_2O_3$ and 0% to approximately 10% Na. In addition to the foregoing, other compounds can be present in small amounts, such as $K_2O$, $TiO_2$, $P_2O_5$, MnO, various metals, rare earth trace elements and other unidentified elements. When combined, these other compounds represent less than 10% by weight of the total chemical composition of the hyaloclastite, volcanic ash or pumice mineral.

In another disclosed embodiment, the carbonatable mineral in accordance with the present invention preferably has a density or specific gravity of approximately 2.2 to approximately 3.1.

Carbonatable mineral in accordance with the present invention can be in crystalline or amorphous (glassy) form and is usually found as a combination of both in varying proportions. Preferably, the carbonatable mineral in accordance with the present invention comprises approximately 0% to 100% by weight amorphous form, more preferably approximately 10% to approximately 80% by weight amorphous form, most preferably approximately 20% to approximately 60% by weight amorphous form, especially approximately 30% to approximately 50% by weight amorphous form. The crystalline portion of carbonatable mineral preferably comprises approximately 3% to approximately 20% by weight olivine, approximately 5% to approximately 40% by weight clinopyroxene, approximately 5% to approximately 60% by weight plagioclase, and approximately 0% to approximately 40% (or less than 40%) by weight other minerals including, but not limited to, magnetite, UlvoSpinel, quartz, feldspar, pyrite, illite, hematite, chlorite, calcite, hornblende, biotite, K-feldspars, mordenite, clinoamphibole, ilmenite hypersthene (an orthopyroxene), feldspathoids sulfides, metals, rare earth minerals, other unidentified minerals and combinations thereof. The foregoing ranges include all of the intermediate values.

Carbonatable minerals such as hyaloclastite, lava, volcanic ash, fly ash, bottom ash, boiler slag, iron slag, steel slag or any mineral that contains sufficient amount of carbonatable elements such as calcium, magnesium, potassium, iron and the like or combinations or mixtures thereof in accordance with the present invention can be used as a supplementary cementitious material in concrete or mortar mixes and combined with $CO_2$ by means of injection, as described in the above or other methods used in the prior art. The $CO_2$ can be in a gas, liquid, solid or any other form when combined with the uncarbonated mineral or with the cement or concrete containing uncarbonated carbonatable elements. Carbonatable minerals such as Hyaloclastite, volcanic ash or pumice in accordance with the present invention may or may not by itself a hydraulic cement, but the silica and alumina component is activated by CaOH (hydrate lime) produced by the hydration of hydraulic cements, such as portland cement, or by other minerals or compounds having reactive hydroxyl groups, such as calcium hydroxide CaOH, sodium hydroxide NaOH, potassium hydroxide KOH, lithium hydroxide LiOH, or CaO (quick lime) and the carbonatable elements are activated by the $CO_2$ delivered into the paste matrix. In addition, carbonatable mineral in accordance with the present invention when mixed with cement can improve the cement nucleation process thereby improving the cement hydration process and further when combined with $CO_2$ by means of injection, as described above, or others methods known in the prior art improve the cement or concrete properties. The carbonatable mineral in fine particles generally yields shorter set times and accelerates hydration in blended cements and when combined with $CO_2$ by means of injection, as described above or other methods known in the prior art improve the cement or concrete properties. Fine particle size carbonatable mineral increases the rate of hydration heat development and early-age compressive strength in portland cement. The carbonatable mineral with the chemical and physical properties according with the present inventions also improves the rate and amount of calcium, magnesium, and other types of carbonation formation when combined with $CO_2$ by means of injection or others, as described above or others methods known in the prior art and improve concrete properties. Carbonatable minerals, in accordance with the present invention can be used in combination with any hydraulic cement, such as portland cement. Other hydraulic cements include, but are not limited to, blast granulated slag cement, calcium aluminate cement, calcium silicate cement, low heat cement, hydrographic cement, belite cement (dicalcium silicate), phosphate cements and others. A hydraulic cement such as portland cement may contain various amounts of ground limestone depending on the type of cement, code approval, local jurisdiction and application, anywhere from less than 5% and up to 40%. Also, the carbonatable mineral in accordance with the present invention by itself can be blended with lime, hydrated lime or quick lime to form a cementitious material. In one disclosed embodiment, blended cementitious material for cement or mortar preferably comprises approximately 10% to approximately 90% by weight hydraulic cement and approximately 10% to approximately 90% by weight one or more carbonatable mineral or mixtures thereof in accordance with the present invention, more preferably approximately 20% to approximately 80% by weight hydraulic cement and approximately 20% to approximately 80% by weight one or more carbonatable mineral or mixtures thereof in accordance with the present invention, most preferably approximately 30% to approximately 70% by weight hydraulic cement and approximately 30% to approximately 70% by weight carbonatable mineral or mixtures thereof in accordance with the present invention, especially approximately 40% to approximately 60% by weight hydraulic cement and approximately 40% to approximately 60% by weight one or more carbonatable mineral or mixtures thereof in accordance with the present invention, more especially approximately 50% by weight hydraulic cement and approximately 50% by weight one or more carbonatable mineral or mixtures thereof in accordance with the present invention, and most especially approximately 70% by weight hydraulic cement and approximately 30% by weight one or more carbonatable mineral or mixtures thereof in accordance with the present invention. In another disclosed embodiment of the present invention, cementitious material for concrete or mortar preferably comprises approximately 50% to approximately 90% by weight hydraulic cement and approximately 10% to approximately 50% by weight one or more carbonatable mineral mixtures thereof in accordance with the present invention. The foregoing ranges include all of the intermediate values.

In a disclosed embodiment of the present invention, concrete or mortar comprises a hydraulic cement, one or more carbonatable mineral or mixtures thereof in accordance with the present invention, aggregate and water. Preferably, the cementitious material used to form the concrete or mortar comprises portland cement and one or more carbonatable mineral powder or mixtures thereof, more preferably portland cement and one or more carbonatable mineral or mixtures thereof having a volume-based mean particle size of less than or equal to approximately 100 μm, most preferably portland cement and one or more carbonatable mineral or mixtures thereof having a volume-based mean particle size of less than or equal to approximately 80 μm, most preferably portland cement and one or more carbonatable mineral or mixtures thereof having a volume-based mean particle size of less than or equal to approximately 60 μm, most preferably portland cement and one or more carbonatable mineral or mixtures thereof having a volume-based mean particle size of less than or equal to approximately 40 μm most preferably portland cement and one or more carbonatable mineral or mixtures thereof having a volume-based mean particle size of less than or equal to approximately 20 μm, especially having a volume-based mean particle size of less than or equal to approximately 15 μm, more especially having a volume-based mean particle size of less than or equal to approximately 10 μm, most especially having a volume-based mean particle size of less than or equal to approximately 5 μm. The foregoing ranges include all of the intermediate values. In simple terms, the one or more carbonatable mineral or mixtures thereof is reduced to a fine powder such that the fine powder has pozzolanic and or carbonation properties.

In another disclosed embodiment of the present invention, concrete including one or more carbonatable mineral or mixtures thereof in accordance with the present invention can include any other carbonatable mineral in combination with any type of hydraulic or non-hydraulic cement as well as any type of alkaline or acidic solution.

Additionally, the carbonatable mineral in accordance with the present invention can be used with any other types of non-hydraulic cement, or cement that is activated by carbonation or any carbonatable type cement. Examples of these types of cements are slag cement, amorphous calcium silicate cements, amorphous/crystalline calcium silicate cements, calcium magnesium silicate, carbonatable cements and the like or any combination thereof. Similarly to how the carbonatable mineral and or the carbonatable mineral in combination with $CO_2$, a carbonation aid, enhancer, or a microporous material embed with $CO_2$, combined with lime or hydrated lime or any other alkaline solution dissolves and the $CO_2$ embedded or adsorbed into the carbonatable mineral or carbonation aid or microporous material or mixture thereof is delivered into the solution thereby carbonating the carbonatable elements or minerals contained in both from the carbonatable mineral and the lime or hydrated lime, by a process we call "internal carbonation", any non-hydraulic or carbonatable cement that is activated by $CO_2$ is in this case internally carbonated by the $CO_2$ delivered into the matrix by any one of ore more of the carbonatable mineral, $CO_2$ embedded carbonation aids and or $CO_2$ embedded microporous materials or any combination thereof.

In another disclosed embodiment of the present invention, concrete or mortar comprises a lime such as quick lime or hydrated lime, one or more carbonatable mineral or mixtures thereof in accordance with the present invention, aggregate and water. Preferably, the cementitious material used to form the concrete or mortar comprises lime such as quick lime or hydrated lime and one or more carbonatable mineral powder or mixtures thereof, more preferably quick lime and one or more carbonatable minerals or mixtures thereof having a volume-based mean particle size of less than or equal to approximately 40 μm, most preferably one or more carbonatable mineral or mixtures thereof having a volume average particle size of less than or equal to approximately 20 μm, especially less than or equal to approximately 15 μm, more especially less than or equal to approximately 10 μm, most especially less than or equal to approximately 5 μm. The foregoing ranges include all of the intermediate values. In simple terms, the carbonatable minerals or mixtures thereof is reduced to a fine powder such that the fine powder has pozzolanic properties and combined with carbon dioxide that when dissolved in the lime or calcium hydroxide solution the carbonatable elements combine with carbon dioxide to form carbonate minerals among other minerals. The carbonatable minerals and $CO_2$ can be combined during or post grinding process. Anyone of the carbonation aids, $CO_2$ adsorption enhancers or microporous materials described above can be embedded with $CO_2$ prior to or when combined with the carbonatable minerals or during the mixing with the hydraulic cement, non-hydraulic cement, lime, alkaline solution or any other types of similar solutions. We call this process internal carbonation whereby the $CO_2$ is delivered by a delivery vehicle internally within the paste matrix in close proximity to the carbonatable elements to react with the $CO_2$ once they dissolve in the alkaline solution.

In yet another disclosed embodiment of the present invention, an alkaline solution comprises a lime such as quick lime, hydrated lime, a compound having a reactive hydroxyl group such as calcium, sodium, potassium, lithium hydroxide and one or more carbonatable minerals or mixtures thereof in accordance with the present invention, aggregate and water. Preferably, the cementitious material used to form the concrete or mortar comprises an alkaline solution with a pH between 9-14 and one or more carbonatable minerals powder or mixtures thereof, more preferably, one or more carbonatable minerals or mixtures thereof having a volume-based mean particle size of less than or equal to approximately 40 μm, most preferably portland cement and one or more carbonatable minerals or mixtures thereof having a volume average particle size of less than or equal to approximately 20 μm, especially less than or equal to approximately 15 μm, more especially less than or equal to approximately 10 μm, most especially less than or equal to approximately 5 μm. The foregoing ranges include all of the intermediate values. In simple terms the carbon dioxide disposed on the surface of the carbonatable mineral powder particles when delivered into the alkaline solution will dissolve the carbonatable mineral powder elements and the carbonatable elements will combine with the carbon dioxide therein to form carbonated minerals among other minerals. The carbonatable minerals and $CO_2$ can be combined during or post grinding process. Anyone of the carbonation aids, $CO_2$ adsorption enhancers or microporous materials described above can be embedded with $CO_2$ prior to or when combined with the carbonatable minerals or during the mixing with the lime or similar solutions. We call this process internal carbonation whereby the $CO_2$ is delivered by a delivery vehicle internally within the paste matrix in close proximity to the carbonatable elements to react with the $CO_2$ once they dissolve in the alkaline solution.

In another disclosed embodiment mixing lime, hydrated lime, quick lime or an alkaline solution and a carbonatable mineral powder with a chemical composition comprising approximately 40% to approximately 65% by weight $SiO_2$, approximately 10% to approximately 18% by weight $Al_2O_3$, approximately 4% to approximately 18% by weight $FeO$, approximately 4% to approximately 20% by weight $CaO$, approximately 3% to approximately 15% by weight $MgO$, wherein the carbonatable mineral has a volume-based mean particle size of less than or equal to approximately 40 μm and exposing the mixture to $CO_2$. The adsorbed carbon dioxide is available to both react with the carbonatable elements contained in the carbonatable mineral powder as well as carbonate the calcium hydroxide or any other carbonatable elements resulting from the lime reaction with water, thereby accelerating the set of the lime-based mortars. The carbonatable mineral and $CO_2$ can be combined during or post grinding process. Anyone of the carbonation aids, $CO_2$ adsorption enhancers or microporous materials described above can be embedded with $CO_2$ prior to or when combined with the carbonatable mineral or during the mixing with the lime or similar solutions. We call this process internal carbonation whereby the $CO_2$ is delivered by a delivery vehicle internally within the paste matrix in close proximity to the carbonatable elements to react with the $CO_2$ once they dissolve in the alkaline solution.

In another disclosed embodiment mixing a non-hydraulic cement and a carbonatable mineral powder with a chemical composition comprising approximately 40% to approximately 65% by weight $SiO_2$, approximately 10% to approximately 18% by weight $Al_2O_3$, approximately 4% to approximately 18% by weight $FeO$, approximately 4% to approximately 20% by weight $CaO$, approximately 3% to approximately 15% by weight $MgO$, wherein the carbonatable mineral has a volume-based mean particle size of less than or equal to approximately 40 µm and exposing the mixture to $CO_2$. The adsorbed carbon dioxide is available to both react with the carbonatable elements contained in the carbonatable mineral powder as well as carbonate the calcium hydroxide or any other carbonatable elements resulting from the non-hydraulic cement reaction with water, or the alkaline solution thereby accelerating the set of the non-hydraulic cement-based mortars. The carbonatable mineral and $CO_2$ can be combined during or post grinding process. Anyone of the carbonation aids, $CO_2$ adsorption enhancers or microporous materials described above can be embedded with $CO_2$ prior to or when combined with the carbonatable mineral or during the mixing with the non-hydraulic cement or similar solutions. We call this process internal carbonation whereby the $CO_2$ is delivered by a delivery vehicle internally within the paste matrix in close proximity to the carbonatable elements to react with the $CO_2$ once they dissolve in the alkaline solution.

In another disclosed embodiment, the present invention comprises mixing a compound having a reactive hydroxyl group and a carbonatable mineral with a chemical composition comprising approximately 40% to approximately 65% by weight $SiO_2$, approximately 10% to approximately 18% by weight $Al_2O_3$, approximately 4% to approximately 18% by weight FeO, approximately 4% to approximately 20% by weight CaO, approximately 3% to approximately 15% by weight MgO, wherein the carbonatable mineral has a volume-based mean particle size of less than or equal to approximately 40 µm and exposing the mixture to $CO_2$. The hyaloclastite and $CO_2$ can be combined during or post grinding process. Anyone of the carbonation aids, $CO_2$ adsorption enhancers or microporous materials described above can be embed with $CO_2$ prior to or when combined with the carbonatable mineral or during the mixing with the lime or similar solutions.

In another disclosed embodiment, the present invention comprises a soil such as an alkaline or acidic soil is combined with one or more carbonatable mineral or mixtures thereof in accordance with the present invention. Preferably, the alkaline soil and rain water form an alkaline solution with a pH between 8-14 and carbonatable mineral or mixtures thereof, more preferably, carbonatable mineral or mixtures thereof having a volume-based mean particle size of less than or equal to approximately 40 µm, most preferably carbonatable mineral or mixtures thereof having a volume average particle size of less than or equal to approximately 20 µm, especially less than or equal to approximately 15 µm, more especially less than or equal to approximately 10 µm, most especially less than or equal to approximately 5 µm. The foregoing ranges include all of the intermediate values. In simple terms the carbon dioxide disposed on the surface of the carbonatable or mineral powder particles when delivered into the soil, forms an alkaline solution that will dissolve the carbonatable mineral powder elements and the carbonatable elements will combine with the carbon dioxide therein to form carbonated minerals among other minerals thereby mineralizing carbon dioxide in soil and other minerals contained therein that can be absorbed by plants to be used as plant nutrients. Alternatively, acidic soil, sea water and rain water form an acidic solution with a pH between 3-7 and carbonatable mineral powder or mixtures thereof, more preferably, carbonatable mineral or mixtures thereof having a volume-based mean particle size of less than or equal to approximately 40 µm, most preferably carbonatable mineral or mixtures thereof having a volume average particle size of less than or equal to approximately 20 µm, especially less than or equal to approximately 15 µm, more especially less than or equal to approximately 10 µm, most especially less than or equal to approximately 5 µm. The foregoing ranges include all of the intermediate values. In simple terms the carbon dioxide disposed on the surface of the carbonatable mineral powder particles when delivered into the acidic soil, forms an acidic solution that will dissolve the carbonatable mineral powder elements and the carbonatable elements will combine with the carbon dioxide therein to form carbonated minerals among other minerals thereby mineralizing carbon dioxide in soil and other minerals contained therein that can be absorbed by plants to be used as plant nutrients or precipitate as carbonated mineral into the soil or sea.

In another disclosed embodiment of the present invention, concrete including one or more carbonatable mineral or mixtures thereof in accordance with the present invention can include any other pozzolan in combination with hydraulic or non-hydraulic cement, lime or alkaline solution.

The cement and one or more carbonatable mineral or mixtures thereof in accordance with the present invention can be combined physically or mechanically in any suitable manner and is not a critical feature of the present invention. For example, the cement and one or more carbonatable mineral or mixtures thereof in accordance with the present invention can be mixed together to form a uniform blend of dry cementitious material prior to combining with the aggregate and water. Or, the cement and one or more carbonatable mineral or mixtures thereof in accordance with the present invention can be added separately to a conventional concrete mixer, such as a transit mixer of a ready-mix concrete truck, at a batch plant. The water and aggregate can be added to the mixer before the cementitious material; however, it is preferable to add the cementitious material first, the water second, the aggregate third and any makeup water last.

In a disclosed embodiment of the present invention, $CO_2$ can be combined with one or more carbonatable mineral or mixtures thereof in accordance with the present invention in any manner known in the prior art for sequestering by mineralization $CO_2$ in concrete; see for example U.S. Pat. Nos. 10,246,379; 10,350,787; 10,570,064 and 10,654,191 (the disclosures of which are all incorporated herein by reference). For example, a slurry of water and one or more carbonatable mineral or mixtures thereof in accordance with the present invention can be formed and $CO_2$ can be bubbled through the slurry at atmospheric pressure or at elevated pressure, such that the $CO_2$ goes into solution in the water. In another disclosed embodiment of the present invention, a concrete mix can be formed by combining portland cement, one or more carbonatable mineral or mixtures thereof in accordance with present invention, aggregate and water. $CO_2$ can then be injected into the concrete mix at atmospheric pressure or at elevated pressures, at ambient temperature or at elevated temperatures. In another disclosed embodiment of the present invention, one or more carbonatable mineral or mixtures thereof in accordance with the present invention; i.e., in powder form, is exposed to $CO_2$ at atmospheric pressure or at elevated pressures, at ambient temperature or at elevated temperatures. In another disclosed embodiment of the present invention, $CO_2$ can be injected into water under pressure so that the $CO_2$ goes into solution in the water, thereby forming carbonated water. Methods of forming carbonated water are well known in the prior art. The carbonated water is then combined with the components that form concrete or mortar containing one or more carbonatable mineral or mixtures thereof in accordance with the present invention. The carbonated water can be combined with the components that form concrete or mortar containing one or more carbonatable mineral or mixtures thereof in accordance with the present invention at atmospheric pressure or at elevated pressure and at ambient temperature or at elevated temperature.

The $CO_2$ can be injected or combined into a mixture of any one or more of the components of a concrete or mortar formulation plus one or more carbonatable mineral or mixtures thereof in accordance with the present invention and the method of injection can be any means known in the prior art used with other cementitious compositions. In other words, the present invention does not necessarily utilize a novel form or method for injecting $CO_2$, except as specifically described herein, when using the carbonation aid, $CO_2$ adsorbent enhancers and microporous materials, but, rather, comprises a novel composition that will react with $CO_2$ at a higher rate and/or in a greater amount per unit volume of the absorbing or reacting composition. That is, the carbonatable mineral such as hyaloclastite, volcanic ash, fly ash, bottom ash, slag and the like or mixtures thereof in accordance with the present invention will react better with $CO_2$ and therefore when the carbonatable mineral of the present invention is incorporated into concrete or mortar mixes, such mixes will mineralize or sequester more carbon than prior art cementitious compositions. Therefore, prior art methods of injecting $CO_2$ into cementitious compositions for the purpose of sequestering carbon therein can be used as a part of the present invention. Additionally, the use of carbonation aids, absorption and adsorption enhancing compounds, microporous materials deliver increased amounts of $CO_2$ to be present in close proximity to the carbonatable elements and distributed into the alkaline or acidic solution so that when the carbonatable mineral dissolves the carbonatable elements have sufficient amount of carbon dioxide to react with thereby increasing or enhancing the mineralization process.

Chemical admixtures can also be used with the concrete in accordance with the present invention. Such chemical admixtures include, but are not limited to, accelerators, retarders, air entrainments, plasticizers, superplasticizers, coloring pigments, corrosion inhibitors, bonding agents and pumping aid.

Mineral admixtures can also be used with the concrete in accordance with the present invention.

It is specifically contemplated as a part of the present invention that concrete formulations including one or more carbonatable mineral or mixtures thereof in accordance with the present invention can be used with concrete forms or systems that retain the heat of hydration to accelerate the curing of the concrete. Therefore, in another disclosed embodiment of the present invention, concrete in accordance with the present invention can be cured using concrete forms such as disclosed in U.S. Pat. Nos. 8,555,583; 8,756,890; 8,555,584; 8,532,815; 8,877,329; 9,458,637; 8,844,227 and 9,074,379 (the disclosures of which are all incorporated herein by reference); published patent application Publication Nos. 2014/0333010; 2014/0333004 and 2015/0069647 (the disclosures of which are all incorporated herein by reference) and U.S. patent application Ser. No. 15/418,937 filed Jan. 30, 2017 (the disclosure of which is incorporated herein by reference).

As used herein, the term "exposed" to $CO_2$ or "injected" or "combined" with $CO_2$ means $CO_2$ in gaseous, solid or liquid form. In gaseous form, the $CO_2$ is in a concentrated form; i.e., at a concentration higher than found in air at standard temperature and pressure or greater than 0.04% by weight as of the filing date of the present application; preferably 1% to 100% $CO_2$, more preferably 10% to 100% $CO_2$. The foregoing range includes all of the intermediate values. In particular it is desirable that carbon dioxide from the any calcination process, such as lime or portland cement manufacture containing elevated amounts of carbon dioxide, can be used, however these kiln gases need to be cooled from the initial temperature. Additionally, any other type of exhaust gases from a power plant or any other thermal carbon combustion process can be use. Alternatively, gas containing carbon dioxide released by a blast iron furnace manufacturing process can be used as a source of carbon dioxide to carbonate the carbonatable mineral in accordance with the present invention.

All percentages used herein are percent by weight unless specifically stated otherwise.

The following examples are illustrative of selected embodiments of the present invention and are not intended to limit the scope of the invention.

Example 1

A carbonatable mineral such as slag is processed through the processing plant shown in FIG. 1. The unprocessed slag having a moisture content of 10% is dried in the dryer 14 to a moisture content of 6%. The dried slag is ground in the micronizing mill or ball mill 18 and classifier 22 to a volume-based mean particle size of 8 μm. The dried and ground slag is transported from the classifier 22 to the storage silo 26 using an enclosed screw conveyor 26. The screw conveyor 22 is equipped with a plurality of nozzles (not shown) for introducing a gas under pressure to the slag as it moves down the length of the screw conveyor. Pure $CO_2$ and steam at a pressure of 1.5 to 3 atmospheres are introduced into the screw conveyor as the dried and ground slag moves from the classifier 22 to the storage silo 26. The screw conveyor 22 moves the material through the slag through the tube at a speed and the tube has a length such that the residence time of the slag in the screw conveyor is five minutes. At least a portion of the slag delivered to the storage silo 26 has $CO_2$ adsorbed on the surface of the particles thereof and/or absorbed into the particles thereof and/or reacted on the surface thereof.

Example 2

A carbonatable mineral, such as slag, is processed in the same manner as described in Example 1 above, except that 0.01% to 10% by weight of a grinding or carbonation aid is added to the slag in the micronizing mill or ball mill 18. The grinding aid that is used is shown in Table 5 below:

TABLE 5

| Example No. | Carbonation Aid |
| --- | --- |
| 2a | monoethanolamine |
| 2b | diglycolamine |
| 2c | triethylenetetramine |
| 2d | tetraethylenepentamine |
| 2e | diisopropanolamine |
| 2f | diethanolamine |
| 2g | ethylene glycol |
| 2h | diethylene glycol |
| 2i | aminoethylethanolamine |
| 2j | diethylenetriamine hydroxyethyl |
| 2k | phenol |

For each of the Examples 2a-2k, at least a portion of the slag delivered to the storage silo 26 has $CO_2$ adsorbed on the surface of the particles thereof and/or reacted on the surface thereof. In addition, in of the Examples 2a-2k at least a portion of the carbonation aid has $CO_2$ bound thereto.

Example 3

A carbonatable mineral, such as slag, is processed in the same manner as described in Example 1 above, except $CO_2$ gas is not introduced into the screw conveyor 22. A microporous material such as activated Carbon is exposed in a chamber to $CO_2$, such that the microporous carbon adsorbs absorbs or otherwise carries $CO_2$ therewith. The microporous material embedded with $CO_2$, is blended with the slag in the screw conveyor 22 then placed in the storage silo 26.

The microporous material that is used is shown in Table 6 below:

TABLE 6

| Example No. | Microporous Material |
| --- | --- |
| 3a | graphite nanoplatelets (GP) |
| 3b | carbon nanofibers (CNF) |
| 3c | activated carbons (ACs) |
| 3d | carbon nanotubes (CNTs) |
| 3e | graphene |
| 3f | quinones |
| 3g | organic framework compounds |
| 3h | porous organic polymers |
| 3i | covalent-organic frameworks |
| 3j | zeolites |
| 3k | carboxylates |
| 3l | polymeric brushes |
| 3m | ionic liquids |
| 3n | wollastonite |

For each of the Examples 3a-3n, at least a portion of the microporous material delivered to the storage silo 26 has $CO_2$ bound to the particles thereof and/or reacted on the surface thereof. In addition, in the Examples 3a-3n, at least a portion of the microporous material have $CO_2$ bound, adsorbed and/or absorbed on the surface and/or pores thereof.

Example 4

A carbonatable mineral, such as slag, is processed in the same manner as described in Example 1 above, except $CO_2$ gas is not introduced into the screw conveyor 22. A zeolite is exposed in a chamber to $CO_2$, such that the zeolite absorbs, adsorbs or otherwise carries $CO_2$ therewith. The zeolite embedded with $CO_2$, is blended with the slag in the screw conveyor 22 then placed in the storage silo 26. The zeolite is preferably combined with the slag in amounts of approximately 1% to approximately 20% by weight.

The zeolite that is used is shown in Table 7 below:

TABLE 7

| Example No. | Zeolite |
| --- | --- |
| 4a | Clinoptilolite |
| 4b | Analcime |
| 4c | Phillipsite |
| 4d | Chabazite |
| 4e | Erionite |
| 4f | Mordenite |
| 4g | Gonnardite |
| 4h | Edingtonite |
| 4i | Thomsonite |
| 4j | Laumontite |
| 4k | Boggsite |
| 4l | Faujasite |
| 4m | Bellbergite |
| 4n | Heulandite |
| 4o | Cowlesite |

For each of the Examples 4a-4o, at least a portion of the zeolite material delivered to the storage silo 26 has $CO_2$ bound to the particles thereof and/or reacted on the surface thereof. In addition, in the Examples 4a-4o, at least a portion of the zeolite material has $CO_2$ bound, adsorbed and/or absorbed on the surface and/or pores thereof.

The slag and zeolite are removed from the storage silo 26 and blended with portland cement, aggregate and water to form plastic concrete. The plastic concrete is placed in a conventional mold and cured. At least a portion of the $CO_2$ adsorbed on the zeolite is mineralized or sequestered within the cured concrete.

Example 5

A carbonatable mineral, such as slag, is processed in the same manner as described in Example 2 above. The slag is removed from the storage silo 26 and blended with portland cement, aggregate and water to form plastic concrete. The plastic concrete is placed in a conventional mold and cured. At least a portion of the $CO_2$ adsorbed on the slag is mineralized or sequestered within the cured concrete.

Example 6

A carbonatable mineral, such as slag, is processed in the same manner as described in Example 3 above. The combination of the $CO_2$ bound to the microporous material and slag from the storage silo 26 is blended with lime, aggregate and water to form lime-based plastic concrete. The plastic concrete is placed in a mold and cured. The $CO_2$ bound to the microporous material and slag reacts with the carbonatable elements from the lime and carbonatable mineral as they dissolve in the alkaline solution. At least a portion of the $CO_2$ bound to the microporous material and slag is mineralized within the cured limes-based concrete.

Example 7

A carbonatable mineral, such as slag, is processed in the same manner as described in Example 6 above, except the mold is an insulated concrete form of the design disclosed in U.S. Pat. No. 10,280,622 (the disclosure of which is incorporated herein by reference in its entirety).

Example 8

A carbonatable mineral, such as slag, is processed in a closed-circuit, vertical roller mill. $CO_2$ gas is introduced into the bottom of the vertical mill at a temperature of 70 degrees Celsius and a pressure of 1.5 atmospheres and classified using the carbon dioxide gas to a desirable volume-based mean particle size of 60 μm. The slag is taken from the storage silo 26 and transported by rail to a precast concrete plant.

Example 9

A carbonatable mineral, such as Class C fly ash, is processed in a closed-circuit, vertical roller mill. $CO_2$ gas is introduced into the bottom of the vertical mill at a temperature of 70 degrees Celsius and a pressure of 1.5 atmospheres and classified using the carbon dioxide gas, to a desirable volume-based mean particle size of 40 μm. The fly ash is taken from the storage silo 26 and mixed with cement in a concrete mix.

Example 10

A carbonatable mineral, such as blast furnace granulated slag, is processed in a closed-circuit, vertical roller mill, $CO_2$ gas is introduced into the bottom of the vertical mill at a temperature of 70 degrees Celsius and a pressure of 1.5 to 3 atmospheres and classified using the carbon dioxide gas to a desirable volume-based mean particle size of 40 μm. Blast furnace granulated slag is taken from the storage silo 26 and mixed with cement in a concrete mix.

Example 11

A carbonatable mineral such as fly ash, bottom ash or both is processed in the same manner as described in Example 4 above. The fly ash, bottom ash or both is combined with $CO_2$ embedded zeolite, which is then taken from the storage silo 26 and transported by rail to a precast concrete plant. The fly ash, bottom ash or both and zeolite are blended with portland cement, aggregate and water to form plastic concrete. The $CO_2$ bound to the zeolite reacts with the carbonatable elements from the cement paste and fly ash, bottom ash or both as they dissolve in the alkaline cementitious solution. $CO_2$ is mineralized in the cured concrete.

Example 12

A carbonatable mineral such as containing fly ash, bottom ash or both is processed in the same manner as described in Example 2 above. The fly ash, bottom ash or both is removed from the storage silo 26 and blended with lime, aggregate and water to form plastic lime-based mortar or concrete. The plastic mortar or concrete is placed in a conventional mold and cured. At least a portion of the $CO_2$ bound to the fly ash, bottom ash or both and carbonation aid reacts with the carbonatable elements from the lime and fly ash, bottom ash or both as they dissolve in the alkaline solution. At least a portion of the $CO_2$ bound to the fly ash, bottom ash or both and carbonation aid is mineralized or sequestered within the cured mortar or concrete.

Example 13

A carbonatable mineral, such as fly ash, bottom ash or both, is processed in the same manner as described in Example 2 above. The fly ash, bottom ash or both is removed from the storage silo 26 and blended with lime, aggregate and water to form plastic lime-based mortar. The plastic mortar is rendered on a masonry wall and cured over time. At least a portion of the $CO_2$ bound to the fly ash, bottom ash or both and carbonation aid reacts with the carbonatable elements from lime and carbonatable mineral as they dissolve in the alkaline solution. At least a portion of the $CO_2$ bound to the fly ash, bottom ash or both and carbonation aid is mineralized or sequestered within the cured mortar.

Example 14

A carbonatable mineral, such as fly ash, bottom ash or both, is processed in the same manner as described in Example 6 above. The fly ash, bottom ash or both is removed from the storage silo 26 and blended with lime, aggregate and water to form plastic lime-based concrete. The plastic concrete is placed in a conventional mold and cured. The $CO_2$ bound to the microporous material reacts with the carbonatable elements from the lime and fly ash, bottom ash or both as they dissolve in the alkaline solution. At least a portion of the $CO_2$ bound to the microporous material is mineralized or sequestered within the cured concrete.

Example 15

A carbonatable mineral, such as fly ash, bottom ash or both, is processed in the same manner as described in Example 6 above. The fly ash, bottom ash or both is removed from the storage silo 26 and blended with lime, aggregate and water to form plastic lime-based mortar or plaster. The plastic mortar or plaster is rendered on a masonry wall and cured over time. At least a portion of the $CO_2$ bound to the microporous material reacts with the carbonatable elements from the lime and the carbonatable elements from the fly ash, bottom ash or both as they dissolve in the alkaline solution. At least a portion of the $CO_2$ from the microporous material is mineralized or sequestered within the cured mortar or plaster.

Example 16

A carbonatable mineral, such as fly ash, bottom ash or both, is processed in the same manner as described in Example 2 above. The fly ash, bottom ash or both and carbonation aid are removed from the storage silo 26 and blended with an alkaline solution, aggregate and water to form a geopolymer-based concrete. The plastic geopolymer-based concrete is placed in a mold and cured. At least a portion of the $CO_2$ bound to the fly ash, bottom ash or both and carbonation aid reacts with the carbonatable elements from fly ash, bottom ash or both as they dissolve in the alkaline solution. At least a portion of the $CO_2$ bound to the fly ash, bottom ash or both and carbonation aid is sequestered within the cured geopolymer-based concrete.

Example 17

A carbonatable mineral, such as fly ash, bottom ash or both, is processed in the same manner as described in Example 2 above. The fly ash, bottom ash or both and carbonation aid are removed from the storage silo 26 and blended with an alkaline solution, aggregate and optional water to form plastic geopolymer-based mortar. The plastic mortar is rendered on a masonry wall and cured over time. At least a portion of the $CO_2$ bound to the fly ash, bottom ash or both and carbonation aid reacts with the carbonatable elements from the fly ash, bottom ash or both as they dissolve in the alkaline solution. At least a portion of the $CO_2$ bound to the fly ash, bottom ash or both and carbonation aid is sequestered within the geopolymer-based cured mortar.

Example 18

A carbonatable mineral, such as fly ash, bottom ash or both, is processed in the same manner as described in Example 6 above. The fly ash, bottom ash or both and microporous material are removed from the storage silo 26 and blended with an alkaline solution, aggregate and optionally water to form plastic geopolymer-based concrete. The plastic concrete is placed in a conventional mold and cured. At least a portion of the $CO_2$ bound to the microporous material reacts with the carbonatable elements from the fly ash, bottom ash or both as they dissolve in the alkaline solution. At least a portion of the $CO_2$ bound to the microporous material is mineralized or sequestered within the cured geopolymer-based concrete.

Example 19

A carbonatable mineral, such as fly ash, bottom ash or both, is processed in the same manner as described in Example 6 above. The fly ash, bottom ash or both and microporous material are removed from the storage silo 26 and blended with an alkaline solution, aggregate and water to form plastic geopolymer-based mortar. The plastic mortar is rendered on a masonry wall and cured over time. At least a portion of the $CO_2$ bound to the microporous material reacts with the carbonatable elements from the fly ash, bottom ash or both as they dissolve in the alkaline solution. At least a portion of the $CO_2$ bound to the microporous material is mineralized or sequestered within the cured mortar.

Example 20

A carbonatable mineral, such as fly ash, bottom ash or both and a microporous material are processed in the same manner as described in Example 3 above and then the combined fly ash, bottom ash or both and $CO_2$ bound to the microporous material are formed into ¼ inch pellets.

Example 21

The pellets from Example 20 above are combined with an alkaline solution. The alkaline solution can be selected from any one of calcium hydroxide, sodium hydroxide, potassium hydroxide, a compound with a reactive hydroxyl group, hydraulic cement, non-hydraulic cement, alkaline soil or salt water.

Example 22

The pellets from Example 20 above are combined with an acidic solution or acidic soil.

Example 23

A carbonatable mineral, such as fly ash, bottom ash or both, and a zeolite are processed in the same manner as described in Example 4 above. The carbonatable mineral combined with the zeolite is taken from the storage silo 26 and transported by rail to a precast elements concrete plant. The fly ash, bottom ash or both combined with $CO_2$ bound to the zeolite is blended with a non-hydraulic cement, aggregate and water to form plastic concrete. At least a portion of the $CO_2$ bound to the zeolite reacts with the carbonatable elements from the non-hydraulic cement and fly ash, bottom ash or both as they dissolve in the alkaline solution. At least a portion of the $CO_2$ bound to the zeolite is mineralized in the cured concrete.

Example 24

A carbonatable mineral, such as fly ash, bottom ash or both, is processed in the same manner as described in Example 6 above. The fly ash, bottom ash or both and microporous material are removed from the storage silo 26 and blended with non-hydraulic cement, aggregate and water to form plastic non-hydraulic cement-based concrete. The plastic concrete is placed in a conventional mold and cured. At least a portion of the $CO_2$ bound to the microporous material reacts with the carbonatable elements from the non-hydraulic cement and the fly ash, bottom ash or both as they dissolve in the alkaline solution. At least a portion of the $CO_2$ bound to the microporous material is mineralized or sequestered within the cured concrete.

Example 25

A microporous material selected from one or more of the 3a-3n of Example 3 above, is exposed in a chamber to $CO_2$ at a concentration greater than atmospheric concentration, such that the microporous material absorbs, adsorb or otherwise binds $CO_2$ therewith. The microporous material is blended with lime, hydrated lime or quicklime, aggregate and water to form plastic lime-based concrete. The plastic concrete is placed in a conventional mold and cured. At least a portion of the $CO_2$ bound to the microporous material reacts with the carbonatable elements from the lime, hydrated lime or quicklime as it dissolves in the alkaline solution. At least a portion of the $CO_2$ bound to the microporous material is mineralized or sequestered within the cured lime-based concrete.

Example 26

A microporous material selected from one or more of the 3a-3n of Example 3 above, is exposed in a chamber to $CO_2$ at a concentration greater than atmospheric concentration such that the microporous material absorbs, adsorb or otherwise binds $CO_2$ therewith. The microporous material is blended with a non-hydraulic cement (that contains both Ca and Si), aggregate and water to form plastic non-hydraulic cement-based concrete. The plastic concrete is placed in a conventional mold and cured. At least a portion of the $CO_2$ bound to the microporous material reacts with the carbonatable elements from the non-hydraulic cement as it dissolves in the alkaline solution. At least a portion of the $CO_2$ bound to the microporous material is mineralized or sequestered within the cured non-hydraulic cement-based concrete.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A product comprising:
   a carbonation aid and a carbonatable mineral containing one or more of un-carbonated Ca, Mg, Na, K, Fe, wherein the carbonation aid facilitates the conversion of one or more of CaO, MgO, $Na_2O$, $K_2O$ or FeO to a carbonate or a $CO_3$ containing mineral in the presence of $CO_2$;
   wherein the carbonatable mineral has a volume-based mean particle size of less than or equal to 100 µm; and
   wherein one or more of the carbonation aid or the carbonatable mineral has carbon dioxide bound thereto at a concentration greater than its atmospheric concentration.

2. The product of claim 1, wherein the carbonatable mineral has a volume-based mean particle size of less than or equal to 40 µm.

3. The product of claim 1, wherein the carbonatable mineral has a volume-based mean particle size of less than or equal to 20 μm.

4. The product of claim 1, wherein the carbonation aid is an amine, an ammonium salt, a metal-oxide framework, an enzyme, an amino acid, a quinone, an ionic liquid, a porous organic polymer, a covalent-organic framework or combinations or mixtures thereof.

5. The product of claim 4, wherein the carbonatable mineral has a volume-based mean particle size of less than or equal to 40 μm.

6. The product of claim 4, wherein the carbonatable mineral has a volume-based mean particle size of less than or equal to 20 μm.

7. The product of claim 4 further comprising a hydraulic or non-hydraulic cement.

8. The product of claim 7, wherein the carbonatable mineral has a volume-based mean particle size of less than or equal to approximately 40 μm.

9. The product of claim 7, wherein the carbonatable mineral has a volume-based mean particle size of less than or equal to approximately 20 μm.

10. A product comprising:
   a carbon dioxide sorbent microporous material and a carbonatable mineral containing one or more of uncarbonated Ca, Mg, Na, K, Fe;
   wherein the carbonatable mineral has a volume-based mean particle size of less than or equal to approximately 100 μm; and
   wherein one or more of the carbon dioxide sorbent microporous material and the carbonatable mineral have carbon dioxide bound thereto at a concentration greater than its atmospheric concentration.

11. The product of claim 10, wherein the carbonatable mineral has a volume-based mean particle size of less than or equal to 40 μm.

12. The product of claim 10, wherein the carbonatable mineral has a volume-based mean particle size of less than or equal to 20 μm.

13. The product of claim 10, wherein the carbon dioxide sorbent microporous material is a metal-oxide framework, an activated microporous carbon material, a carbon nanotube, graphite, graphene, a zeolite, a porous organic polymer, a covalent-organic framework or combinations or mixtures thereof.

14. The product of claim 13, wherein the carbonatable mineral has a volume-based mean particle size of less than or equal to approximately 40 μm.

15. The product of claim 13, wherein the carbonatable mineral has a volume-based mean particle size of less than or equal to 20 μm.

16. The product of claim 13 further comprising a hydraulic or non-hydraulic cement.

17. The product of claim 16, wherein the carbonatable mineral has a volume-based mean particle size of less than or equal to approximately 40 μm.

18. The product of claim 16, wherein the carbonatable mineral has a volume-based mean particle size of less than or equal to approximately 20 μm.

* * * * *